(12) United States Patent
Ganapathiappan et al.

(10) Patent No.: US 11,685,014 B2
(45) Date of Patent: Jun. 27, 2023

(54) FORMULATIONS FOR ADVANCED POLISHING PADS

(71) Applicant: Applied Materials, Inc., Santa Clara, CA (US)

(72) Inventors: Sivapackia Ganapathiappan, Los Altos, CA (US); Ankit Vora, Bothell, WA (US); Boyi Fu, San Jose, CA (US); Venkat Hariharan, Lehi, UT (US); Mayu Yamamura, San Mateo, CA (US); Mario Cornejo, San Jose, CA (US); Igor Abramson, Cupertino, CA (US); Mo Yang, Sunnyvale, CA (US); Daniel Redfield, Morgan Hill, CA (US); Rajeev Bajaj, Fremont, CA (US); Nag B. Patibandla, Pleasanton, CA (US)

(73) Assignee: Applied Materials, Inc., Santa Clara, CA (US)

(*) Notice: Subject to any disclaimer, the term of this patent is extended or adjusted under 35 U.S.C. 154(b) by 174 days.

(21) Appl. No.: 16/529,884

(22) Filed: Aug. 2, 2019

(65) Prior Publication Data

US 2020/0070302 A1  Mar. 5, 2020

Related U.S. Application Data

(60) Provisional application No. 62/726,661, filed on Sep. 4, 2018.

(51) Int. Cl.
*B24B 37/24* (2012.01)
*C08F 283/00* (2006.01)
(Continued)

(52) U.S. Cl.
CPC ............ *B24B 37/24* (2013.01); *B29C 64/112* (2017.08); *B33Y 10/00* (2014.12); *B33Y 70/10* (2020.01);
(Continued)

(58) Field of Classification Search
CPC ......... B24B 37/24; B33Y 10/00; B33Y 70/00; B33Y 80/00; B29C 64/112; C08F 283/008; B29L 2031/736
See application file for complete search history.

(56) References Cited

U.S. PATENT DOCUMENTS 2,001,911 A   5/1935  Wooddell et al.
3,357,598 A   12/1967  Kraft
(Continued)

FOREIGN PATENT DOCUMENTS

CN    1851896 A    10/2006
CN    1897226 A    1/2007
(Continued)

OTHER PUBLICATIONS

International Search Report and Written Opinion for International Application No. PCT/US2019/044710 dated Nov. 15, 2019.
(Continued)

*Primary Examiner* — Larry W Thrower
(74) *Attorney, Agent, or Firm* — Patterson + Sheridan, LLP

(57) ABSTRACT

Methods and formulations for manufacturing polishing articles used in polishing processes are provided. In one implementation, a UV curable resin precursor composition is provided. The UV curable resin precursor comprises a precursor formulation. The precursor formulation comprises a first resin precursor component that comprises a semi-crystalline radiation curable oligomeric material, wherein the semi-crystalline radiation curable oligomeric material is
(Continued)

selected from a semi-crystalline aliphatic polyester urethane acrylate, a semi-crystalline aliphatic polycarbonate urethane acrylate, a semi-crystalline aliphatic polyether urethane acrylate, or combinations thereof. The precursor formulation further comprises a second resin precursor component that comprises a monofunctional or multifunctional acrylate monomer. The resin precursor formulation further comprises a photoinitiator, wherein the precursor formulation has a viscosity that enables the precursor formulation to be dispensed to form a portion of a polishing article by an additive manufacturing process.

19 Claims, 10 Drawing Sheets

(51) Int. Cl.
  *B33Y 10/00* (2015.01)
  *B29C 64/112* (2017.01)
  *B33Y 70/10* (2020.01)
  *B29L 31/00* (2006.01)
  *B33Y 80/00* (2015.01)

(52) U.S. Cl.
  CPC ..... *C08F 283/008* (2013.01); *B29L 2031/736* (2013.01); *B33Y 80/00* (2014.12)

(56) References Cited

U.S. PATENT DOCUMENTS

| | | |
|---|---|---|
| 3,741,116 A | 6/1973 | Green et al. |
| 4,459,779 A | 7/1984 | Shen |
| 4,575,330 A | 3/1986 | Hull |
| 4,836,832 A | 6/1989 | Tumey et al. |
| 4,841,680 A | 6/1989 | Hoffstein et al. |
| 4,844,144 A | 7/1989 | Murphy et al. |
| 4,942,001 A | 7/1990 | Murphy et al. |
| 4,960,673 A | 10/1990 | Beck et al. |
| 5,096,530 A | 3/1992 | Cohen |
| 5,120,476 A | 6/1992 | Scholz |
| 5,121,329 A | 6/1992 | Crump |
| 5,178,646 A | 1/1993 | Barber, Jr. et al. |
| 5,193,316 A | 3/1993 | Olmstead |
| 5,212,910 A | 5/1993 | Breivogel et al. |
| 5,287,663 A | 2/1994 | Pierce et al. |
| 5,300,417 A | 4/1994 | Lushington et al. |
| 5,378,527 A | 1/1995 | Nakanishi et al. |
| 5,387,380 A | 2/1995 | Cima et al. |
| 5,470,368 A | 11/1995 | Culler |
| 5,533,923 A | 7/1996 | Shamouilian et al. |
| 5,605,499 A | 2/1997 | Sugiyama et al. |
| 5,605,760 A | 2/1997 | Roberts |
| 5,609,517 A | 3/1997 | Lofaro |
| 5,624,303 A | 4/1997 | Robinson |
| 5,626,919 A | 5/1997 | Chapman et al. |
| 5,645,471 A | 7/1997 | Strecker |
| 5,664,986 A | 9/1997 | Roh |
| 5,690,540 A | 11/1997 | Elliott et al. |
| 5,738,574 A | 4/1998 | Tolles et al. |
| 5,748,434 A | 5/1998 | Rossman et al. |
| 5,778,481 A | 7/1998 | Amsden et al. |
| 5,795,218 A | 8/1998 | Doan et al. |
| 5,876,268 A | 3/1999 | Lamphere et al. |
| 5,876,490 A | 3/1999 | Ronay |
| 5,888,121 A | 3/1999 | Kirchner et al. |
| 5,900,164 A | 5/1999 | Budinger et al. |
| 5,905,099 A | 5/1999 | Everaerts et al. |
| 5,906,863 A | 5/1999 | Lombardi et al. |
| 5,910,471 A | 6/1999 | Christianson et al. |
| 5,919,082 A | 7/1999 | Walker et al. |
| 5,921,855 A | 7/1999 | Osterheld et al. |
| 5,932,040 A | 8/1999 | Audisio |
| 5,932,290 A | 8/1999 | Lombardi et al. |
| 5,940,674 A | 8/1999 | Sachs et al. |
| 5,944,583 A | 8/1999 | Cruz et al. |
| 5,951,380 A | 9/1999 | Kim |
| 5,965,460 A | 10/1999 | Rach et al. |
| 5,976,000 A | 11/1999 | Hudson |
| 5,984,769 A | 11/1999 | Bennett et al. |
| 5,989,111 A | 11/1999 | Lamphere et al. |
| 5,989,470 A | 11/1999 | Doan et al. |
| 6,017,609 A | 1/2000 | Akamatsu et al. |
| 6,022,264 A | 2/2000 | Cook et al. |
| 6,029,096 A | 2/2000 | Manners et al. |
| 6,036,579 A | 3/2000 | Cook et al. |
| 6,039,836 A | 3/2000 | Dhindsa et al. |
| 6,062,968 A | 5/2000 | Sevilla et al. |
| 6,077,581 A | 6/2000 | Kuramochi et al. |
| 6,090,475 A | 7/2000 | Robinson et al. |
| 6,095,084 A | 8/2000 | Shamouilian et al. |
| 6,095,902 A | 8/2000 | Reinhardt |
| 6,117,000 A | 9/2000 | Anjur et al. |
| 6,121,143 A | 9/2000 | Messner et al. |
| 6,122,564 A | 9/2000 | Koch et al. |
| 6,126,532 A | 10/2000 | Sevilla et al. |
| 6,155,910 A | 12/2000 | Lamphere et al. |
| 6,176,992 B1 | 1/2001 | Talieh |
| 6,201,208 B1 | 3/2001 | Wendt et al. |
| 6,206,759 B1 | 3/2001 | Agarwal et al. |
| 6,210,254 B1 | 4/2001 | Cook et al. |
| 6,213,845 B1 | 4/2001 | Elledge |
| 6,228,133 B1 | 5/2001 | Thurber et al. |
| 6,231,629 B1 | 5/2001 | Christianson et al. |
| 6,231,942 B1 | 5/2001 | Blizard et al. |
| 6,232,236 B1 | 5/2001 | Shan et al. |
| 6,241,596 B1 | 6/2001 | Dsterheld et al. |
| 6,254,460 B1 | 7/2001 | Walker et al. |
| 6,257,973 B1 | 7/2001 | Fernand Guiselin |
| 6,267,641 B1 | 7/2001 | Vanell et al. |
| 6,273,806 B1 | 8/2001 | Bennett et al. |
| 6,309,276 B1 | 10/2001 | Tsai et al. |
| 6,309,282 B1 | 10/2001 | Wright et al. |
| 6,319,108 B1 | 11/2001 | Adefris et al. |
| 6,322,728 B1 | 11/2001 | Brodkin et al. |
| 6,325,706 B1 | 12/2001 | Krusell et al. |
| 6,328,634 B1 | 12/2001 | Shen et al. |
| 6,332,832 B1 | 12/2001 | Suzuki |
| 6,338,901 B1 | 1/2002 | Veerasamy |
| 6,361,411 B1 | 3/2002 | Chopra et al. |
| 6,361,832 B1 | 3/2002 | Agarwal et al. |
| 6,368,184 B1 | 4/2002 | Beckage |
| 6,390,890 B1 | 5/2002 | Molnar |
| 6,399,501 B2 | 6/2002 | Birang et al. |
| 6,402,604 B2 | 6/2002 | Guiselin |
| 6,407,669 B1 | 6/2002 | Brown et al. |
| 6,423,255 B1 | 7/2002 | Hoechsmann et al. |
| 6,428,586 B1 | 8/2002 | Yancey |
| 6,454,634 B1 | 9/2002 | James et al. |
| 6,477,926 B1 | 11/2002 | Swisher et al. |
| 6,488,570 B1 | 12/2002 | James et al. |
| 6,500,053 B2 | 12/2002 | James et al. |
| 6,506,097 B1 | 1/2003 | Adams et al. |
| 6,518,162 B2 | 2/2003 | Ono et al. |
| 6,520,834 B1 | 2/2003 | Marshall |
| 6,520,847 B2 | 2/2003 | Osterheld et al. |
| 6,544,373 B2 | 4/2003 | Chen et al. |
| 6,548,407 B1 | 4/2003 | Chopra et al. |
| 6,569,373 B2 | 5/2003 | Napadensky |
| 6,582,283 B2 | 6/2003 | James et al. |
| 6,585,563 B1 | 7/2003 | Redeker et al. |
| 6,586,494 B2 | 7/2003 | Mejiritski et al. |
| 6,592,443 B1 | 7/2003 | Kramer et al. |
| 6,641,463 B1 | 11/2003 | Molnar |
| 6,641,471 B1 | 11/2003 | Pinheiro et al. |
| 6,645,061 B1 | 11/2003 | Bennett et al. |
| 6,682,402 B1 | 1/2004 | Roberts et al. |
| 6,684,704 B1 | 2/2004 | Obeng |
| 6,685,548 B2 | 2/2004 | Chen et al. |
| 6,692,338 B1 | 2/2004 | Kirchner |
| 6,699,115 B2 | 3/2004 | Osterheld et al. |
| 6,719,818 B1 | 4/2004 | Birang et al. |
| 6,736,709 B1 | 5/2004 | James et al. |

(56) References Cited

U.S. PATENT DOCUMENTS

| | | | |
|---|---|---|---|
| 6,736,714 | B2 | 5/2004 | Dudovicz |
| 6,746,225 | B1 | 6/2004 | McHugh |
| 6,746,311 | B1 | 6/2004 | Kessel |
| 6,749,485 | B1 | 6/2004 | James et al. |
| 6,749,714 | B1 | 6/2004 | Ishikawa et al. |
| 6,773,474 | B2 | 8/2004 | Koehnle et al. |
| 6,783,436 | B1 | 8/2004 | Muldowney |
| 6,790,883 | B2 | 9/2004 | Ogawa et al. |
| 6,796,880 | B2 | 9/2004 | Redeker et al. |
| 6,811,680 | B2 | 11/2004 | Chen et al. |
| 6,811,937 | B2 | 11/2004 | Lawton |
| 6,815,570 | B1 | 11/2004 | Negiz et al. |
| 6,833,046 | B2 | 12/2004 | Wright |
| 6,838,149 | B2 | 1/2005 | Lugg |
| 6,840,843 | B2 | 1/2005 | Jones et al. |
| 6,843,711 | B1 | 1/2005 | Muldowney |
| 6,847,014 | B1 | 1/2005 | Benjamin et al. |
| 6,855,588 | B1 | 2/2005 | Liao et al. |
| 6,860,793 | B2 | 3/2005 | Budinger et al. |
| 6,860,802 | B1 | 3/2005 | Vishwanathan et al. |
| 6,866,807 | B2 | 3/2005 | Comb et al. |
| 6,869,350 | B2 | 3/2005 | Roberts et al. |
| 6,875,096 | B2 | 4/2005 | Park et al. |
| 6,875,097 | B2 | 4/2005 | Grunwald |
| 6,896,593 | B2 | 5/2005 | Prasad |
| 6,896,765 | B2 | 5/2005 | Steger |
| 6,913,517 | B2 | 7/2005 | Prasad |
| 6,935,931 | B2 | 8/2005 | Prasad |
| 6,950,193 | B1 | 9/2005 | Discenzo |
| 6,955,588 | B1 | 10/2005 | Anderson, II et al. |
| 6,984,163 | B2 | 1/2006 | Roberts |
| 6,991,517 | B2 | 1/2006 | Redeker et al. |
| 6,991,528 | B2 | 1/2006 | Hu et al. |
| 6,998,166 | B2 | 2/2006 | Prasad |
| 7,018,560 | B2 | 3/2006 | Liu et al. |
| 7,029,747 | B2 | 4/2006 | Huh et al. |
| 7,044,836 | B2 | 5/2006 | Sun et al. |
| 7,059,949 | B1 | 6/2006 | Elmufdi et al. |
| 7,059,950 | B1 | 6/2006 | Muldowney |
| 7,077,879 | B2 | 7/2006 | Ogawa et al. |
| 7,120,512 | B2 | 10/2006 | Kramer et al. |
| 7,125,318 | B2 | 10/2006 | Muldowney |
| 7,132,033 | B2 | 11/2006 | Boldizar et al. |
| 7,166,017 | B2 | 1/2007 | Minamihaba et al. |
| 7,169,030 | B1 | 1/2007 | Kulp |
| 7,186,164 | B2 | 3/2007 | Manens |
| 7,186,322 | B2 | 3/2007 | Sato et al. |
| 7,192,336 | B2 | 3/2007 | Kramer et al. |
| 7,195,544 | B2 | 3/2007 | Prasad |
| 7,204,742 | B2 | 4/2007 | Prasad |
| 7,234,224 | B1 | 6/2007 | Naugler et al. |
| 7,252,871 | B2 | 8/2007 | Crkvenac et al. |
| 7,264,641 | B2 | 9/2007 | Prasad |
| 7,267,607 | B2 | 9/2007 | Prasad |
| 7,267,610 | B1 | 9/2007 | Elmufdi et al. |
| 7,268,173 | B2 | 9/2007 | Graichen et al. |
| 7,300,340 | B1 | 11/2007 | Elmufdi et al. |
| 7,300,619 | B2 | 11/2007 | Napadensky et al. |
| 7,311,590 | B1 | 12/2007 | Muldowney |
| 7,311,862 | B2 | 12/2007 | Prasad |
| 7,332,104 | B2 | 2/2008 | Minamihaba et al. |
| 7,357,698 | B2 | 4/2008 | Choi |
| 7,371,160 | B1 | 5/2008 | Cruz et al. |
| 7,377,840 | B2 | 5/2008 | Deopura et al. |
| 7,382,959 | B1 | 6/2008 | Jacobsen |
| 7,425,172 | B2 | 9/2008 | Misra et al. |
| 7,425,250 | B2 | 9/2008 | Basol et al. |
| 7,427,340 | B2 | 9/2008 | Mavliev et al. |
| 7,435,161 | B2 | 10/2008 | Prasad et al. |
| 7,435,165 | B2 | 10/2008 | Prasad |
| 7,438,636 | B2 | 10/2008 | Kulp et al. |
| 7,445,847 | B2 | 11/2008 | Kulp |
| 7,455,571 | B1 | 11/2008 | Kuo et al. |
| 7,497,885 | B2 | 3/2009 | Kollodge |
| 7,513,818 | B2 | 4/2009 | Miller et al. |
| 7,517,277 | B2 | 4/2009 | Muldowney |
| 7,517,488 | B2 | 4/2009 | Saikin |
| 7,520,798 | B2 | 4/2009 | Muldowney |
| 7,524,345 | B2 | 4/2009 | Nevoret et al. |
| 7,530,880 | B2 | 5/2009 | Bajaj et al. |
| 7,531,117 | B2 | 5/2009 | Ederer et al. |
| 7,537,446 | B2 | 5/2009 | James et al. |
| 7,582,127 | B2 | 9/2009 | Vacassy et al. |
| 7,635,290 | B2 | 12/2009 | Muldowney |
| 7,648,645 | B2 | 1/2010 | Roberts et al. |
| 7,652,286 | B2 | 1/2010 | Isobe et al. |
| 7,699,684 | B2 | 4/2010 | Prasad |
| 7,704,122 | B2 | 4/2010 | Misra et al. |
| 7,704,125 | B2 | 4/2010 | Roy et al. |
| 7,731,568 | B2 | 6/2010 | Shimomura et al. |
| 7,754,118 | B2 | 7/2010 | Huh et al. |
| 7,758,764 | B2 | 7/2010 | Dhindsa et al. |
| 7,762,870 | B2 | 7/2010 | Ono et al. |
| 7,815,778 | B2 | 10/2010 | Bajaj |
| 7,828,634 | B2 | 11/2010 | Jiang et al. |
| 7,840,305 | B2 | 11/2010 | Behr et al. |
| 7,846,008 | B2 | 12/2010 | Bajaj |
| 7,871,309 | B2 | 1/2011 | Ogawa et al. |
| 7,875,091 | B2 | 1/2011 | Nevoret et al. |
| 7,926,521 | B2 | 4/2011 | Izumoto et al. |
| 7,935,276 | B2 | 5/2011 | Zhou et al. |
| 7,943,681 | B2 | 5/2011 | Lee et al. |
| 7,976,901 | B2 | 7/2011 | Kume et al. |
| 8,047,899 | B2 | 11/2011 | Chen et al. |
| 8,053,487 | B2 | 11/2011 | Ragain, Jr. et al. |
| 8,057,282 | B2 | 11/2011 | Muldowney |
| 8,062,102 | B2 | 11/2011 | Park et al. |
| 8,062,103 | B2 | 11/2011 | Muldowney |
| 8,066,555 | B2 | 11/2011 | Bajaj |
| 8,067,814 | B2 | 11/2011 | Takehara et al. |
| 8,075,372 | B2 | 12/2011 | Prasad |
| 8,075,745 | B2 | 12/2011 | Bajaj |
| 8,083,820 | B2 | 12/2011 | Kollodge et al. |
| 8,111,603 | B2 | 2/2012 | Nishimura et al. |
| 8,118,641 | B2 | 2/2012 | Kulp et al. |
| 8,142,860 | B2 | 3/2012 | Vanmaele et al. |
| 8,142,869 | B2 | 3/2012 | Kobayashi et al. |
| 8,172,648 | B2 | 5/2012 | Lefevre et al. |
| 8,177,603 | B2 | 5/2012 | Bajaj |
| 8,211,324 | B2 | 7/2012 | Dhindsa et al. |
| 8,211,543 | B2 | 7/2012 | Kato et al. |
| 8,257,545 | B2 | 9/2012 | Loyack et al. |
| 8,260,447 | B2 | 9/2012 | Mattes et al. |
| 8,282,866 | B2 | 10/2012 | Hiraide |
| 8,287,793 | B2 | 10/2012 | Deopura et al. |
| 8,288,448 | B2 | 10/2012 | Kulp |
| 8,292,592 | B2 | 10/2012 | Welch et al. |
| 8,292,692 | B2 | 10/2012 | Bajaj |
| 8,337,282 | B2 | 12/2012 | Park et al. |
| 8,349,706 | B2 | 1/2013 | Noda |
| 8,377,623 | B2 | 2/2013 | Fong |
| 8,380,339 | B2 | 2/2013 | Misra et al. |
| 8,388,410 | B2 | 3/2013 | Mbright, Jr. |
| 8,393,934 | B2 | 3/2013 | Sung |
| 8,398,461 | B2 | 3/2013 | Wang |
| 8,398,466 | B2 | 3/2013 | Sung et al. |
| 8,409,976 | B2 | 4/2013 | Hieslmair |
| 8,444,890 | B2 | 5/2013 | Drury |
| 8,545,292 | B2 | 10/2013 | Shinchi et al. |
| 8,546,717 | B2 | 10/2013 | Stecker |
| 8,562,389 | B2 | 10/2013 | Benvegnu et al. |
| 8,563,619 | B2 | 10/2013 | Dhindsa et al. |
| 8,598,523 | B2 | 12/2013 | Stecker et al. |
| 8,602,851 | B2 | 12/2013 | Lombardo et al. |
| 8,647,179 | B2 | 2/2014 | Nakayama et al. |
| 8,673,166 | B2 | 3/2014 | Okita et al. |
| 8,676,537 | B2 | 3/2014 | Liu et al. |
| 8,684,794 | B2 | 4/2014 | Lefevre et al. |
| 8,690,978 | B2 | 4/2014 | Arnaud et al. |
| 8,702,479 | B2 | 4/2014 | Huang et al. |
| 8,709,114 | B2 | 4/2014 | Cantrell et al. |
| 8,712,571 | B2 | 4/2014 | Liu et al. |
| 8,715,035 | B2 | 5/2014 | Roy et al. |
| 8,734,206 | B2 | 5/2014 | Chang et al. |

(56) References Cited

U.S. PATENT DOCUMENTS

| | | |
|---|---|---|
| 8,734,664 B2 | 5/2014 | Yang et al. |
| 8,784,721 B2 | 7/2014 | Philippi et al. |
| 8,801,949 B2 | 8/2014 | Lakrout et al. |
| 8,821,214 B2 | 9/2014 | Joseph |
| 8,845,852 B2 | 9/2014 | Nakamori et al. |
| 8,853,082 B2 | 10/2014 | Hanano et al. |
| 8,853,527 B2 | 10/2014 | Hieslmair |
| 8,864,859 B2 | 10/2014 | Roy et al. |
| 8,883,392 B2 | 11/2014 | Napadensky et al. |
| 8,888,480 B2 | 11/2014 | Yoo et al. |
| 8,894,799 B2 | 11/2014 | Lakrout |
| 8,932,116 B2 | 1/2015 | Deopura et al. |
| 8,932,511 B2 | 1/2015 | Napadensky |
| 8,968,058 B2 | 3/2015 | Kerprich et al. |
| 8,980,749 B1 | 3/2015 | Itai et al. |
| 8,986,585 B2 | 3/2015 | Cantrell et al. |
| 8,988,848 B2 | 3/2015 | Todorow et al. |
| 9,017,140 B2 | 4/2015 | Allison et al. |
| 9,033,764 B2 | 5/2015 | Kitamura et al. |
| 9,053,908 B2 | 6/2015 | Sriraman et al. |
| 9,067,297 B2 | 6/2015 | Allison et al. |
| 9,067,298 B2 | 6/2015 | Lefevre et al. |
| 9,067,299 B2 | 6/2015 | Bajaj et al. |
| 9,068,085 B2 | 6/2015 | Kim et al. |
| 9,089,943 B2 | 7/2015 | Lipson |
| 9,108,291 B2 | 8/2015 | Lakrout |
| 9,126,304 B2 | 9/2015 | Kimura |
| 9,138,858 B2 | 9/2015 | Benvegnu et al. |
| 9,152,006 B2 | 10/2015 | Farrand et al. |
| 9,152,340 B2 | 10/2015 | Wu et al. |
| 9,156,124 B2 | 10/2015 | Allison et al. |
| 9,162,340 B2 | 10/2015 | Joseph et al. |
| 9,162,341 B2 | 10/2015 | LeFevre et al. |
| 9,211,628 B2 | 12/2015 | Allison et al. |
| 9,216,546 B2 | 12/2015 | DeSimone et al. |
| 9,254,545 B2 | 2/2016 | Park |
| 9,259,820 B2 | 2/2016 | Qian et al. |
| 9,259,821 B2 | 2/2016 | Qian et al. |
| 9,278,424 B2 | 3/2016 | Roy et al. |
| 9,296,085 B2 | 3/2016 | Bajaj et al. |
| 9,308,620 B2 | 4/2016 | Schutte et al. |
| 9,314,897 B2 | 4/2016 | Qian et al. |
| 9,333,620 B2 | 5/2016 | Qian et al. |
| 9,352,443 B2 | 5/2016 | Suen et al. |
| 9,375,821 B2 | 6/2016 | Chen et al. |
| 9,375,822 B2 | 6/2016 | Hsu et al. |
| 9,393,740 B2 | 7/2016 | Okamoto et al. |
| 9,421,666 B2 | 8/2016 | Krishnan et al. |
| 9,425,121 B2 | 8/2016 | Tsai et al. |
| 9,457,520 B2 | 10/2016 | Bajaj et al. |
| 9,472,410 B2 | 10/2016 | Sadjadi et al. |
| 9,481,069 B2 | 11/2016 | Chen et al. |
| 9,505,952 B2 | 11/2016 | Reiss et al. |
| 9,536,711 B2 | 1/2017 | Dhindsa et al. |
| 9,536,769 B1 | 1/2017 | Sadjadi et al. |
| 9,583,357 B1 | 2/2017 | Long et al. |
| 9,587,127 B2 | 3/2017 | Herlihy et al. |
| 9,601,319 B1 | 3/2017 | Bravo et al. |
| 9,620,376 B2 | 4/2017 | Kamp et al. |
| 9,630,249 B2 | 4/2017 | Toyserkani et al. |
| 9,669,512 B2 | 6/2017 | Bajaj et al. |
| 9,718,129 B2 | 8/2017 | Ljungblad et al. |
| 9,735,037 B2 | 8/2017 | Cox |
| 9,744,724 B2 | 8/2017 | Bajaj et al. |
| 9,761,459 B2 | 9/2017 | Long et al. |
| 9,776,361 B2 | 10/2017 | Krishnan et al. |
| 9,805,965 B2 | 10/2017 | Sadjadi et al. |
| 9,852,889 B1 | 12/2017 | Kellogg et al. |
| 9,868,230 B2 | 1/2018 | Dikovsky et al. |
| 9,873,180 B2 | 1/2018 | Bajaj et al. |
| 9,881,820 B2 | 1/2018 | Wong et al. |
| 9,950,405 B2 | 4/2018 | Deng |
| 9,951,054 B2 | 4/2018 | Li et al. |
| 9,956,314 B2 | 5/2018 | Skaria et al. |
| 9,993,907 B2 | 6/2018 | Murugesh et al. |
| 10,005,236 B2 | 6/2018 | Yudovin-Farber et al. |
| 10,016,877 B2 | 7/2018 | Krishnan et al. |
| 10,029,405 B2 | 7/2018 | Bajaj et al. |
| 10,086,500 B2 | 10/2018 | Orilall et al. |
| 10,115,568 B2 | 10/2018 | Kellogg et al. |
| 10,220,487 B2 | 3/2019 | Roy et al. |
| 10,245,704 B2 | 4/2019 | Eilers et al. |
| 10,322,491 B2 | 6/2019 | Orilall et al. |
| 10,335,994 B2 | 7/2019 | Napadensky et al. |
| 10,347,500 B1 | 7/2019 | Doh et al. |
| 10,384,330 B2 | 8/2019 | Bajaj et al. |
| 10,391,605 B2 | 8/2019 | Ganapathiappan et al. |
| 10,399,201 B2 | 9/2019 | Ganapathiappan et al. |
| 10,406,599 B2 | 9/2019 | Ljungblad et al. |
| 10,406,801 B2 | 9/2019 | Bell et al. |
| 10,456,886 B2 | 10/2019 | Ganapathiappan et al. |
| 10,483,235 B2 | 11/2019 | Chiao et al. |
| 10,493,691 B2 | 12/2019 | Krishnan et al. |
| 10,537,974 B2 | 1/2020 | Bajaj et al. |
| 10,580,657 B2 | 3/2020 | Doh et al. |
| 10,593,574 B2 | 3/2020 | Fung et al. |
| 10,618,141 B2 | 4/2020 | Chockalingam et al. |
| 10,675,789 B2 | 6/2020 | Dikovsky et al. |
| 10,685,862 B2 | 6/2020 | Rogers |
| 10,744,714 B2 | 8/2020 | Lopez et al. |
| 10,763,081 B2 | 9/2020 | Cui et al. |
| 10,773,509 B2 | 9/2020 | Ng et al. |
| 10,821,573 B2 | 11/2020 | Bajaj et al. |
| 10,840,062 B2 | 11/2020 | Nguyen et al. |
| 10,847,347 B2 | 11/2020 | Noorbakhsh et al. |
| 10,875,145 B2 | 12/2020 | Bajaj et al. |
| 10,875,153 B2 | 12/2020 | Bajaj et al. |
| 10,876,073 B2 | 12/2020 | Ishida |
| 10,916,408 B2 | 2/2021 | Dorf et al. |
| 10,919,123 B2 | 2/2021 | Hariharan et al. |
| 10,923,321 B2 | 2/2021 | Dorf et al. |
| 10,953,515 B2 | 3/2021 | Ganapathiappan et al. |
| 2001/0008830 A1 | 7/2001 | Tolles et al. |
| 2001/0019881 A1 | 9/2001 | Ohmoto et al. |
| 2001/0020448 A1 | 9/2001 | Vaartstra et al. |
| 2001/0029151 A1 | 10/2001 | Chopra |
| 2001/0034089 A1 | 10/2001 | Yamazaki et al. |
| 2001/0041511 A1 | 11/2001 | Lack et al. |
| 2001/0046834 A1 | 11/2001 | Ramana et al. |
| 2002/0016139 A1 | 2/2002 | Hirokawa et al. |
| 2002/0058396 A1 | 5/2002 | Roberts et al. |
| 2002/0058468 A1 | 5/2002 | Eppert et al. |
| 2002/0069591 A1 | 6/2002 | Yancey |
| 2002/0077036 A1 | 6/2002 | Roberts et al. |
| 2002/0083577 A1 | 7/2002 | Suzuki |
| 2002/0112632 A1 | 8/2002 | Faibish |
| 2002/0137450 A1 | 9/2002 | Osterheld et al. |
| 2002/0173248 A1 | 11/2002 | Doan et al. |
| 2003/0019570 A1 | 1/2003 | Chen et al. |
| 2003/0022611 A1 | 1/2003 | Bartlett et al. |
| 2003/0056870 A1 | 3/2003 | Comb et al. |
| 2003/0113509 A1 | 6/2003 | Lugg |
| 2003/0134581 A1 | 7/2003 | Wang et al. |
| 2003/0153253 A1 | 8/2003 | Hanamoto et al. |
| 2003/0153255 A1 | 8/2003 | Hasegawa et al. |
| 2003/0181137 A1 | 9/2003 | Redeker et al. |
| 2003/0205325 A1 | 11/2003 | Boyd et al. |
| 2003/0220061 A1 | 11/2003 | Prasad |
| 2004/0003895 A1 | 1/2004 | Amano et al. |
| 2004/0014413 A1 | 1/2004 | Kawahashi et al. |
| 2004/0033758 A1 | 2/2004 | Wiswesser |
| 2004/0055223 A1 | 3/2004 | Ono et al. |
| 2004/0058623 A1 | 3/2004 | Lin et al. |
| 2004/0092108 A1 | 5/2004 | Yajima et al. |
| 2004/0106367 A1 | 6/2004 | Walker et al. |
| 2004/0126575 A1 | 7/2004 | Koshida et al. |
| 2004/0133298 A1 | 7/2004 | Toyserkani et al. |
| 2004/0154533 A1 | 8/2004 | Agarwal et al. |
| 2004/0171340 A1 | 9/2004 | Prasad |
| 2004/0173946 A1 | 9/2004 | Pfeifer et al. |
| 2004/0175451 A1 | 9/2004 | Maekawa et al. |
| 2004/0180611 A1 | 9/2004 | Tajima et al. |
| 2004/0187714 A1 | 9/2004 | Napadensky et al. |
| 2004/0198185 A1 | 10/2004 | Redeker et al. |

(56) References Cited

U.S. PATENT DOCUMENTS

| | | |
|---|---|---|
| 2004/0224616 A1 | 11/2004 | Shiho et al. |
| 2004/0266326 A1 | 12/2004 | Shiho et al. |
| 2005/0003189 A1 | 1/2005 | Bredt et al. |
| 2005/0016868 A1 | 1/2005 | Basol et al. |
| 2005/0020082 A1 | 1/2005 | Vishwanathan et al. |
| 2005/0032464 A1 | 2/2005 | Swisher et al. |
| 2005/0051095 A1 | 3/2005 | Kikuchi et al. |
| 2005/0056622 A1 | 3/2005 | Steger |
| 2005/0062900 A1 | 3/2005 | Kim |
| 2005/0086869 A1 | 4/2005 | Park et al. |
| 2005/0098540 A1 | 5/2005 | Prasad |
| 2005/0101228 A1 | 5/2005 | Prasad |
| 2005/0110853 A1 | 5/2005 | Gardner et al. |
| 2005/0112998 A1 | 5/2005 | Matsuo et al. |
| 2005/0124262 A1 | 6/2005 | Manens |
| 2005/0153634 A1 | 7/2005 | Prasad et al. |
| 2005/0171224 A1 | 8/2005 | Kulp |
| 2005/0194681 A1 | 9/2005 | Hu et al. |
| 2005/0215177 A1 | 9/2005 | Prasad |
| 2005/0227590 A1 | 10/2005 | Sung |
| 2005/0250431 A1 | 11/2005 | Shih et al. |
| 2005/0260928 A1 | 11/2005 | Huh et al. |
| 2005/0260939 A1 | 11/2005 | Andrews et al. |
| 2005/0261150 A1 | 11/2005 | Yonker et al. |
| 2005/0276967 A1 | 12/2005 | Prasad |
| 2005/0284536 A1 | 12/2005 | Kojima et al. |
| 2006/0014475 A1 | 1/2006 | Sekiya |
| 2006/0019587 A1 | 1/2006 | Deopura et al. |
| 2006/0024434 A1 | 2/2006 | Wang et al. |
| 2006/0052040 A1 | 3/2006 | Prasad |
| 2006/0079159 A1 | 4/2006 | Naujok et al. |
| 2006/0096179 A1 | 5/2006 | Lu et al. |
| 2006/0125133 A1 | 6/2006 | Huh et al. |
| 2006/0160478 A1 | 7/2006 | Donohue et al. |
| 2006/0185256 A1 | 8/2006 | Nevoret et al. |
| 2006/0189269 A1 | 8/2006 | Roy et al. |
| 2006/0192315 A1 | 8/2006 | Farr et al. |
| 2006/0226567 A1 | 10/2006 | James et al. |
| 2006/0249369 A1 | 11/2006 | Marangon et al. |
| 2006/0252900 A1 | 11/2006 | Bowman et al. |
| 2006/0276109 A1 | 12/2006 | Roy et al. |
| 2007/0007698 A1 | 1/2007 | Sano |
| 2007/0009606 A1 | 1/2007 | Serdy et al. |
| 2007/0032170 A1 | 2/2007 | Halley et al. |
| 2007/0037486 A1 | 2/2007 | Kang et al. |
| 2007/0054599 A1 | 3/2007 | Taylor et al. |
| 2007/0093185 A1 | 4/2007 | Naik |
| 2007/0117393 A1 | 5/2007 | Tregub et al. |
| 2007/0128874 A1 | 6/2007 | Shida et al. |
| 2007/0128991 A1 | 6/2007 | Yoon et al. |
| 2007/0149094 A1 | 6/2007 | Choi |
| 2007/0149096 A1 | 6/2007 | Nishimura et al. |
| 2007/0204420 A1 | 9/2007 | Hornby et al. |
| 2007/0212979 A1 | 9/2007 | Preston |
| 2007/0221287 A1 | 9/2007 | Izumoto |
| 2007/0235133 A1 | 10/2007 | Benassi |
| 2007/0235904 A1 | 10/2007 | Saikin |
| 2007/0243795 A1 | 10/2007 | Kobayashi et al. |
| 2007/0269987 A1 | 11/2007 | Nakano et al. |
| 2008/0004743 A1 | 1/2008 | Goers et al. |
| 2008/0009228 A1 | 1/2008 | Nagase et al. |
| 2008/0057845 A1 | 3/2008 | Prasad |
| 2008/0060734 A1 | 3/2008 | Stehle |
| 2008/0105818 A1 | 5/2008 | Cohen |
| 2008/0157436 A1 | 7/2008 | Patel et al. |
| 2008/0207100 A1 | 8/2008 | Roy et al. |
| 2008/0211141 A1 | 9/2008 | Deopura et al. |
| 2008/0220702 A1 | 9/2008 | Feng et al. |
| 2008/0255823 A1 | 10/2008 | Grant |
| 2008/0268760 A1 | 10/2008 | Bajaj et al. |
| 2008/0314878 A1 | 12/2008 | Cai et al. |
| 2009/0011679 A1 | 1/2009 | Bajaj et al. |
| 2009/0053976 A1 | 2/2009 | Roy et al. |
| 2009/0053983 A1 | 2/2009 | Hosaka et al. |
| 2009/0071938 A1 | 3/2009 | Dhindsa et al. |
| 2009/0093201 A1 | 4/2009 | Kazuno et al. |
| 2009/0094902 A1 | 4/2009 | Hou |
| 2009/0105363 A1 | 4/2009 | Napadensky |
| 2009/0130956 A1 | 5/2009 | Ohta et al. |
| 2009/0133716 A1 | 5/2009 | Lee |
| 2009/0137121 A1 | 5/2009 | Hsu et al. |
| 2009/0169455 A1 | 7/2009 | Van Aert et al. |
| 2009/0206065 A1 | 8/2009 | Kruth et al. |
| 2009/0223810 A1 | 9/2009 | Dhindsa et al. |
| 2009/0253353 A1 | 10/2009 | Ogawa et al. |
| 2009/0270019 A1 | 10/2009 | Bajaj |
| 2009/0308553 A1 | 12/2009 | Souzy et al. |
| 2009/0308739 A1 | 12/2009 | Riker et al. |
| 2009/0311955 A1 | 12/2009 | Kerprich et al. |
| 2009/0318062 A1 | 12/2009 | Chiu et al. |
| 2009/0320379 A1 | 12/2009 | Jun et al. |
| 2009/0321979 A1 | 12/2009 | Hiraide |
| 2010/0007692 A1 | 1/2010 | Vanmaele et al. |
| 2010/0009612 A1 | 1/2010 | Park et al. |
| 2010/0011672 A1 | 1/2010 | Kincaid et al. |
| 2010/0018648 A1 | 1/2010 | Collins et al. |
| 2010/0087128 A1 | 4/2010 | Nakayama et al. |
| 2010/0112919 A1 | 5/2010 | Bonner et al. |
| 2010/0120249 A1 | 5/2010 | Hirose et al. |
| 2010/0120343 A1 | 5/2010 | Kato et al. |
| 2010/0130112 A1 | 5/2010 | Bajaj |
| 2010/0140850 A1 | 6/2010 | Napadensky et al. |
| 2010/0203815 A1 | 8/2010 | Bajaj |
| 2010/0210197 A1 | 8/2010 | Matsumura et al. |
| 2010/0221489 A1 | 9/2010 | Lappalainen et al. |
| 2010/0323050 A1 | 12/2010 | Kumagai et al. |
| 2010/0326957 A1 | 12/2010 | Maeda et al. |
| 2011/0011217 A1 | 1/2011 | Kojima |
| 2011/0011535 A1 | 1/2011 | Dhindsa et al. |
| 2011/0014858 A1 | 1/2011 | Tsai et al. |
| 2011/0045199 A1 | 2/2011 | Cong |
| 2011/0045744 A1 | 2/2011 | Feng et al. |
| 2011/0048772 A1 | 3/2011 | Han |
| 2011/0059247 A1 | 3/2011 | Kuzusako et al. |
| 2011/0077321 A1 | 3/2011 | Napadensky |
| 2011/0130077 A1 | 6/2011 | Litke et al. |
| 2011/0171890 A1 | 7/2011 | Nakayama et al. |
| 2011/0180952 A1 | 7/2011 | Napadensky |
| 2011/0183583 A1 | 7/2011 | Joseph |
| 2011/0204538 A1 | 8/2011 | Drury |
| 2011/0277789 A1 | 11/2011 | Benson |
| 2011/0277877 A1 | 11/2011 | Stehle |
| 2012/0000887 A1 | 1/2012 | Eto et al. |
| 2012/0094487 A1 | 4/2012 | Kranz et al. |
| 2012/0178348 A1 | 7/2012 | Hsu et al. |
| 2012/0178845 A1 | 7/2012 | Napadensky et al. |
| 2012/0281334 A1 | 11/2012 | Sasaki et al. |
| 2012/0302148 A1 | 11/2012 | Bajaj et al. |
| 2012/0315830 A1 | 12/2012 | Joseph et al. |
| 2013/0012108 A1 | 1/2013 | Li et al. |
| 2013/0017769 A1 | 1/2013 | Kimura |
| 2013/0019570 A1 | 1/2013 | Weible |
| 2013/0048018 A1 | 2/2013 | Wargo et al. |
| 2013/0052917 A1 | 2/2013 | Park |
| 2013/0055568 A1 | 3/2013 | Dusel et al. |
| 2013/0059506 A1 | 3/2013 | Qian et al. |
| 2013/0059509 A1 | 3/2013 | Deopura et al. |
| 2013/0072025 A1 | 3/2013 | Singh et al. |
| 2013/0102231 A1 | 4/2013 | Joseph et al. |
| 2013/0107415 A1 | 5/2013 | Banna et al. |
| 2013/0122705 A1 | 5/2013 | Babu et al. |
| 2013/0137350 A1 | 5/2013 | Allison et al. |
| 2013/0139851 A1 | 6/2013 | Sin et al. |
| 2013/0154175 A1 | 6/2013 | Todorow et al. |
| 2013/0172509 A1 | 7/2013 | Pawloski et al. |
| 2013/0183824 A1 | 7/2013 | Kwon et al. |
| 2013/0200494 A1 | 8/2013 | Chen et al. |
| 2013/0203258 A1 | 8/2013 | Chen et al. |
| 2013/0212951 A1 | 8/2013 | Ahn et al. |
| 2013/0231032 A1 | 9/2013 | Swedek et al. |
| 2013/0247477 A1 | 9/2013 | Cantrell et al. |
| 2013/0283700 A1 | 10/2013 | Bajaj et al. |
| 2013/0287980 A1 | 10/2013 | Burdzy et al. |
| 2013/0288483 A1 | 10/2013 | Sadjadi et al. |

(56) References Cited

U.S. PATENT DOCUMENTS

| | | |
|---|---|---|
| 2013/0307194 A1 | 11/2013 | Elsey |
| 2013/0309951 A1 | 11/2013 | Benvegnu et al. |
| 2013/0316081 A1 | 11/2013 | Kovalcik et al. |
| 2013/0327977 A1 | 12/2013 | Singh et al. |
| 2013/0328228 A1 | 12/2013 | Pettis et al. |
| 2014/0024216 A1 | 1/2014 | Stender et al. |
| 2014/0034229 A1 | 2/2014 | Xu |
| 2014/0034239 A1 | 2/2014 | Yang et al. |
| 2014/0048970 A1 | 2/2014 | Batchelder et al. |
| 2014/0065932 A1 | 3/2014 | Kazuno et al. |
| 2014/0069584 A1 | 3/2014 | Yang et al. |
| 2014/0109784 A1 | 4/2014 | Daems et al. |
| 2014/0117575 A1 | 5/2014 | Kemperle et al. |
| 2014/0127973 A1 | 5/2014 | Motoshima et al. |
| 2014/0163717 A1 | 6/2014 | Das et al. |
| 2014/0206268 A1 | 7/2014 | Lefevre et al. |
| 2014/0230170 A1 | 8/2014 | Patel |
| 2014/0239527 A1 | 8/2014 | Lee |
| 2014/0324206 A1 | 10/2014 | Napadensky |
| 2014/0364044 A1 | 12/2014 | Ahn et al. |
| 2014/0370214 A1 | 12/2014 | Araki et al. |
| 2014/0370788 A1 | 12/2014 | Nair |
| 2015/0024233 A1 | 1/2015 | Gunther |
| 2015/0031781 A1 | 1/2015 | Landers et al. |
| 2015/0037601 A1 | 2/2015 | Blackmore |
| 2015/0038066 A1 | 2/2015 | Huang et al. |
| 2015/0043122 A1 | 2/2015 | Eto et al. |
| 2015/0044951 A1 | 2/2015 | Bajaj et al. |
| 2015/0045928 A1 | 2/2015 | Perez et al. |
| 2015/0056421 A1 | 2/2015 | Yudovin-Farber et al. |
| 2015/0056892 A1 | 2/2015 | Vacassy et al. |
| 2015/0056895 A1 | 2/2015 | Fotou et al. |
| 2015/0061170 A1 | 3/2015 | Engel et al. |
| 2015/0065020 A1 | 3/2015 | Roy et al. |
| 2015/0084238 A1 | 3/2015 | Bonassar et al. |
| 2015/0089881 A1 | 4/2015 | Stevenson et al. |
| 2015/0093977 A1 | 4/2015 | Deopura et al. |
| 2015/0114823 A1 | 4/2015 | Lee et al. |
| 2015/0115490 A1 | 4/2015 | Reinarz |
| 2015/0123298 A1 | 5/2015 | Napadensky |
| 2015/0126099 A1 | 5/2015 | Krishnan et al. |
| 2015/0129798 A1 | 5/2015 | Napadensky |
| 2015/0159046 A1 | 6/2015 | Dinega et al. |
| 2015/0174826 A1 | 6/2015 | Murugesh et al. |
| 2015/0216790 A1 | 8/2015 | Feng et al. |
| 2015/0221520 A1 | 8/2015 | Singh et al. |
| 2015/0252202 A1 | 9/2015 | Nerad |
| 2015/0375361 A1 | 12/2015 | Qian et al. |
| 2016/0052103 A1 | 2/2016 | Qian et al. |
| 2016/0068996 A1 | 3/2016 | Lau et al. |
| 2016/0073496 A1 | 3/2016 | Mncent |
| 2016/0101500 A1 | 4/2016 | Fung et al. |
| 2016/0107287 A1 | 4/2016 | Bajaj et al. |
| 2016/0107288 A1 | 4/2016 | Orilall et al. |
| 2016/0107290 A1 | 4/2016 | Bajaj et al. |
| 2016/0107295 A1 | 4/2016 | Bajaj et al. |
| 2016/0107381 A1 | 4/2016 | Krishnan et al. |
| 2016/0114458 A1 | 4/2016 | Bajaj et al. |
| 2016/0136787 A1 | 5/2016 | Bajaj et al. |
| 2016/0176021 A1 | 6/2016 | Orilall et al. |
| 2016/0198528 A1 | 7/2016 | Kitagawa |
| 2016/0221145 A1 | 8/2016 | Huang et al. |
| 2016/0229023 A1 | 8/2016 | Lugg et al. |
| 2016/0236279 A1 | 8/2016 | Ashton et al. |
| 2016/0252813 A1 | 9/2016 | Kitson |
| 2016/0257856 A1 | 9/2016 | Reiss et al. |
| 2016/0271869 A1 | 9/2016 | Van De Vrie et al. |
| 2016/0279757 A1 | 9/2016 | Qian et al. |
| 2016/0322242 A1 | 11/2016 | Nguyen et al. |
| 2016/0329244 A1 | 11/2016 | Chiao et al. |
| 2016/0346997 A1 | 12/2016 | Lewis et al. |
| 2016/0347002 A1 | 12/2016 | Bajaj et al. |
| 2016/0354901 A1 | 12/2016 | Krishnan et al. |
| 2016/0375546 A1 | 12/2016 | Pai et al. |
| 2017/0018411 A1 | 1/2017 | Sriraman et al. |
| 2017/0036320 A1 | 2/2017 | Prasad |
| 2017/0069462 A1 | 3/2017 | Kanarik et al. |
| 2017/0072466 A1 | 3/2017 | Zehavi et al. |
| 2017/0100817 A1 | 4/2017 | Ganapathiappan et al. |
| 2017/0110335 A1 | 4/2017 | Yang et al. |
| 2017/0113355 A1 | 4/2017 | Genetti et al. |
| 2017/0115657 A1 | 4/2017 | Trussell et al. |
| 2017/0117172 A1 | 4/2017 | Genetti et al. |
| 2017/0120416 A1 | 5/2017 | Chockalingam et al. |
| 2017/0133252 A1 | 5/2017 | Fung et al. |
| 2017/0136603 A1 | 5/2017 | Ganapathiappan et al. |
| 2017/0148539 A1 | 5/2017 | Prestayko et al. |
| 2017/0151648 A1 | 6/2017 | Huang et al. |
| 2017/0173865 A1 | 6/2017 | Dikovsky et al. |
| 2017/0178917 A1 | 6/2017 | Kamp et al. |
| 2017/0182629 A1 | 6/2017 | Lehuu et al. |
| 2017/0203406 A1 | 7/2017 | Ganapathiappan et al. |
| 2017/0203408 A1 | 7/2017 | Ganapathiappan et al. |
| 2017/0203409 A1 | 7/2017 | Lefevre et al. |
| 2017/0213753 A1 | 7/2017 | Rogers |
| 2017/0236688 A1 | 8/2017 | Caron et al. |
| 2017/0236741 A1 | 8/2017 | Angelov et al. |
| 2017/0236743 A1 | 8/2017 | Severson et al. |
| 2017/0239886 A1 | 8/2017 | Norikane |
| 2017/0250056 A1 | 8/2017 | Boswell et al. |
| 2017/0259396 A1 | 9/2017 | Yamamura et al. |
| 2017/0259499 A1 | 9/2017 | Ng et al. |
| 2017/0263478 A1 | 9/2017 | McChesney et al. |
| 2017/0274498 A1 | 9/2017 | Oh et al. |
| 2017/0316935 A1 | 11/2017 | Tan et al. |
| 2017/0330734 A1 | 11/2017 | Lee et al. |
| 2017/0330786 A1 | 11/2017 | Genetti et al. |
| 2017/0334074 A1 | 11/2017 | Genetti et al. |
| 2017/0338140 A1 | 11/2017 | Pape |
| 2017/0372912 A1 | 12/2017 | Long |
| 2018/0025891 A1 | 1/2018 | Marakhtanov et al. |
| 2018/0043613 A1 | 2/2018 | Krishnan et al. |
| 2018/0100073 A1 | 4/2018 | Chopra et al. |
| 2018/0100074 A1 | 4/2018 | Chopra et al. |
| 2018/0100075 A1 | 4/2018 | Chopra et al. |
| 2018/0158707 A1 | 6/2018 | Hunter et al. |
| 2018/0161954 A1 | 6/2018 | Bajaj et al. |
| 2018/0229343 A1 | 8/2018 | Kim et al. |
| 2018/0236632 A1 | 8/2018 | Murugesh et al. |
| 2018/0323042 A1 | 11/2018 | Wang et al. |
| 2018/0339397 A1 | 11/2018 | Redfield |
| 2018/0339402 A1 | 11/2018 | Redfield et al. |
| 2018/0339447 A1 | 11/2018 | Redfield |
| 2018/0340104 A1 | 11/2018 | Hampson et al. |
| 2018/0366305 A1 | 12/2018 | Nagami et al. |
| 2018/0371276 A1 | 12/2018 | Miyano |
| 2019/0030678 A1 | 1/2019 | Kumar et al. |
| 2019/0039204 A1 | 2/2019 | Chockalingam et al. |
| 2019/0047112 A1 | 2/2019 | Fu et al. |
| 2019/0198298 A1 | 6/2019 | Hirose et al. |
| 2019/0202024 A1 | 7/2019 | Ganapathiappan et al. |
| 2019/0218697 A1 | 7/2019 | Nakayama et al. |
| 2019/0224809 A1 | 7/2019 | Ganapathiappan et al. |
| 2019/0228952 A1 | 7/2019 | Dorf et al. |
| 2019/0299357 A1 | 10/2019 | Orilall et al. |
| 2019/0299537 A1 | 10/2019 | McClintock et al. |
| 2019/0322031 A1 | 10/2019 | Kritchman |
| 2019/0337117 A1 | 11/2019 | Ganapathiappan et al. |
| 2020/0001433 A1 | 1/2020 | Bajaj et al. |
| 2020/0055161 A1 | 2/2020 | Chockalingham et al. |
| 2020/0070302 A1 | 3/2020 | Ganapathiappan et al. |
| 2020/0101657 A1 | 4/2020 | Krishnan et al. |
| 2020/0135517 A1 | 4/2020 | Fung et al. |
| 2020/0147750 A1 | 5/2020 | Bajaj et al. |
| 2020/0156311 A1 | 5/2020 | Rolland et al. |
| 2020/0161098 A1 | 5/2020 | Cui |
| 2020/0230781 A1 | 7/2020 | Chockalingam et al. |
| 2020/0277423 A1* | 9/2020 | Guichard ............ C08F 222/145 |
| 2020/0299834 A1 | 9/2020 | Bajaj et al. |
| 2020/0325353 A1 | 10/2020 | Sridhar et al. |
| 2021/0013014 A1 | 1/2021 | Sarode Vishwanath |
| 2021/0039167 A1 | 2/2021 | Ashton et al. |

(56) References Cited

U.S. PATENT DOCUMENTS

| | | |
|---|---|---|
| 2021/0107116 A1 | 4/2021 | Bajaj et al. |
| 2021/0187822 A1 | 6/2021 | Yudovin-Farber et al. |
| 2021/0220857 A1 | 7/2021 | Baker et al. |

FOREIGN PATENT DOCUMENTS

| | | |
|---|---|---|
| CN | 101428404 A | 5/2009 |
| CN | 101612722 A | 12/2009 |
| CN | 201483382 U | 5/2010 |
| CN | 101642898 B | 9/2011 |
| CN | 202825512 U | 3/2013 |
| CN | 203542340 U | 4/2014 |
| CN | 103465155 B | 5/2016 |
| DE | 19834559 A1 | 2/2000 |
| EP | 1078717 A3 | 7/2003 |
| EP | 1419876 B1 | 4/2008 |
| EP | 2431157 A1 | 3/2012 |
| GB | 2362592 A | 11/2001 |
| JP | H07102724 B2 | 11/1995 |
| JP | H08132342 A | 5/1996 |
| JP | H11254542 A | 9/1999 |
| JP | H11347761 A | 12/1999 |
| JP | 2000061817 A | 2/2000 |
| JP | 2001018163 A | 1/2001 |
| JP | 200228849 A | 1/2002 |
| JP | 2002151447 A | 5/2002 |
| JP | 3324643 B2 | 9/2002 |
| JP | 2003303793 A | 10/2003 |
| JP | 2004235446 A | 8/2004 |
| JP | 3566430 B2 | 9/2004 |
| JP | 2004243518 A | 9/2004 |
| JP | 2004281685 A | 10/2004 |
| JP | 2005074614 A | 3/2005 |
| JP | 3641956 B2 | 4/2005 |
| JP | 2005-294661 A | 10/2005 |
| JP | 3801100 B2 | 7/2006 |
| JP | 2006231464 A | 9/2006 |
| JP | 2006305650 A | 11/2006 |
| JP | 2007-005612 A | 1/2007 |
| JP | 2007-235001 A | 9/2007 |
| JP | 4077192 B2 | 4/2008 |
| JP | 4512529 B2 | 7/2010 |
| JP | 4693024 B2 | 6/2011 |
| JP | 4798713 B2 | 10/2011 |
| JP | 2013-018056 A | 1/2013 |
| JP | 5143528 B2 | 2/2013 |
| JP | 5226359 B2 | 7/2013 |
| JP | 5248152 B2 | 7/2013 |
| JP | 5697889 B2 | 4/2015 |
| JP | 2016023209 A | 2/2016 |
| JP | 5994183 B2 | 9/2016 |
| JP | 2017533585 A | 11/2017 |
| JP | 6422325 B2 | 11/2018 |
| JP | 2018533487 A | 11/2018 |
| JP | 6584895 B2 | 10/2019 |
| KR | 10-2000-0075987 A | 12/2000 |
| KR | 2003-0020658 A | 3/2003 |
| KR | 20100028294 A | 3/2010 |
| WO | 0238688 A3 | 10/2002 |
| WO | 03/103959 A1 | 12/2003 |
| WO | 2006003697 A1 | 1/2006 |
| WO | 2009158665 A1 | 12/2009 |
| WO | 2011/088057 A1 | 7/2011 |
| WO | 2012173885 A3 | 5/2013 |
| WO | 2013162856 A1 | 10/2013 |
| WO | 2014039378 A1 | 3/2014 |
| WO | 2015/111366 A1 | 7/2015 |
| WO | 2015/120430 A1 | 8/2015 |

OTHER PUBLICATIONS

Wikipedia [online]; 3D Printing; 2013; 17 total pages.
3D Printing: The Next Industrial Revolution: Christopher Barnatt Publisher: CreateSpace Independent Publishing Platform (May 4, 2013) Language: English, ISBN-10:148418176X ISBN-13: 978-1484181768.
C. Wong. "Damping Associated with Incipient Melting in Aluminum-Indium Alloys", David Taylor Research Center—SME 89-99. Jan. 1990.
Tammy Hickey et al. "Internal Friction and Modules Studies on Austempered Ductile Iron", Technical Report ARCCB-TR-98001. Jan. 1996. 24 pages.
Rodel. Rodel IC1000 CMP Pad. 1999. 2 pages.
Byoung-Ho Kwon et al. "Dishing and Erosion in STI CMP". System IC R&D Center, Hyundai Electronics Industries Co. Ltd. 1999 IEEE. 3 pages.
S. Raghavan et al. "Chemical Mechanical Planarization in Integrated Circuit Device Manufacturing". vol. 98-7. 1998. 19 pages.
Rajeev Bajaj et al. "Effect of Polishing Pad Material Properties on Chemical Mechanical Polishing (CMP) Processes". 1994. 8 pages.
Rodel. Rodel IC1010. 1998. 2 pages.
Peter Freeman et al. "A Study of the Variation of Physical Properties in Random Lots of Urethane Polishing Pads for CMP". A Rodel Publication. vol. 2, Issue 6. Jun. 1996. 8 Pages.
John J. Aklonis et al. "Introduction to Polymer Viscoelasticity". Second Edition. 1983. 6 pages.
Weidan Li et al. "The Effect of the Polishing Pad Treatments on the Chemical-Mechanical Polishing of SiO2 Films", Thin Solid Films 270 (1995). 6 pages.
Van Den Berg, Antje M.J. "Inkjet Printing of Polyurethane Colloidal Suspensions", www.rsc.org/softmatter. Jul. 13, 2006.
Yu-Lim Jun et al. "Slicing Bitmap Generation and Patterning Technique a SFF System Using UV-Resin", International Conference on Control, Automation and Systems 2007. 5 Pages.
H. Yang. "High Viscosity Jetting System for 3D Reactive Inkjet Printing", Additive Manufacturing and 3D Printing Group, University of Nottingham. 9 pages.
I Hermant et al. "A Comparative Study of Polyurethane-Poly(Methyl Methacrylate) Interpenetrating and Semi-1 Interprenetrating Polymer Networks", vol. 20, No. 1. pp. 85-89, 1984.
Lee M. Cook. "CMP Consumables II: Pad" Chapter 6. Semiconductors and Semimetals, vol. 63. Published 1999. Chemical Mechanical Polishing in Silicon Processing. ISBN: 978-0-12-752172-5.
Peter Krober et al. "Reactive Inkjet Printing of Polyurethanes", www.rsc.org/materials. Journal of Materials Chemistry. Jan. 6, 2009.
Plastics in Action; 3-D Printing Speeds Prototype Development dated May/Jun. 1998; 2 total pages.
The Dow Chemical Company—"Specialty Elastomers for Automotive TPO Compounds" brochure, Nov. 2006, 8 pages.
The Dow Chemical Company—"DOW VLDPE DFDB-1085 NT, Very Low Density Polyethylene Resin" Technical Data, UL Prospector, Oct. 2003, 2 pages.
Lubrizol Advanced Materials, Inc.—"Lubrizol Engineered Polymers, Estane 58144 TPU" Technical Data, Feb. 2014, 2 pages.
Sekisui Voltek, LLC—"Volara Type EO" Technical Data, Jan. 2010, 2 pages.
Rogers Corporation, High Performance Foams Division, PORON Microcellular Urethanes—Product Availability Booklet, May 1, 2015, 11 pages.
Andrews, Rodney J., et al.—"Glass Transition Temperatures of Polymers," Polymer Handbook, Fourth Edition, J. Brandrup et al., Editors, A Wiley Interscience Publication, John Wiley & Sons, Inc., 1999, VI/193-198.
CROW—"Glass Transition Temperature," webpage, Polymer Properties Database, http://polymerdatabase.com/polymer%20physics/ GlassTransition.html, 2015, printed Apr. 10, 2019, 2 pages.
Crow—"Glass Transition Temperatures," webpage, Polymer Properties Database, http://polymerdatabase.com/polymer%20physics/ Polymer%20Tg%20C.html, 2015, printed Apr. 10, 2019, 6 pages.
HUPC—"Dipropylene Glycol Diacrylate (DPGDA)" webpage, CAS No. 57472-68-1_Radiation, http://www.union-pigment.com/china/ radiation-curable-57472.html, printed Apr. 8, 2019, 2 pages.
Polysciences, Inc.—"Monomers Product Guide," 2012, 16 pages.
Whisnaut, David—"Polymer Chemistry: The Glass Transition" webpage, Engineering Libre Texts, https://eng.libretexts.org/

(56) References Cited

OTHER PUBLICATIONS

Bookshelves/Materials_Schience?Supplemental_Modules_Materia . . . , printed Apr. 10, 2019, 2 pages.

SIGMA-ALDRICH—"Thermal Transitions of Homopolymers: Glass Transition & Melting Point" webpage, https://www.sigmaaldrich.com/technical-documents/articles/materials-science/polymer-scie . . . , printed Apr. 8, 2019, 3 pages.

Moylan, John—"Considerations for Measuring Glass Transition Temperature," webpage on Element Materials Technology's website, https://www.element.com/nucleus/2017/08/15/18/45/considerations-for-measuring-glass-transition-temperature, Feb. 19, 2019, 8 pages.

ASTM International—"Standard Test Method for Assignment of the Glass Transition Temperature by Dynamic Mechanical Analysis," standard issued under Designation E1640, current edition approved Aug. 1, 2013, 6 pages.

Wikipedia—"Contact angle" webpage, https://en.wikipedia.org/wiki/Contact_angle, last edited Dec. 14, 2019, 9 pages.

ASTM International—"Standard Terminology for Additive Manufacturing Technologies," ASTM Designation F2792-12a, copyright dated Sep. 9, 2013, pp. 1-3.

Merriam-Webster Dictionary—"Droplet," https://www.merriam-webster.com/dictionary/droplet, accessed Feb. 24, 2020, 8 pages.

Shahrubudin, N., et al.—"An Overview on 3D Printing Technology: Technological, Materials, and Applications," 2nd International Conference on Sustainable Materials Processing and Manufacturing (SMPM 2019), Procedia Manufacturing, 35 (2019), published by Elsevier B.V., pp. 1286-1296.

Wikipedia—"Drop (liquid)," https://en.wikipedia.org/wiki/Drop_(liquid), last edited Feb. 12, 2020, accessed Feb. 24, 2020, 5 pages.

Wikipedia—"Cross-link" webpage at <https://en.wikipedia.org/wiki/Cross-link>, printed Mar. 8, 2019, 8 pages.

J.-G. Park, et al., Post-CMP Cleaning: Interaction between Particles and Surfaces, International Conference on Planarization/CMP Technology, Oct. 25-27, 2007, VDE Verlag CMBH, Berlin-Offenbach, 6 pp.

Pan, GuoShun et al.—"Preparation of silane modified SiO2 abrasive particles and their Chemical Mechanical Polishing (CMP) performances," Wear 273 (2011), pp. 100-104.

Epoxy Technology Inc.—"Tech Tip 23: Tg—Glass Transition Temperature for Epoxies" brochure, date unknown, 2 pages.

Rao, Sunil M., The Effectiveness of Silane and Siloxane Treatments on the Superhydrophobicity and Icephobicity of Concrete Surfaces, RAO, PhD Thesis, 1-118.

A Breakthrough Method for the Effective Conditioning of PVA Brush Used for Post-CMP Process, Lee et al., ECS Journal of Solid State Science and Technology 8, P307-P312 (2019), Published Jun. 5, 2019, 6 pages.

Influence of post-CMP cleaning on Cu interconnects and TDDB reliability, Noguchi et al., IEEE Transactions on Electron Devices 52, 934-941 (2005), Published Apr. 25, 2005, 8 pages.

Arkema, "Liquid Resins for UV Curling", N3XTDIMENSION. Sartomer's Custom Liquid Resin Systems. 3D-arkema.com.

CPS Safety Summary, "Tripropyleneglycol diacrylate", (TPGDA—SR 306)—Mar. 11, 2013.

Shyam Dev Maurya et al. "A Review on Aery late-Terminated Urethane Oligomers and Polymers: Synthesis and Applications", Polymer-Plastics Technology and Engineering. ISSN:0360-2559 (Print) 1525-6111 (Online) Journal homepage: https://www.tandfonline.com/loi/lpte20.

UV/EB Curable Resins. Product Guide—Americas, www.allnex.com.

International Search Report and Written Opinion in related application PCT/US2016069193 dated Apr. 11, 2017.

Office Action for U.S. Appl. No. 15/394,044 (APPM/023693US) dated Sep. 10, 2018.

Japanese Office Action issued to Application No. 2021-512234 dated May 31, 2022.

Office Action for Chinese Application No. 2019800580012 dated Feb. 25, 2023.

Search Report for Chinese Application No. 2019800580012 dated Feb. 24, 2023.

\* cited by examiner

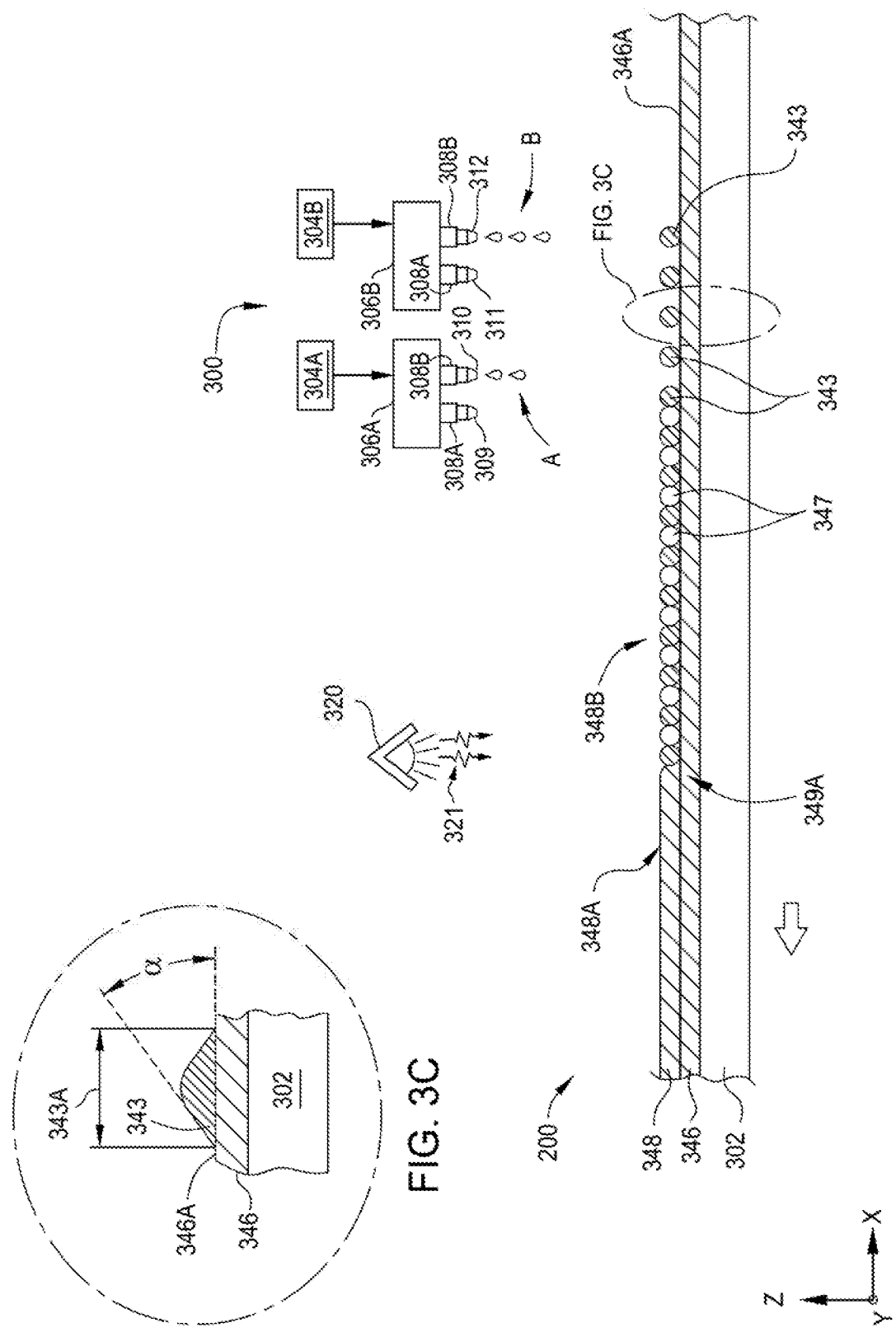

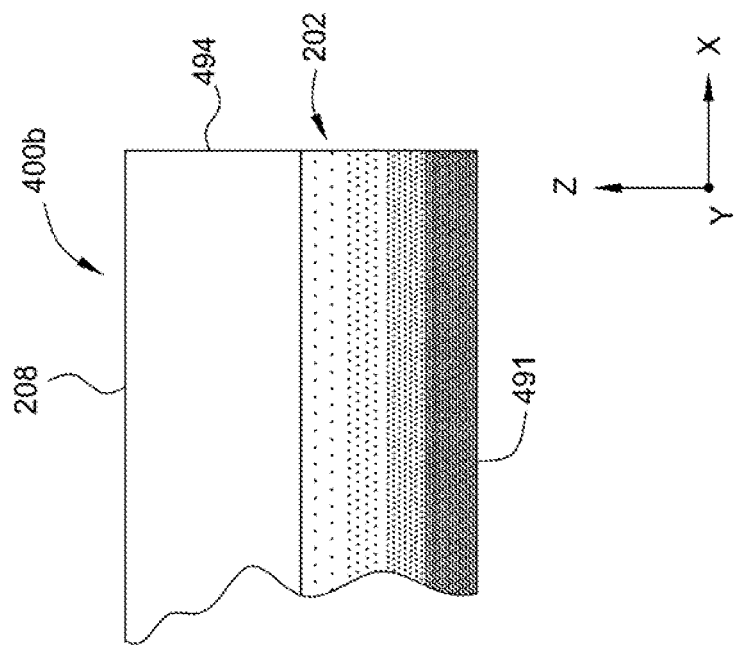
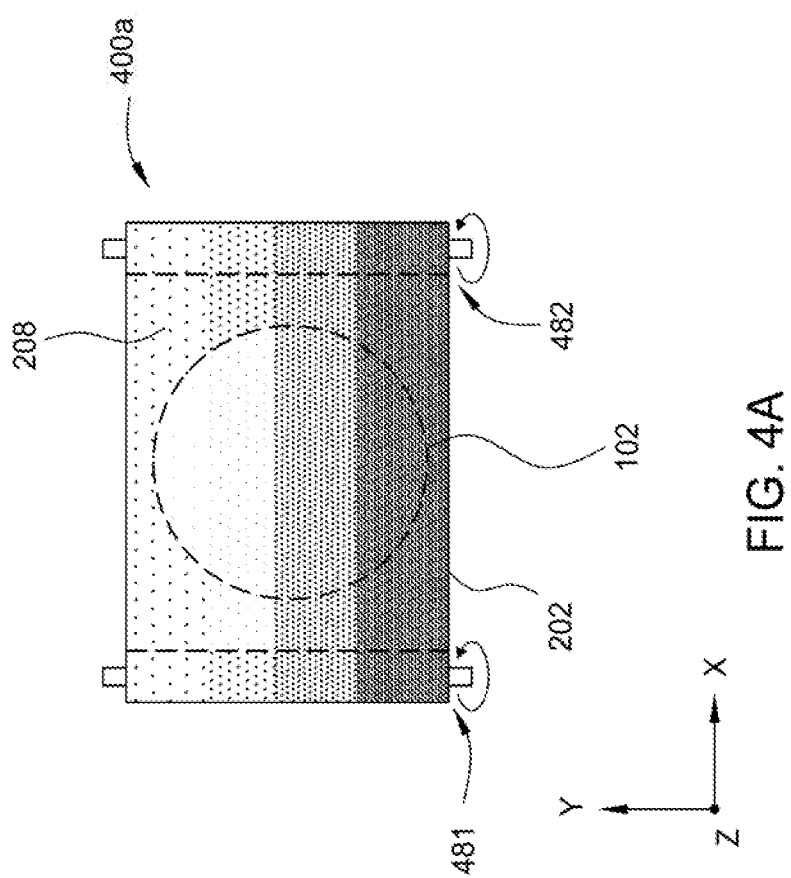
FIG. 4A
FIG. 4B

FORMULATIONS FOR ADVANCED POLISHING PADS

CROSS-REFERENCE TO RELATED APPLICATIONS

This application claims benefit of U.S. provisional patent application Ser. No. 62/726,661, filed Sep. 4, 2018, which is incorporated herein by reference in its entirety.

BACKGROUND

Field

Implementations described herein generally relate to polishing articles and methods for manufacturing polishing articles used in polishing processes. More particularly, implementations described herein relate to polishing pads produced by processes that yield improved polishing pad properties and performance, including tunable performance.

Description of the Related Art

Chemical mechanical polishing (CMP) is a conventional process that has been used in many different industries to planarize surfaces of substrates. In the semiconductor industry, uniformity of polishing and planarization has become increasingly notable as device feature sizes continue to decrease. During a CMP process, a substrate, such as a silicon wafer, is mounted on a carrier head with the device surface placed against a rotating polishing pad. The carrier head provides a controllable load on the substrate to push the device surface against the polishing pad. A polishing liquid, such as slurry with abrasive particles, is typically supplied to the surface of the moving polishing pad and polishing head. The polishing pad and polishing head apply mechanical energy to the substrate, while the pad also helps to control the transport of slurry, which interacts with the substrate during the polishing process.

Because polishing pads are typically made from viscoelastic polymeric materials, the mechanical properties of a polishing pad (e.g., elasticity, rebound, hardness, and stiffness), and the CMP processing conditions have a significant impact on the CMP polishing performance on both an integrated circuit ("IC") die level (microscopic/nanoscopic) and wafer or global level (macroscopic). For example, CMP process forces and conditions, such as pad compression, pad rebound, friction, and changes in temperature during processing, and abrasive aqueous slurry chemistries will impact polishing pad properties and thus CMP performance.

Chemical mechanical polishing processes performed in a polishing system will typically include multiple polishing pads that perform different parts of the full polishing process. The polishing system typically includes a first polishing pad that is disposed on a first platen, which produces a first material removal rate and a first surface finish and a first flatness on the surface of the substrate. The first polishing process is typically known as a rough polishing process, and is generally performed at a high polishing rate. The system will also typically include at least one additional polishing pad that is disposed on at least an additional platen, which produces a second material removal rate and a second surface finish and flatness on the surface of the substrate. The second polishing process is typically known as a fine polishing process, which is generally performed at a slower rate than the rough polishing process. In some implementations, the system may also include a third polishing pad that is disposed on a third platen, which produces a third removal rate and a third surface finish and flatness on the surface of the substrate. The third polishing process is typically known as a material clearing or buffing process. The multi-pad polishing process can be used in a multi-stage process in which the pads have different polishing characteristics and the substrates are subjected to progressively finer polishing or the polishing characteristics are adjusted to compensate for different layers that are encountered during polishing, for example, metal lines underlying an oxide surface.

During each of the CMP processing stages, a polishing pad is exposed to compression and rebound cycles, heating and cooling cycles, and abrasive slurry chemistries. Eventually the polishing pad becomes worn or "glazed" after polishing a certain number of substrates, and then needs to be replaced or reconditioned.

A conventional polishing pad is typically made by molding, casting or sintering polymeric materials that include polyurethane materials. In the case of molding, polishing pads can be made one at a time, e.g., by injection molding. In the case of casting, the liquid precursor is cast and cured into a cake, which is subsequently sliced into individual pad pieces. These pad pieces can then be machined to a final thickness. Pad surface features, including grooves, which aid in slurry transport, can be machined into the polishing surface, or be formed as part of the injection molding process. These methods of manufacturing polishing pads are expensive and time consuming, and often yield non-uniform polishing results due to the difficulties in the production and control of the feature dimensions of the pad surface. Non-uniformity has become increasingly notable as the dimensions of IC dies and features continue to shrink.

Current pad materials and their manufacturing methods limit the manipulation and fine control of bulk pad properties such as storage modulus (E') and loss modulus (E"), which play roles in pad performance. Therefore, uniform CMP involves a pad material and surface features, such as grooves and channels, with a predictable and finely controlled balance of storage modulus E' and loss modulus E", that are further maintained over a CMP processing temperature range, from, for example, about 30° C. to about 90° C. Unfortunately, conventional pad production via traditional bulk polymerization and casting and molding techniques only provide a modicum of pad property (e.g., modulus) control, because the pad is a random mixture of phase separated macromolecular domains that are subject to intra-molecular repulsive and attractive forces and variable polymer chain entanglement. For example, the presence of phase separated micro and macroscopic structural domains in the bulk pad may yield an additive combination of non-linear material responses, such as a hysteresis in the storage modulus E' over multiple heating and cooling cycles that typically occur during the CMP processing of batches of substrates, which may result polishing non-uniformities and unpredictable performance across the batch of substrates.

Thus, there is a need for new polishing pad materials and new methods of manufacturing polishing pads that provide control of pad feature geometry, and fine control of the pad's material, chemical and physical properties.

SUMMARY

Implementations described herein generally relate to polishing articles and methods for manufacturing polishing articles used in polishing processes. More particularly, implementations described herein relate to polishing pads produced by processes that yield improved polishing pad properties and performance, including tunable performance. In one implementation, a UV curable resin precursor composition is provided. The UV curable resin precursor comprises a precursor formulation. The precursor formulation comprises a first resin precursor component that comprises a semi-crystalline radiation curable oligomeric material, wherein the semi-crystalline radiation curable oligomeric material is selected from a semi-crystalline aliphatic polyester urethane acrylate, a semi-crystalline aliphatic polycarbonate urethane acrylate, a semi-crystalline aliphatic polyether urethane acrylate, or combinations thereof. The precursor formulation further comprises a second resin precursor component that comprises a monofunctional or multifunctional acrylate monomer. The resin precursor formulation further comprises a photoinitiator, wherein the precursor formulation has a viscosity that enables the precursor formulation to be dispensed to form a portion of a polishing article by an additive manufacturing process.

In another implementation, a method of forming a polishing article is provided. The method comprises depositing a plurality of composite layers with a 3D printer to reach a target thickness. Depositing the plurality of composite layers comprises dispensing one or more droplets of a curable resin precursor composition onto a support. The curable resin precursor composition comprises a first resin precursor component that comprises a semi-crystalline radiation curable oligomeric material. The semi-crystalline radiation curable oligomeric material is selected from a semi-crystalline aliphatic polyester urethane acrylate, a semi-crystalline aliphatic polycarbonate urethane acrylate, a semi-crystalline aliphatic polyether urethane acrylate, or combinations thereof. The curable resin precursor composition further comprises a second resin precursor component that comprises a monofunctional or multifunctional acrylate monomer. The curable resin precursor composition further comprises a photoinitiator. The curable resin precursor composition has a viscosity that enables the curable resin precursor composition to be dispensed to form a portion of a polishing article by an additive manufacturing process.

In yet another implementation, a method of forming a polishing article is provided. The method comprises depositing a plurality of composite layers with a 3D printer to reach a target thickness. Depositing the plurality of composite layers comprises dispensing one or more droplets of a curable resin precursor composition onto a support. The curable resin precursor composition comprises a first resin precursor component that comprises a semi-crystalline radiation curable oligomeric material, wherein the semi-crystalline radiation curable oligomeric material is selected from a semi-crystalline aliphatic polyester urethane acrylate, a semi-crystalline aliphatic polycarbonate urethane acrylate, a semi-crystalline aliphatic polyether urethane acrylate, or combinations thereof. The curable resin precursor composition further comprises a second resin precursor component that comprises a monofunctional or multifunctional acrylate monomer. The curable resin precursor composition further comprises a photoinitiator. The curable resin precursor formulation has a viscosity that enables the curable resin precursor formulation to be dispensed to form a portion of a polishing article by an additive manufacturing process. The method further comprises exposing the one or more droplets of the curable resin precursor composition to electromagnetic radiation to at least partially cure the curable resin precursor composition. The method further comprises repeating the dispensing and exposing to build a 3D-relief on the support. The method further comprises solidifying the plurality of composite layers to form a pad body.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

FIG. 3B is a schematic view of a portion of the system illustrated in FIG. 3A, according to an implementation of the present disclosure;

FIG. 3C is a schematic view of a dispensed droplet disposed on a surface of a region of the advanced polishing pad illustrated in FIG. 3B, according to an implementation of the present disclosure;

FIG. 4A is a schematic top view of a web or roll-to-roll type polishing pad, according to an implementation of the present disclosure;

FIG. 4B is a schematic side cross-sectional view of a portion of an advanced polishing pad, according to an implementation of the present disclosure;

Figure 1:
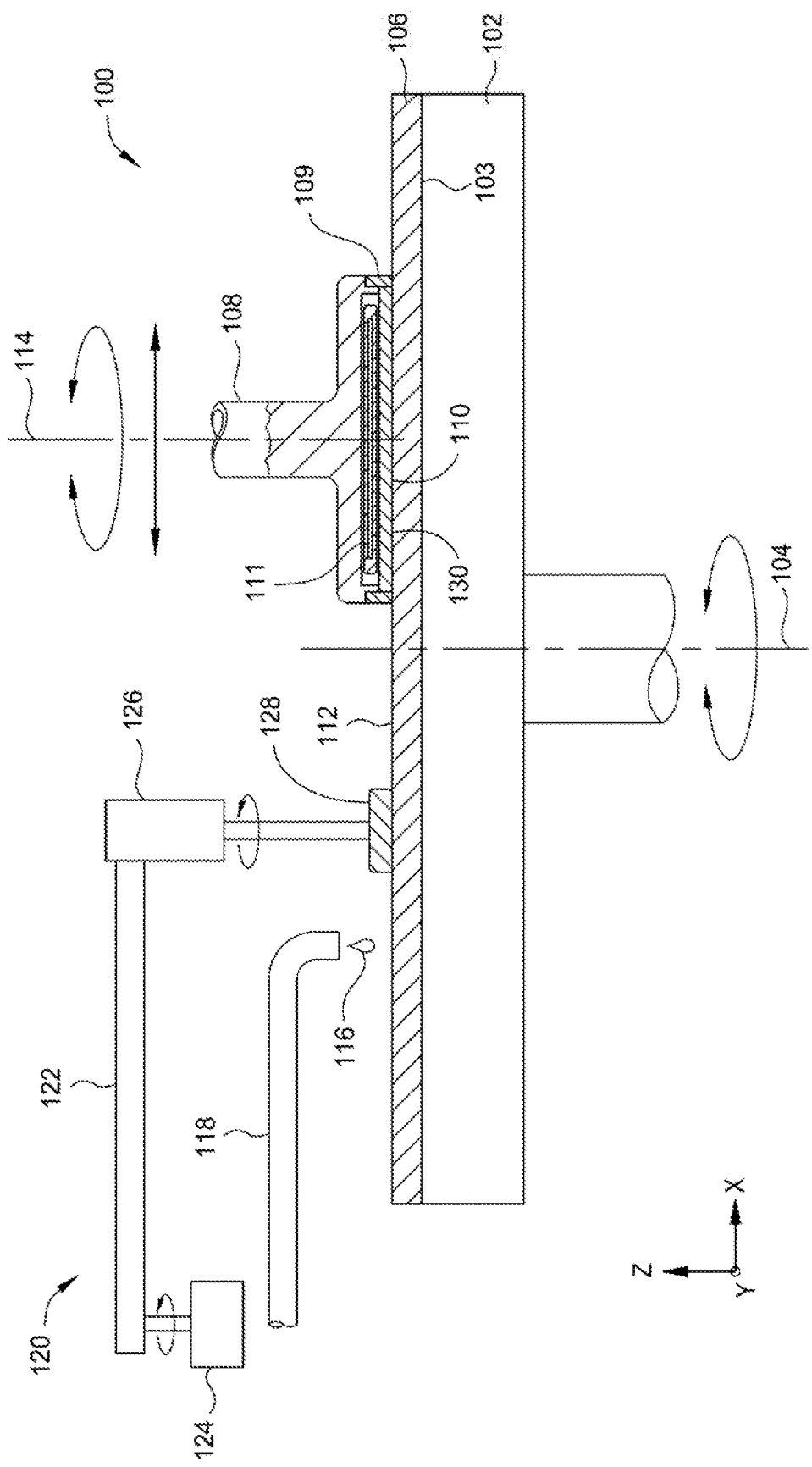
FIG. 1 is a schematic sectional view of a polishing station having an advanced polishing pad formed according to implementations described herein.

To facilitate understanding, identical reference numerals have been used, where possible, to designate identical elements that are common to the figures. It is contemplated that elements and features of one implementation may be beneficially incorporated in other implementations without further recitation.

DETAILED DESCRIPTION

Implementations disclosed herein generally relate to polishing articles and methods for manufacturing polishing articles used in polishing processes. More specifically, implementations disclosed herein relate to porous polishing pads produced by processes that yield improved polishing pad properties and performance, including tunable performance. Additive manufacturing processes, such as three-dimensional printing ("3D printing") processes provide the ability to make polishing pads with unique properties and attributes. Implementations of the present disclosure provide an advanced polishing pad that has discrete features and geometries, formed from at least two different materials that are formed from liquid polymer precursors, or resin precursor compositions, that contain "resin precursor components." The resin precursor components include, but are not limited to functional polymers, functional oligomers, monomers, reactive diluents, flow additives, curing agents, photoinitiators, one or more porosity-forming agents, surfactants and cure synergists.

Certain details are set forth in the following description and in FIGS. 1-6 to provide a thorough understanding of various implementations of the disclosure. Other details describing well-known structures and systems often associated with additive manufacturing processes and polishing article manufacturing are not set forth in the following disclosure to avoid unnecessarily obscuring the description of the various implementations. Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

It should be understood that although the polishing articles described herein are polishing pads, the implementations describe herein are also applicable to other polishing articles including, for example, buffing pads. Further, although the polishing articles described herein are discussed in relation to a chemical mechanical polishing process, the polishing articles and methods of manufacturing polishing articles described herein are also applicable to other polishing processes including polishing lenses and other processes including both abrasive and non-abrasive slurry systems. In addition, the polishing articles described herein may be used in at least the following industries: aerospace, ceramics, hard disk drive (HDD), MEMS and Nano-Tech, metalworking, optics and electro-optics, and semiconductor, among others.

In one implementation, an additive manufacturing process, such as a three dimensional printing (or 3-D printing) process may be used to produce (or make) the polishing articles described herein. In one implementation, a computer (CAD) model of the part is made and then a slicing algorithm maps the information for every layer. In one non-limiting example of a 3-D printing process, the 3-D printing process is a process in which droplets of a liquid precursor composition material are dispensed on a surface and are then cured to form the polishing article in layer-by-layer fashion, which is discussed further below. Since 3-D printing processes can exercise local control over the material composition, microstructure and surface texture, various (and previously inaccessible) geometries may be achieved with this method.

In one implementation, a polishing article as described herein may be represented in a data structure readable by a computer rendering device or a computer display device. The computer-readable medium may contain a data structure that represents the polishing article. The data structure may be a computer file, and may contain information about the structures, materials, textures, physical properties, or other characteristics of one or more articles. The data structure may also contain code, such as computer executable code or device control code that engages selected functionality of a computer rendering device or a computer display device. The data structure may be stored on the computer-readable medium. The computer-readable medium may include a physical storage medium such as a magnetic memory, floppy disk, or any convenient physical storage medium. The physical storage medium may be readable by the computer system to render the article represented by the data structure on a computer screen or a physical rendering device, which may be an additive manufacturing device, such as a 3D printer.

Material and microstructure variations over length scales of a deposited 20-100 micron region are reproducible. This attribute may enable CMP process performance tuning on an unprecedented level. One technique for 3D printing utilizes inkjet technology, which involves dispensing a droplet of a liquid resin precursor composition in a predetermined pattern and curing or solidifying the dispensed precursor material into a solid polymer by exposing the dispensed precursor material to electromagnetic radiation, such as ultraviolet light. Inkjet technology produces microdroplets of precursor material by ejecting precursor materials through a small nozzle (e.g., 10-50 micron diameter). This creates high pressure and shear on the droplet. Additionally 3D printing techniques involve printing material in a layer-by-layer form, where thickness control of each deposited layer is critical.

Typical cross-linked network obtained by UV-curable ethylenically unsaturated moieties are very brittle and have very low elongation-at-break. The implementations described herein provide novel formulations and compositions for advanced chemical mechanical planarization (CMP) pads for semiconductor fabrication. The formulations and compositions disclosed herein are cross-linked by ultraviolet (UV) light to form a network structure. Furthermore, the formulations described herein comprise ethylenically unsaturated monomer, oligomers and polymers. The formulations described herein may be used in an additive manufacturing (3D printing) process to make CMP pads, for example by jetting the ink through a printhead. The formulations for advanced polishing pads described herein are designed to have higher elongation-at-break at room temperature while maintaining the targeted modulus at 30° C. (E'30) and 90° C. (E'90) and ultimate tensile stress (UTS) at room temperature for good polishing performance.

In one implementation, photosensitive formulations for inkjet-based additive manufacturing of CMP pads are provided. The photosensitive formulations described herein comprise semi-crystalline urethane acrylate oligomers. It is believed that inclusion of the semi-crystalline urethane acrylate oligomers in the formulations provides enhanced mechanical properties like elongation, ultimate tensile strength, storage modulus at room temperature and at elevated temperatures (e.g., 90 degrees Celsius), while maintaining low viscosity (e.g., less than 30 cP at 70 degrees Celsius). Not to be bound by theory but it is believed that higher elongation reduces the cut rates of CMP pads and potentially leads to fewer defects.

In one implementation, formulations described herein comprise meth(acrylate) oligomers. The meth(acrylate) oligomers comprise polyester urethane groups for high elongation and high modulus. The formulations described herein may further comprise reactive diluents, photoinitiators, photosensitizers, oxygen scavengers, and additives to improve performance. In one implementation, the viscosity of the formulation described herein at the jetting temperature is within a range from about 5 cP to about 100 cP, for example within a range from about 5 cP to about 50 cP, such as within a range from about 10 cP to about 30 cP.

In one implementation, the oligomers have urea groups attached to the end functional acrylate moieties. Further, the oligomers can have crystalline or liquid crystalline groups to improve ordering upon crosslinking that can help in maintaining higher elongation and modulus. Further, the oligomers can have other hydrogen bonding groups like urea and carboxylic acids to improve hydrophobicity and modulus of the cross-linked pad material. In one implementation, the urethane acrylate group can have long chain alkyl groups that can form a controlled network structure to improve elongation and modulus of the cross-linked film. Further, nanoparticles such as $SiO_2$, ZnO, ZnS, and $ZrO_2$, and other polymeric fibers can be added to the UV-curable formulations to improve mechanical properties of the cross-linked pad materials.

In one implementation, the acrylate monomers used in the formulation can have acrylate to urethane ratio of 1:2 or greater. In one implementation, the reactive diluents used to reduce the viscosity of the formulation can have two acrylate groups and have a viscosity lower than 5 cP and a Tg greater than 30 degrees Celsius.

Polishing Pad Apparatus and Polishing Methods:

The advanced polishing pad designs disclosed herein can be used to perform a polishing process in many different types of polishing apparatus. In one example, which is not intended to limit the scope of the disclosure provided herein, the advanced polishing pad may be used in a polishing station that is used to polish semiconductor substrates. FIG. 1 is a schematic sectional view of a polishing station 100 having an advanced polishing pad 106 formed according to the implementations described herein. The polishing station 100 may be positioned within a larger chemical mechanical polishing (CMP) system that contains multiple polishing stations 100. The polishing station 100 includes a platen 102. The platen 102 may rotate about a central axis 104. The advanced polishing pad 106 may be placed on the platen 102. While not intending to limit the disclosure provided herein, typically, the advanced polishing pad 106 covers an upper surface 103 of the platen 102 which is at least one to two times larger than the size of a substrate 110 (e.g., substrate diameter) that is to be processed in the polishing station 100. In one example, the advanced polishing pad 106 and platen 102 are between about 6 inches (150 millimeters) and about 40 inches (1,016 millimeters) in diameter. The advanced polishing pad 106 includes a polishing surface 112 configured to contact and process one or more substrates 110. The platen 102 supports the advanced polishing pad 106 and rotates the advanced polishing pad 106 during polishing. A carrier head 108 may hold the substrate 110 being processed against the polishing surface 112 of the advanced polishing pad 106. A polishing interface 130 is formed between the polishing surface 112 and the substrate 110. The carrier head 108 typically includes a flexible diaphragm 111 that is used to urge the substrate 110 against the advanced polishing pad 106 and a carrier ring 109 that is used to correct for an inherently non-uniform pressure distribution found across the substrate's surface during the polishing process. The carrier head 108 may rotate about a central axis 114 and/or move in a sweeping motion to generate relative motions between the substrate 110 and the advanced polishing pad 106.

During polishing, a polishing fluid 116, such as an abrasive slurry or non-abrasive slurry, may be supplied to the polishing surface 112 by a delivery arm 118. The polishing fluid 116 may contain abrasive particles, a pH adjuster and/or chemically active components to enable chemical mechanical polishing of the substrate. The slurry chemistry of 116 is designed to polish substrate surfaces and/or features that may include metals, metal oxides, and semimetal oxides. One will note that the surface topography of the advanced polishing pad 106 is used to control the transport of the polishing fluid 116 (e.g., slurry) which interacts with the substrate 110 during the polishing process. For example, the surface topology of the advanced polishing pad 106 may include grooves, channels and other protuberances formed by casting, molding, or machining, which may be disposed over, upon and within the advanced polishing pad 106.

In some implementations, the polishing station 100 includes a pad conditioning assembly 120 that includes a conditioning arm 122 and actuators 124 and 126. The actuators 124 and 126 are configured to cause a pad conditioning disk 128 (e.g., diamond impregnated disk) to be urged against and sweep across the polishing surface 112 at different times during the polishing process cycle to abrade and rejuvenate the polishing surface 112 of the advanced polishing pad 106. During processing, moving the advanced polishing pad 106 and carrier head 108 apply mechanical energy to the substrate 110, which in combination with the chemicals and abrasive components in the polishing fluid 116, will cause the surface of the substrate to become planarized.

Polishing Pad Configuration Examples

Examples of various structural implementations of advanced polishing pads that can be used in a polishing apparatus are discussed in conjunction with FIGS. 2A-2K. The advanced polishing pads illustrated in FIGS. 2A-2K may be used, for example, in the polishing station 100 depicted in FIG. 1. Unless otherwise specified, the terms first polishing element(s) 204 and the second polishing element(s) 206 broadly describe portions, regions and/or features within the polishing body of the advanced polishing pad 200. In some implementations, the advanced polishing pad 200 contains pores or a material that will form a void in the surface of the pad once it is exposed to slurry. The specific examples of different advanced polishing pad implementations, shown in FIGS. 2A-2K, are not intended to be limiting as to the scope of the disclosure provided herein, since other similar implementations may be formed by use of the one or more of the additive manufacturing processes described herein.

The advanced polishing pads may be formed by a layer-by-layer automated sequential deposition of at least one resin precursor composition followed by at least one curing process, wherein each layer may represent at least one polymer composition, and/or regions of different compositions. The curable resin precursor composition includes precursors, or resin precursor compositions, that contain "resin precursor components" that include, but are not restricted to functional polymers, functional oligomers, monomers, emulsifiers/surfactants, photoinitiators, inorganic particles, reactive diluents, cure synergists, and additional additives. The functional polymers may include multifunctional acrylate precursor components. To form a plurality of solid polymeric layers, one or more curing process may be used, such as exposure of one or more compositions to UV radiation and/or thermal energy. In this fashion, an entire polishing pad may be formed from a plurality of polymeric layers by an additive manufacturing process. A thickness of the cured layer may be from about 0.1 microns to about 1 mm, such as 5 microns to about 100 microns, and such as 25 microns to about 30 microns.

The advanced polishing pads according to the present disclosure may have differing material properties, for example, porosity, across the pad body 202, as reflected by at least one compositional gradient from polishing element to polishing element. Porosity across the advanced polishing pad 200 may be symmetric or non-symmetric, uniform or non-uniform to achieve target polishing pad properties, which may include static mechanical properties, dynamic mechanical properties and wear properties. In one implementation, the pores form near the interface of each adjacent deposited layer. The patterns of either of the polishing elements 204, 206 across the pad body 202 may be radial, concentric, rectangular, spiral, fractal or random to achieve target properties including porosity, across the advanced polishing pad. Advantageously, the 3D printing process enables specific placement of material compositions with targeted properties in specific areas of the pad, or over larger areas of the pad, so the properties can be combined and represent a greater average of properties or a "composite" of the properties.

Figure 2A:
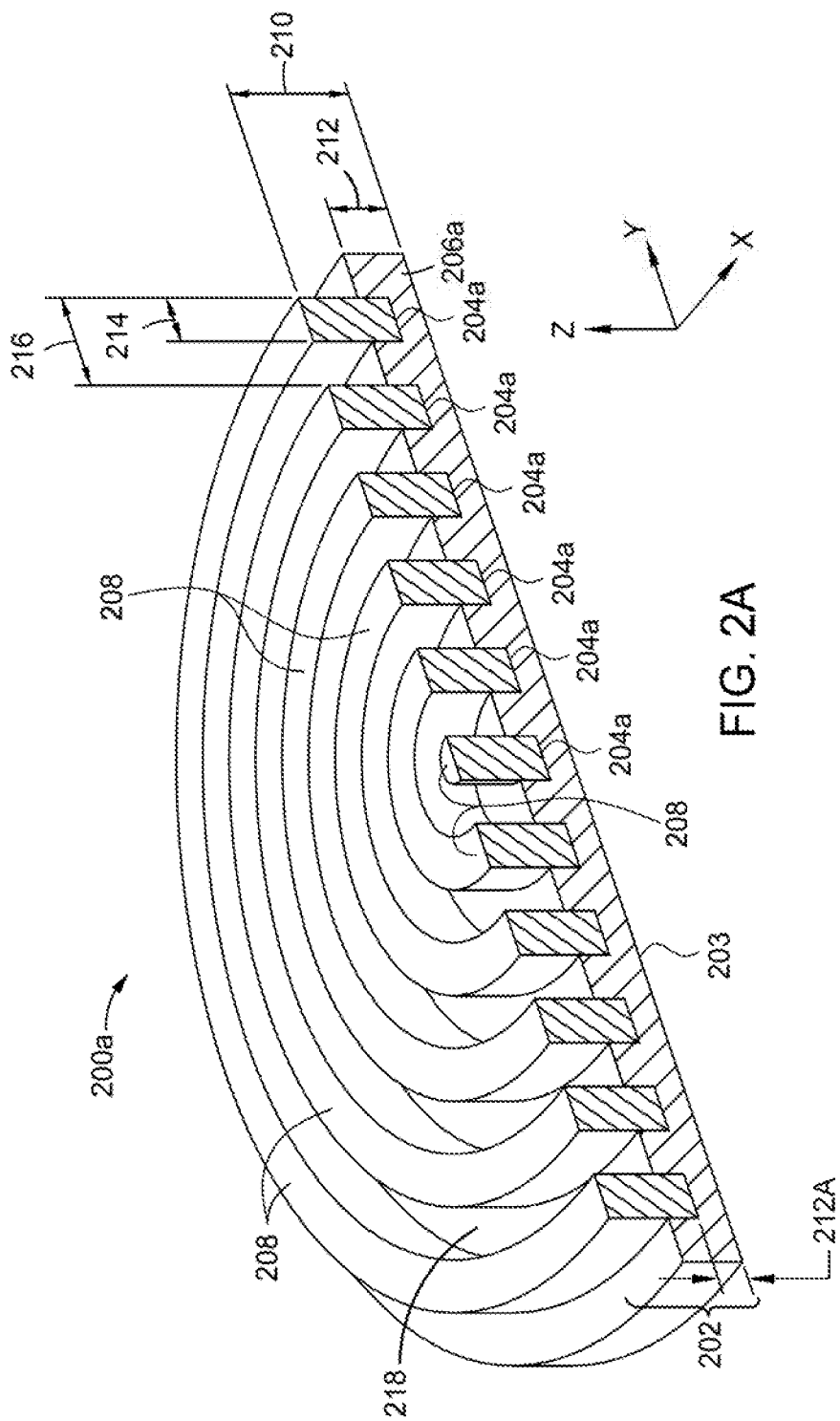
FIG. 2A is a schematic isometric and cross-sectional view of an advanced polishing pad according to an implementation of the present disclosure.

FIG. 2A is a schematic perspective sectional view of an advanced polishing pad 200a according to one implementation of the present disclosure. One or more first polishing elements 204a may formed in alternating concentric rings that are coupled to one or more second polishing elements 206a to form a pad body 202 that is circular. At least one of the one or more first polishing elements 204a and the one or more second polishing elements 206a may be formed according to the implementations described herein. In one implementation, a height 210 of the first polishing element(s) 204a from the supporting surface 203 is higher than a height 212 of the second polishing element(s) 206a so that the upper surface(s) 208 of the first polishing element(s) 204a protrude above the second polishing element(s) 206a. In one implementation, the first polishing element 204 is disposed over a portion 212A of the second polishing element(s) 206a. Grooves 218 or channels are formed between the first polishing element(s) 204a, and at least include a portion of the second polishing element(s) 206a. During polishing, the upper surface(s) 208 of the first polishing elements 204a form a polishing surface that contacts the substrate, while the grooves 218 retain and channel the polishing fluid. In one implementation, the first polishing element(s) 204a are thicker than the second polishing element(s) 206a in a direction normal to a plane parallel to the polishing surface, or upper surface(s) 208, of the pad body 202 (i.e., Z-direction in FIG. 2A) so that the channels or grooves 218 are formed on the top surface of the pad body 202.

In one implementation, a width 214 of the first polishing elements 204a may be between about 250 microns and about 5 millimeters. The pitch 216 between the hard first polishing element(s) 204a may be between about 0.5 millimeters and about 5 millimeters. Each first polishing element 204a may have a width within a range between about 250 microns and about 2 millimeters. The width 214 and/or the pitch 216 may vary across a radius of the advanced polishing pad 200 to define zones of varied hardness, porosity, or both hardness and porosity.

Figure 2B:
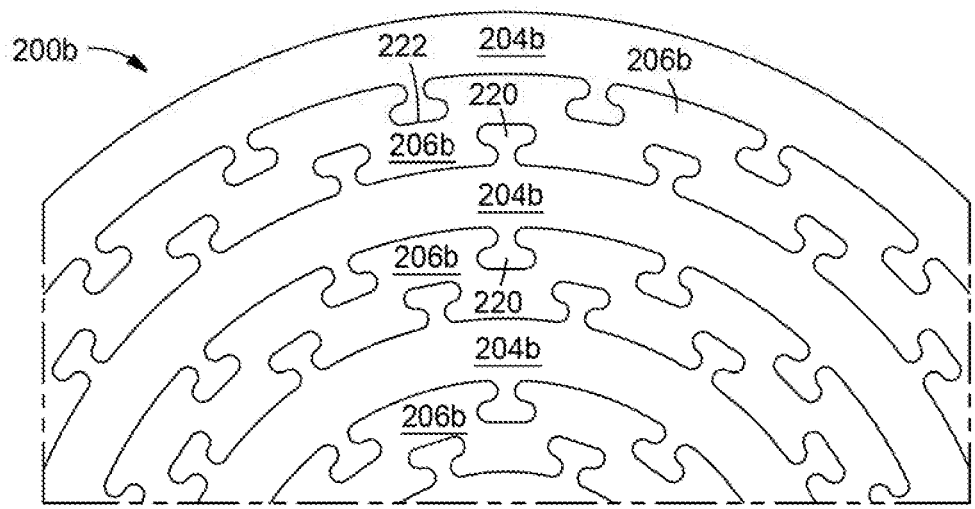
FIG. 2B is a schematic partial top view of an advanced polishing pad according to an implementation of the present disclosure.

FIG. 2B is a schematic partial top view of an advanced polishing pad 200b according to an implementation of the present disclosure. The advanced polishing pad 200b is similar to the advanced polishing pad 200 of FIG. 2A except that the advanced polishing pad 200b includes interlocking first polishing elements 204b and second polishing elements 206b. At least one of the interlocking first polishing elements 204b and the second polishing elements 206b may be formed according to the implementations described herein. The interlocking first polishing elements 204b and the second polishing elements 206b form a plurality of concentric rings. The interlocking first polishing elements 204b may include protruding vertical ridges 220 and the second polishing elements 206b may include vertical recesses 222 for receiving the vertical ridges 220. Alternatively, the second polishing elements 206b may include protruding ridges while the interlocking first polishing elements 204b include recesses. By having the second polishing elements 206b interlock with the interlocking first polishing elements 204b, the advanced polishing pad 200b will be mechanically stronger in relation to applied shear forces, which may be generated during the CMP process and/or material handling. In one implementation, the first polishing elements and the second polishing elements may be interlocked to improve the strength of the advanced polishing pad and improve physical integrity of the advanced polishing pads. The interlocking of the features may be due to physical and/or chemical forces.

Figure 2C:
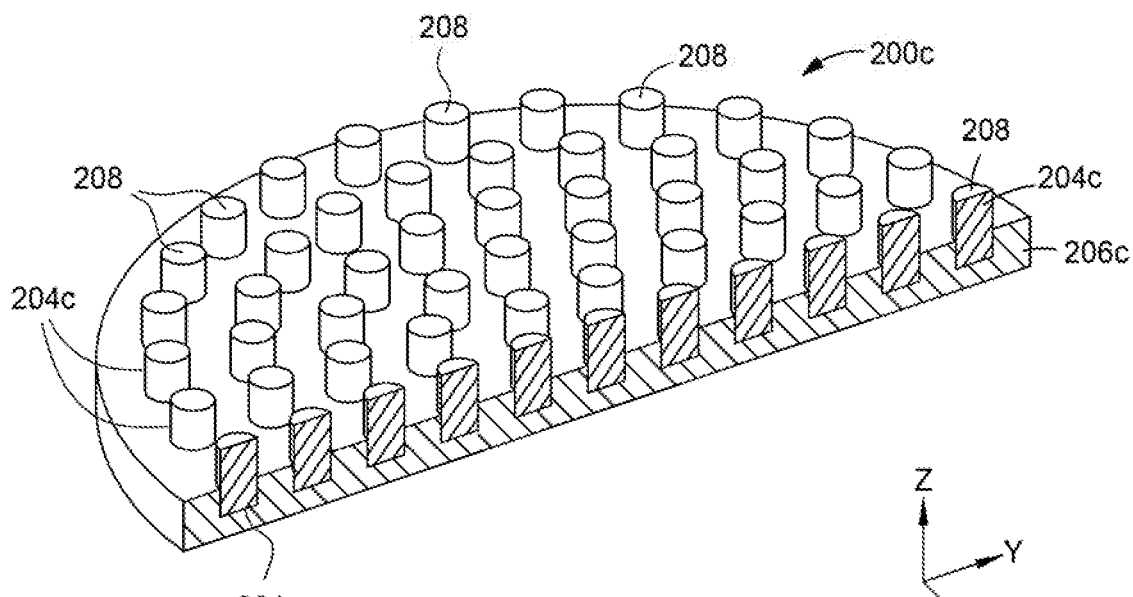
FIG. 2C is a schematic isometric and cross-sectional view of an advanced polishing pad according to an implementation of the present disclosure.

FIG. 2C is a schematic perspective sectional view of an advanced polishing pad 200c according to an implementation of the present disclosure. The advanced polishing pad 200c includes a plurality of first polishing elements 204c extending from a base material layer, such as the second polishing element 206c. At least one of the plurality of first polishing elements 204c and the second polishing element 206c may be formed according to the implementations described herein. Upper surfaces 208 of the first polishing elements 204c form a polishing surface for contacting the substrate during polishing. In one implementation, the first polishing elements 204c and the second polishing elements 206c have different material and structural properties. For example, the first polishing elements 204c may be formed from an advanced material, while the second polishing elements 206c may be formed from a non-advanced material as described herein. The advanced polishing pad 200c may be formed by 3D printing, similar to the advanced polishing pad 200.

The first polishing elements 204c may be substantially the same size, or may vary in size to create varied mechanical properties, such as porosity or elongation, across the advanced polishing pad 200c. The first polishing elements 204c may be uniformly distributed across the advanced polishing pad 200c, or may be arranged in a non-uniform pattern to achieve target properties in the advanced polishing pad 200c.

In FIG. 2C, the first polishing elements 204c are shown to be circular columns extending from the second polishing elements 206c. Alternatively, the first polishing elements 204c may be of any suitable cross-sectional shape, for example columns with toroidal, partial toroidal (e.g., arc), oval, square, rectangular, triangular, polygonal, or other irregular section shapes, or combinations thereof. In one implementation, the first polishing elements 204c may be of different cross-sectional shapes to tune hardness, mechanical strength or other targeted properties of the advanced polishing pad 200c.

Figure 2D:
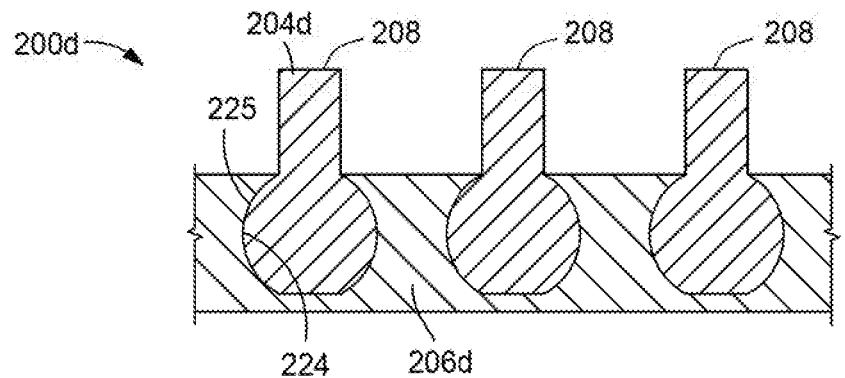
FIG. 2D is a schematic side cross-sectional view of a portion of an advanced polishing pad according to an implementation of the present disclosure.

FIG. 2D is a schematic partial side cross-sectional view of a pad body 202 of an advanced polishing pad 200d according to an implementation of the present disclosure. The advanced polishing pad 200d is similar to the advanced polishing pad 200a, 200b or 200c of FIGS. 2A-2C except that the advanced polishing pad 200d includes interlocking first polishing elements 204d and second polishing elements 206d. At least one of the plurality of interlocking first polishing elements 204d and the second polishing element 206d may be advanced and formed according to the implementations described herein. The interlocking first polishing elements 204d and the second polishing elements 206d may include a plurality of concentric rings and/or discrete elements that form part of the pad body 202, which are illustrated, for example, in FIGS. 2A, 2B and 2C. In one implementation, the interlocking first polishing elements 204d may include protruding sidewalls 224 while the second polishing elements 206d may include regions 225 to receive the protruding sidewalls 224 of the interlocking first polishing elements 204d. Alternatively, the second polishing elements 206d may include protruding sidewalls while the interlocking first polishing elements 204d include regions that are configured to receive the protruding sidewalls. By interlocking the second polishing elements 206c with the interlocking first polishing elements 204d, the advanced polishing pad 200d may exhibit an increased tensile, compressive and/or shear strength. Additionally, the interlocking sidewalls prevent the advanced polishing pad 200d from being pulled apart.

In one implementation, the boundaries between the interlocking first polishing elements 204d and second polishing elements 206d include a cohesive transition from at least one composition of material to another, such as a transition or compositional gradient from a first composition used to form the interlocking first polishing element 204d to a second composition used to form the second polishing element 206d. The cohesiveness of the materials is a result of the additive manufacturing process described herein, which enables micron scale control and intimate mixing of the two or more chemical compositions in a layer-by-layer additively formed structure.

Figure 2E:
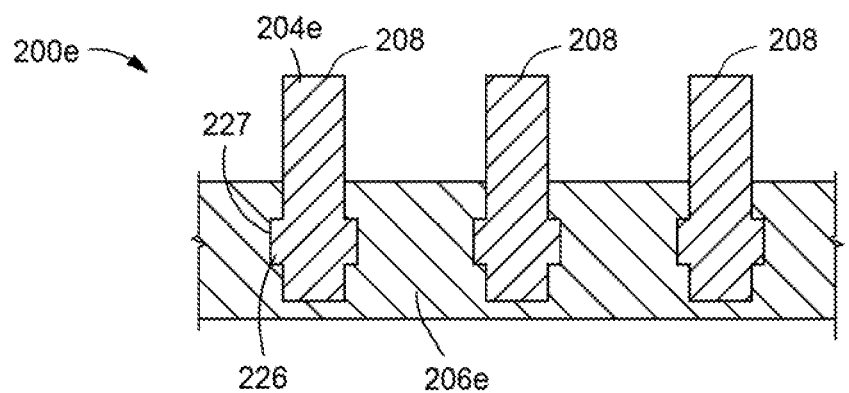
FIG. 2E is a schematic side cross-sectional view of a portion of an advanced polishing pad according to an implementation of the present disclosure.
Figure 2F:
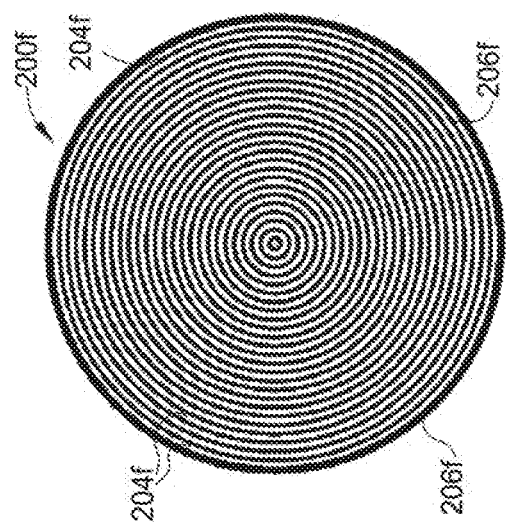
FIGS. 2F-2K are top views of advanced polishing pad designs according to implementations of the present disclosure.
Figure 2G:
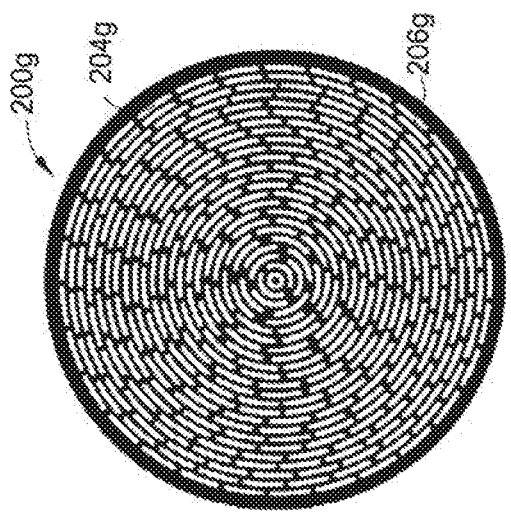
Figure 2H:
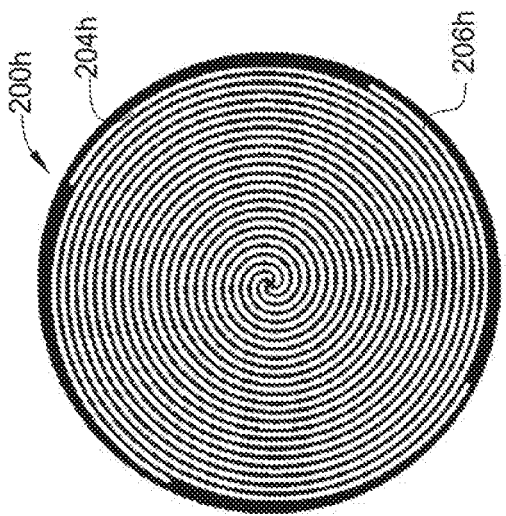
Figure 2I:
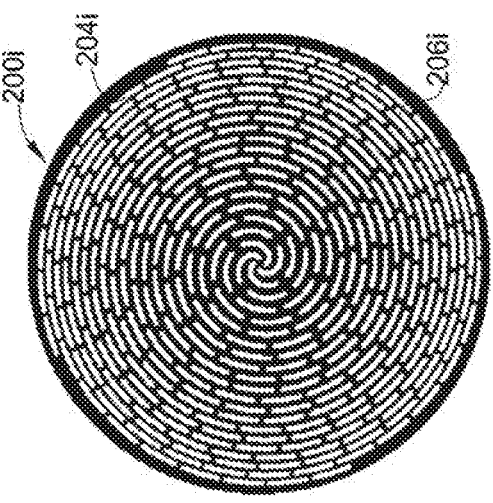
Figure 2J:
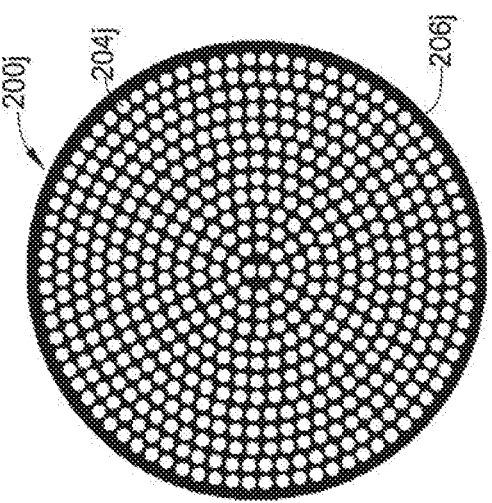
Figure 2K:
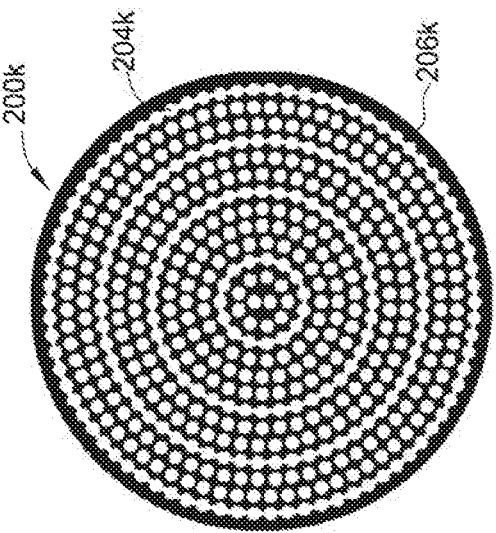

FIG. 2E is a schematic partial sectional view of an advanced polishing pad 200e according to an implementation of the present disclosure. The advanced polishing pad 200e is similar to the advanced polishing pad 200d of FIG. 2D except that the advanced polishing pad 200e includes differently configured interlocking features. The advanced polishing pad 200e may include first polishing elements 204e and second polishing elements 206e having a plurality of concentric rings and/or discrete elements. At least one of the first polishing elements 204e and the second polishing elements 206e may be advanced and formed according to the implementations described herein. In one implementation, the first polishing elements 204e may include horizontal ridges 226 while the second polishing elements 206e may include horizontal recesses 227 to receive the horizontal ridges 226 of the first polishing elements 204e. Alternatively, the second polishing elements 206e may include horizontal ridges while the first polishing elements 204e include horizontal recesses. In one implementation, vertical interlocking features, such as the interlocking features of FIG. 2B and horizontal interlocking features, such as the interlocking features of FIGS. 2D and 2E, may be combined to form an advanced polishing pad.

FIGS. 2F-2K are schematic plan views of various polishing pad designs according to implementations of the present disclosure. Each of FIGS. 2F-2K include pixel charts having white regions (regions in white pixels) that represent the first polishing elements 204f-204k, respectively, for contacting and polishing a substrate, and black regions (regions in black pixels) that represent the second polishing element(s) 206f-206k. As similarly discussed herein, the white regions generally protrude over the black regions so that channels are formed in the black regions between the white regions. In one example, the pixels in a pixel chart are arranged in a rectangular array type pattern (e.g., X and Y oriented array) that are used to define the position of the various materials within a layer, or a portion of layer, of an advanced polishing pad. In another example, the pixels in a pixel chart are arranged in a hexagonal close pack array type of pattern (e.g., one pixel surrounded by six nearest neighbors) that are used to define the position of the various materials within a layer, or a portion of layer of a polishing pad. Polishing slurry may flow through and be retained in the channels during polishing. The polishing pads shown in FIGS. 2F-2K may be formed by depositing a plurality of layers of materials using an additive manufacturing process. Each of the plurality of layers may include two or more materials to form the first polishing elements 204f-204k and the second polishing element(s) 206f-206k. In one implementation, the first polishing element(s) 204f-204k may be thicker than the second polishing element(s) 206f-206k in a direction normal to a plane that is parallel to the plurality of layers of materials so that grooves and/or channels are formed on a top surface of the polishing pad.

The first polishing elements 204a-204k in the advanced polishing pads 200a-200k of FIGS. 2A-2K may be formed from an identical material or identical compositions of materials. Alternatively, the material composition and/or material properties of the first polishing elements 204a-204k in the designs of FIG. 2A-2K may vary from polishing feature to polishing feature. Individualized material composition and/or material properties allow tailoring of the polishing pads for specific needs.

Advanced Polishing Pad Formulation Examples:

The advanced polishing pad described herein may be formed from at least one resin precursor composition as described herein. The resin precursor composition may comprise at least one pre-polymer composition. The pre-polymer composition may be an ink-jettable pre-polymer composition. The resin precursor composition may comprise, consist essentially of, or consist of at least one of: (1) one or more oligomer components; (2) one or more monomer components; (3) one or more photoinitiator components; (4) one or more emulsifiers/surfactants; (5) inorganic particles, organic particles or both; (6) one or more porosity forming agents; and (7) additional additives.

The resin precursor composition comprises one or more oligomer components (1). Any suitable oligomer component capable of achieving targeted properties in the final advanced polishing article may be used. In one implementation, the oligomer component comprises a multifunctional acrylate oligomer comprising a semi-crystalline radiation curable organic material. In one implementation, the semi-crystalline radiation curable oligomeric material is selected from a semi-crystalline aliphatic polyester urethane (meth)acrylate, a semi-crystalline aliphatic polycarbonate urethane (meth)acrylate, a semi-crystalline aliphatic polyether urethane (meth)acrylate, or combinations thereof. The semi-crystalline radiation curable oligomeric material may be mono-functional or multi-functional (e.g., di-functional). In some implementations, the semi-crystalline radiation curable oligomeric material contains more than two acrylates. The one or more oligomer components may comprise at least one of an acrylic oligomer, a urethane (meth)acrylate oligomer, a polyester based (meth)acrylate oligomer, a polyether based (meth)acrylate oligomer, a silicone based meth(acrylate), vinyl(meth)acrylates, an epoxy (meth)acrylate oligomer or any of the other oligomer components described herein. In one implementation, the oligomer component has urea groups attached to the end functional acrylate moieties. Further, the oligomer components can have crystalline or liquid crystalline groups to improve ordering upon crosslinking that can help in maintaining higher elongation and modulus. The oligomer components can have other hydrogen bonding groups like urea and carboxylic acids to improve intermolecular and intramolecular interaction and modulus of the cross-linked pad material. In one implementation, the urethane acrylate group has long chain alkyl groups that form a controlled network structure to improve elongation and modulus of the cross-linked film. The oligomer component may be of low viscosity, low volatility, high reactivity, and low glass transition temperature. The oligomer component may be a multifunctional component. The functionality of the oligomer component may be three or less. The functionality of the oligomer component may be two or less. In one implementation, the semi-crystalline polyester urethane component has a functionality that is greater than or equal to two.

Examples of suitable multifunctional acrylate oligomers include, but are not limited to, those under the designations of BOMAR® BR-744BT aliphatic polyester urethane diacrylate oligomer, BOMAR® BR-742S polyester urethane acrylate oligomer, BOMAR® BR-582E8 aliphatic polyether urethane acrylate oligomer, available from Dymax Corporation. Other suitable acrylate oligomers include BOMAR® BR series BR-144B, BR-144H15, BR-302, BR-371S, BR-372, BR-541S, BR-571, BR-582H15, BR-582I10, BR-930D, BR-5825I30 available from Dymax Corporation.

The one or more oligomer components may comprise at least 5 wt. %, 10 wt. %, 15 wt. %, 20 wt. %, 25 wt. %, 30 wt. %, 35 wt. %, 40 wt. %, 45 wt. %, 50 wt. %, or 55 wt. % based on the total weight of the resin precursor composition. The one or more oligomer components may comprise up to 10 wt. %, 15 wt. %, 20 wt. %, 25 wt. %, 30 wt. %, 35 wt. %, 40 wt. %, 45 wt. %, 50 wt. %, 55 wt. %, or 60 wt. % based on the total weight of the resin precursor composition. The amount of the oligomer component in the resin precursor composition may be from about 5 wt. % to about 60 wt. % based on the total weight of the resin precursor composition (e.g., from about 10 wt. % to about 60 wt. %., from about 10 wt. % to about 30 wt. %; from about 20 wt. % to about 30 wt. %; or from about 25 wt. % to about 30 wt. %).

The resin precursor composition further comprises one or more monomer components (2). The monomer component typically offers good solvency to the oligomer component in ink formulations, which dilutes the ink to a low viscosity. The monomer component may also have a low glass transition temperature, which contributes to the flexibility of ink after curing. The monomer component may be a multifunctional component. The functionality of the monomer component may be three or less. The functionality of the monomer component may be two or less. In one implementation, the monomer component comprises both mono-functional and di-functional monomers. In one implementation, the monomer is an acrylate monomer.

In one implementation, the monomer is an acrylate monomer having an acrylate to urethane ratio of 1:2 or greater. In one implementation, the monomer is an acrylate monomer having two acrylate groups and a viscosity lower than 5 cP and a Tg greater than 30 degrees Celsius.

Examples of suitable mono-functional monomers include, but are not limited to, tetrahydrofurfuryl acrylate (e.g. SR285 from Sartomer®), tetrahydrofurfuryl methacrylate, vinyl caprolactam, isobornyl acrylate ("IBOA"), isobornyl methacrylate, 2-phenoxyethyl acrylate, 2-phenoxyethyl methacrylate, 2-(2-ethoxyethoxy)ethyl acrylate, isooctyl acrylate, isodecyl acrylate, isodecyl methacrylate, lauryl acrylate, lauryl methacrylate, stearyl acrylate, stearyl methacrylate, cyclic trimethylolpropane formal acrylate, 2-[[(Butylamino) carbonyl]oxy]ethyl acrylate (e.g., Genomer 1122 from RAHN USA Corporation or Photomer® 4184 from IGM Resins), 3,3,5-trimethylcyclohexane acrylate, and mono-functional methoxylated PEG (350) acrylate, etc.

Examples of suitable di-functional monomers include, but not are limited to, diacrylates or dimethacrylates of diols and polyether diols, such as propoxylated neopentyl glycol diacrylate, 1,6-hexanediol diacrylate, 1,6-hexanediol dimethacrylate, 1,3-butylene glycol diacrylate, 1,3-butylene glycol dimethacrylate, 1,3-butanediol diacrylate, 1,4-butanediol diacrylate, 1,4-butanediol dimethacrylate, dicyclopentanyl acrylate (e.g., FA-513A from Hitachi Chemical), dicyclopentanyl methacrylate (e.g., FA-513M from Hitachi Chemical), 3,3,5-trimethyl cyclohexyl acrylate (e.g., SR420 from Sartomer®), alkoxylated aliphatic diacrylate (e.g., SR9209A from Sartomer®), diethylene glycol diacrylate, diethylene glycol dimethacrylate, dipropylene glycol diacrylate (e.g., SR508 from Sartomer®), tetrahydrofurfuryl acrylate (e.g., SR285 from Sartomer®), 1,4-butanediylbis[oxy (2-hydroxy-3,1-propanediyl)]bisacrylate, polyether modified polydimethylsiloxane, tripropylene glycol diacrylate, triethylene glycol dimethacrylate, and alkoxylated hexanediol diacrylates, e.g. SR562, SR563, SR564 from Sartomer®.

In one implementation, the monomer is a monofunctional or multifunctional acrylate monomer. In one implementation, the acrylate monomer is selected from the group comprising, consisting of, or consisting essentially of: isobornyl acrylate, dicyclopentanyl acrylate, dicyclopentanyl methacrylate, tetrahydrofurfuryl acrylate, tetrahydrofurfuryl methacrylate, 3,3,5-trimethylcyclohexyl acrylate, 1,3-butanediol diacrylate, 1,4-butanediol diacrylate, cyclohexyl acrylate, 3,3,5-trimethylcyclohexyl methacrylate, N-vinylpyrrolidone, N-vinylimidazole, or combinations thereof.

The one or more monomer components may comprise at least 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, or 75 wt. % based on the total weight of the resin precursor composition. The one or more monomer components may comprise up to 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, or 80 wt. % based on the total weight of the resin precursor composition. The amount of the monomer component in the resin precursor composition may be from about 10 wt. % to about 80 wt. % relative to the total weight of the resin precursor composition (e.g., from about 30 wt. % to about 80 wt. %; from about 50 wt. % to about 80 wt. %; from about 50 wt. % to about 70 wt. %; or from about 60 wt. % to about 70 wt. %).

The resin precursor composition further comprises one or more photoinitiator components (3). In the radiation curing process, the photoinitiator component initiates the curing in response to incident radiation. The selection of the type of the photoinitiator component in the resin precursor composition is generally dependent on the wavelength of curing radiation employed in curing the resin precursor composition. Typically, the peak absorption wavelengths of the selected photoinitiator vary with the range of wavelength of curing radiation to effectively utilize radiation energy, especially using ultraviolet light as radiation.

Two types of free radical photoinitiators may be used in one or more of the implementations of the disclosure provided herein. The first type of photoinitiator, which is also referred to herein as a bulk cure photoinitiator, is an initiator, which cleaves upon exposure to UV radiation, yielding a free radical immediately, which may initiate a polymerization. The first type of photoinitiator can be useful for both surface and through or bulk cure of the dispensed droplets. The first type of photoinitiator may be selected from the group including, but not restricted to benzoin ethers, benzyl ketals, acetyl phenones, alkyl phenones, and phosphine oxides. The second type of photoinitiator, which is also referred to herein as a surface cure photoinitiator, is a photoinitiator that is activated by UV radiation and forms free radicals by hydrogen abstraction from a second compound, which becomes the actual initiating free radical. This second compound is often called a co-initiator or polymerization synergist, and may be an amine synergist. Amine synergists are used to diminish oxygen inhibition, and therefore, the second type of photoinitiator may be useful for fast surface cure. The second type of photoinitiator may be selected from the group including but not restricted to benzophenone compounds and thioxanthone compounds. An amine synergist may be an amine with an active hydrogen, and in one implementation an amine synergist, such as an amine containing acrylate may be combined with a benzophenone photoinitiator in a resin precursor composition formulation to: a) limit oxygen inhibition, b) fast cure a droplet or layer surface so as to fix the dimensions of the droplet or layer surface, and c), increase layer stability through the curing process. In some implementations, to retard or prevent free radical quenching by diatomic oxygen, which slows or inhibits the free radical curing mechanism, one may choose a curing atmosphere or environment that is oxygen limited or free of oxygen. Environments that are oxygen limited or free of oxygen include an inert gas atmosphere, and chemical reagents that are dry, degassed and mostly free of oxygen.

Examples of suitable photoinitiators include, but are not limited to, 1-hydroxycyclohexylphenyl ketone, 4-isopropylphenyl-2-hydroxy-2-methyl propan-1-one, 1-[4-(2-hydroxyethoxy)-phenyl]-2-hydroxy-2-methyl-1-propan-1-one, 2,2-dimethyl-2-hydroxy-acetophenone, 2,2-dimethoxy-2-phenylacetophenone, 2-hydroxy-2-methylpropionphenone, diphenyl (2,4,6-trimethylbenzoyl) phosphine oxide, bis(2,6-dimethoxy-benzoyl)-2,4,6 trimethyl phenyl phosphine oxide, 2-methyl-1-1[4-(methylthio) phenyl]-2-morpholino-propan-1-one, 3,6-bis(2-methyl-2-morpholino-propionyl)-9-n-octylcarbazole, 2-benzyl-2-(dimethylamino)-1-(4-morpholinyl)phenyl)-1-butanone, benzophenone, 2,4,6-trimethylbenzophenone, isopropyl thioxanthone, phenylbis(2,4,6-trimethylbenzoyl)phosphine oxide, 2-hydroxy-2-methyl-1phenyl-1-propanone. Suitable blends of photoinitiators commercially available include, but are not limited to, those under the designations of Darocur 4265, Irgacure 819, Irgacure 1173, Irgacure 2022, Irgacure 2100 from Ciba® Specialty Chemicals; and Esacure KT37, Esacure KT55, Esacure KT0046 from Lamberti®). The photoinitiator could be from BASF, such as Irgacure series 184, 2022, 2100, 250, 270, 295, 369, 379, 500, 651, TPO, TPO-L, 754, 784, 819, 907, 1173, or 4265. The amine synergist can be of secondary or tertiary amino compounds with or without acrylic groups. Examples of these items include diethanolamine, triethanolamine, or acrylated synergistic oligoamines (e.g., Genomer 5142).

In one implementation, the photoinitiator is a free radical-type photoinitiator. In one implementation, the photoinitiator is selected from phenylbis(2,4,6-trimethylbenzoyl)phosphine oxide, 2-hydroxy-2-methyl-1-phenyl-1-propanone, 2,4,6-trimethylbenzoyldiphenyl-phosphine oxide, or combinations thereof. In one implementation, the photoinitiator is selected from a group comprising, consisting of, or consisting essentially of benzoin ethers, benzyl ketals, acetyl phenones, alkyl phenones phosphine oxides, benzophenone compounds, and thioxanthone compounds.

The photoinitiator component in the resin precursor composition may comprise at least 0.1 wt. %, 0.5 wt. %, 1 wt. %, 2 wt. %, 5 wt. %, 10 wt. %, 15 wt. %, or 17 wt. % based on the total weight of the resin precursor composition. The photoinitiator component may comprise up to 0.5 wt. %, 1 wt. %, 2 wt. %, 5 wt. %, 10 wt. %, 15 wt. %, 17 wt. %, or 20 wt. % based on the total weight of the resin precursor composition. The amount of photoinitiator component in the resin precursor composition may be from about 0.1 wt. % to about 20 wt. % relative to the total weight of the resin precursor composition (e.g., from about 0.5 wt. % to about 5 wt. %; from about 0.5 wt. % to about 2.5 wt. %, from about 5 wt. % to about 10 wt. %; from about 10 wt. % to about 15 wt. %; or from about 15 wt. % to about 20 wt. %).

The resin precursor composition may further comprise (4) one or more emulsifiers/surfactants. The one or more emulsifiers are selected from an anionic surfactant, a cationic surfactant, a nonionic surfactant, an amphoteric or a combination thereof. As used herein, "emulsifier" refers to any compound or substance that enables the formation of an emulsion. The emulsifier may be selected from any surface-active compound or polymer capable of stabilizing emulsions, providing the emulsifier contains at least one anionic, cationic, amphoteric or nonionic surfactant and is used in sufficient quantities to provide the resin precursor composition with a porosity-forming agent-in-liquid polymer emulsion. Typically, such surface-active compounds or polymers stabilize emulsions by preventing coalescence of the dispersed amounts of porosity-forming agent within the emulsion. The surface-active compounds useful as emulsifiers in the present resin precursor composition are anionic, cationic, amphoteric or nonionic surfactant or combination of surfactants. Mixtures of surfactants of different types and/or different surfactants of the same type can be used.

The emulsifier/surfactant component in the resin precursor composition may comprise at least 0.1 wt. %, 1 wt. %, 2 wt. %, 5 wt. %, 10 wt. %, 15 wt. %, or 17 wt. % based on the total weight of the resin precursor composition. The emulsifier component may comprise up to 1 wt. %, 2 wt. %, 5 wt. %, 10 wt. %, 15 wt. %, 17 wt. %, or 20 wt. % based on the total weight of the resin precursor composition. The amount of emulsifier component in the resin precursor composition may be from about 0.1 wt. % to about 20 wt. % relative to the total weight of the resin precursor composition (e.g., from about 1 wt. % to about 5 wt. %; from about 5 wt. % to about 10 wt. %; from about 10 wt. % to about 15 wt. %; or from about 15 wt. % to about 20 wt. %).

The resin precursor composition may further comprise inorganic particles, organic particles or both (5). Because the 3D printing process involves layer-by-layer sequential deposition of at least one composition per layer, it may also be appropriate to additionally deposit inorganic or organic particles disposed upon or within a pad layer to obtain a certain pad property and/or to perform a certain function. The inorganic or organic particles may be in the 50 nanometer (nm) to 100 micrometer (μm) range in size and may be added to the precursor materials prior to being dispensed by the 3D printer 306 or added to an uncured printed layer in a ratio of between 1 and 50 weight percent (wt. %). The inorganic or organic particles may be added to during the advanced polishing pad formation process to improve the ultimate tensile strength, improve yield strength, improve the stability of the storage modulus over a temperature range, improve heat transfer, adjust a surfaces zeta potential, and adjust a surface's surface energy.

The particle type, chemical composition, or size, and the added particles may vary by application or targeted effect that is to be achieved. The inorganic or organic particles may be in the 25 nanometer (nm) to 100 micrometer (μm) range in size and may be added to the precursor materials prior to being dispensed by the droplet ejecting printer or added to an uncured printed layer in a ratio of between 1 and about 50 weight percent (wt. %). In some implementations, the particles may include intermetallics, ceramics, metals, polymers and/or metal oxides, such as ceria, alumina, silica, zirconia, zinc oxides, zinc sulfides, nitrides, carbides, or a combination thereof. In one example, the inorganic or organic particles disposed upon or within a pad may include particles of high performance polymers, such as PEEK, PEK, PPS, and other similar materials to improve the thermal conductivity and/or other mechanical properties of the advanced polishing pad.

The particle component in the resin precursor composition may comprise at least 0.1 wt. %, 1 wt. %, 2 wt. %, 5 wt. %, 10 wt. %, 15 wt. %, or 17 wt. % based on the total weight of the resin precursor composition. The particle component may comprise up to 1 wt. %, 2 wt. %, 5 wt. %, 10 wt. %, 15 wt. %, 17 wt. %, or 20 wt. % based on the total weight of the resin precursor composition. The amount of particle component in the resin precursor composition may be from about 0.1 wt. % to about 20 wt. % relative to the total weight of the resin precursor composition (e.g., from about 1 wt. % to about 5 wt. %; from about 5 wt. % to about 10 wt. %; from about 10 wt. % to about 15 wt. %; or from about 15 wt. % to about 20 wt. %).

The resin precursor composition may further comprise one or more porosity-forming agents (6). In one implementation, the porosity-forming agents are selected from the group of glycols, glycol-ethers, amines, or combinations thereof. In one implementation, the porosity-forming agent is selected from the group of ethylene glycol, butanediol, dimer diol, propylene glycol-(1,2) and propylene glycol-(1,3), octane-1,8-diol, neopentyl glycol, cyclohexane dimethanol (1,4-bis-hydroxymethylcyclohexane), 2-methyl-1,3-propane diol, glycerin, trimethylolpropane, hexanediol-(1,6), hexanetriol-(1,2,6) butane triol-(1,2,4), trimethylolethane, pentaerythritol, quinitol, mannitol and sorbitol, methylglycoside, diethylene glycol, triethylene glycol, tetraethylene glycol, polyethylene glycols, dibutylene glycol, polybutylene glycols, ethylene glycol, ethylene glycol monobutyl ether (EGMBE), diethylene glycol monoethyl ether, ethanolamine, diethanolamine (DEA), triethanolamine (TEA) or combinations thereof. The amount of porosity forming agent in the resin precursor composition may be from about 0.1 wt. % to about 20 wt. % relative to the total weight of the resin precursor composition (e.g., from about 1 wt. % to about 5 wt. %; from about 5 wt. % to about 10 wt. %; from about 10 wt. % to about 15 wt. %; or from about 15 wt. % to about 20 wt. %).

The resin precursor composition may further comprise one or more additional additives (7). Additional additives include, but are not limited to stabilizers, surfactants, leveling additives, pH adjusters, sequestering agents, oxygen scavengers, polymer spheres and colorants.

Objects and advantages of the implementations described herein are further illustrated by the following examples. The particular materials and amounts thereof, as well as other conditions and details, recited in these examples should not be used to limit the implementations described herein. Examples of the present disclosure are identified by the letter "E" followed by the sample number while comparative examples, which are not examples of the present disclosure are designated by the letter "X" followed by the sample number.

As noted above, in some implementations, one or more of the materials that are used to form at least one of the two or more polishing elements, such as the first and second polishing elements 204 and 206, is formed by sequentially depositing and post deposition processing of at least one curable resin precursor composition. In general, the curable resin precursor compositions, which are mixed during the precursor formulation process performed in the precursor delivery section 353 (see FIG. 3A) of the additive manufacturing system 350 (see FIG. 3A), will include the formulation of resin precursor compositions that contain functional oligomers, porosity-forming agents (e.g., water), emulsifiers, hydrophobes, reactive diluents and curing components, such as initiators. Examples of some of these components are listed in Table I.

TABLE I

| Reference Name | Description | Functionality | Nominal Viscosity cP | Tg (DMA) (° C.) | Nominal Viscosity cP at 25° C. | Durometer | Tensile at Break MPa [psi] | Elongation At Break (%) |
|---|---|---|---|---|---|---|---|---|
| O1 | Aliphatic Polyester Urethane Diacrylate | 2 | 44,500 at 60° C. | −18 | 38,000 | 69A | 17 [2,500] | 407 |
| O2 | Di-functional Polyester Urethane Acrylate | 2 | 25,000 at 60° C. | 66 | 16,500 | 80D | 31 [4,500] | 76 |

TABLE I-continued

| Reference Name | Description | Functionality | Nominal Viscosity cP | Tg (DMA) (° C.) | Nominal Viscosity cP at 25° C. | Durometer | Tensile at Break MPa [psi] | Elongation At Break (%) |
|---|---|---|---|---|---|---|---|---|
| O3 | Aliphatic Polyether Urethane Acrylate | 2.4 | 60,000 at 50° C. | 23 | 25,000 | 85A | 18 [2,600] | 180 |
| O4 | Tri-functional Polyester Urethane Acrylate | 3 | | 17 | | | | |
| M1 | Isobornyl Acrylate | 1 | | 97 | | | | N/A |
| M2 | Dicyclopentanyl Acrylate | 1 | | | | | | |
| M3 | Dicyclopentanyl Methacrylate | 1 | | | | | | |
| M4 | dipropylene glycol diacrylate | 2 | | 104 | | | 2938 | 5 |
| M5 | tetrahydrofurfuryl acrylate | 1 | | −12 | | | | |
| M6 | 3,3,5-trimethyl cyclohexyl acrylate (TMCHA) | 1 | | 27 | | | | |
| M7 | Isobornyl Acrylate | 1 | | 94 | | | | |
| M8 | 2-[[(Butylamino)carbonyl]oxy]ethyl acrylate | 1 | | | | | | |
| M9 | 1,4-Butanediol diacrylate | | | 45 | | | | |
| M10 | 1,3-Butanediol diacrylate | | | | | | | |
| M11 | 1,4-butanediylbis[oxy(2-hydroxy-3,1-propanediyl)bisacrylate | | | | | | | |
| M12 | Polyether modified polydimethylsiloxane | | | | | | | |
| P1 | Phenylbis(2,4,6-trimethylbenzoyl)phosphine oxide | N/A | N/A | N/A | N/A | N/A | N/A | N/A |
| P2 | 50:50 blend of 2-hydroxy-2-methyl-1-phenyl-1-propanone and 2,4,6-Trimethylbenzoyldiphenyl-phosphine oxide | N/A | N/A | N/A | N/A | N/A | N/A | N/A |
| A1 | Acrylated Amine Synergist | <1 | | | | | | |

Examples of functional oligomers can be found in items O1-O4 in Table I. Examples of reactive diluents and monomers can be found in items M1-M12 in Table I. Examples of curing components are found in items P1-P2 in Table I. Items O1-O3 found in Table I are available from Dymax Corporation, items M2 and M3 are available from Hitachi Chemical, items O4, M4-M6, and M11 are available from Sartomer. Items M1, M7, and M9 are available from Sigma-Aldrich® Co. Item M12 is available from BYK-Gardner GmbH of Germany. Item M8 is available from IGM Resins. Items P1-P2 and A1 are available from Ciba Specialty Chemicals Inc. and RAHN USA Corporation.

One advantage of the additive manufacturing processes described herein includes the ability to form an advanced polishing pad that has properties that can be adjusted based on the composition of the materials and structural configuration of the various materials used within the pad body structure. The information below provides some examples of some material formulations and the affect that varying various components in these formulations and/or processing techniques have on some of the properties needed to form an advanced polishing pad that will achieve improved polishing results over conventional polishing pad designs. The information provided in these examples can be used to form at least a portion of the advanced polishing pad 200, such as part of the first polishing element 204, the second polishing element 206, or both the first and second polishing elements 204 and 206. The examples provided herein are not intended to be limiting as to the scope of the disclosure provided herein, since other similar chemical formulations and processing techniques can be used to adjust some of the properties described herein.

Examples of the curable resin precursor composition components, which are described above and below, are intended to be comparative examples and one skilled in the art can find other suitable monomers/oligomers from various sources to achieve the targeted properties. Some examples for reactive diluents are 2-ethylhexyl acrylate, octyldecyl acrylate, cyclic trimethylolpropane formal acrylate, caprolactone acrylate and alkoxylated lauryl methacrylate. The first material is available from Sigma-Aldrich, and the balance may be obtained from Sartomer USA and/or RAHN AG USA (SR series 203, 217, 238, 242, 306, 339, 355, 368, 420, 484, 502, 506A, 508, SR 531, 550, 585, 495B, 256, 257, 285, 611, 506, 833S, and 9003B, CD series 421A, 535, 545, 553, 590, 730, and 9075, Genomer series 1116, 1117, 1119, 1121, 1122, 5142, 5161, 5275, 6058, 7151, and 7210, Genocure series, BP, PBZ, PMP, DETX, ITX, LBC, LBP, TPO, and TPO-L, and Miramer series, M120, M130, M140, M164, M166, and M170). Some examples for difunctional cross-linkers are bisphenol A glycerolate dimethacrylate, ethylene glycol dimethacrylate, diethylene glycol dimethacrylate, tetraethylene glycol dimethacrylate, 1,6-hexanediol diacrylate and 1,4-butanediol diacrylate, which may be obtained from Sigma-Aldrich. Some examples of oligomers could include aliphatic oligomers (CN series 131, 131B, 132, 152, 508, 549, 2910, 3100 and 3105 from Sartomer USA), polyester acrylate oligomers (CN series 292, 293, 294E, 299, 704, 2200, 2203, 2207, 2261, 2261LV, 2262, 2264, 2267, 2270, 2271E, 2273, 2279, 2282, 2283, 2285 and 2303 from Sartomer USA) and aliphatic urethane oligomers (CN series 929, 959, 961H81, 962, 969, 964A85, 965, 968, 980, 986, 989, 991, 992, 996, 2921, 9001, 9007, 9013, 9178 and 9783 from Sartomer USA). The agents or additives could be supplied from BYK, such as 3550, 3560, 307, 378, 1791, 1794, 9077, A515, A535, JET9510, JET9511, P9908, UV3500, UV3535, DISPERBYK168, and DISPERBYK2008. The first type photoinitiator could be from BASF, such as Irgacure series 184, 2022, 2100, 250, 270, 295, 369, 379, 500, 651, TPO, TPO-L, 754, 784, 819, 907, 1173, or 4265. Additionally, other functional oligomers and resin precursor composition components can be purchased from Allnex Corp., such as the Ebecryl series (EB): 40, 53, 80, 81, 83, 110, 114, 130, 140, 150, 152, 154, 168, 170, 180, 220, 230, 242, 246, 264, 265, 270, 271, 284, 303, 350, 411, 436, 438, 450, 452, 524, 571, 600, 605, 608, 657, 745, 809, 810, 811, 812, 830, 860, 870, 871, 885, 888, 889, 893, 1258, 1290, 1291, 1300, 1360, 1710, 3200, 3201, 3411, 3415, 3418, 3500, 3600, 3700, 3701, 3720, 4265, 4827, 4833, 4849, 4858, 4883, 5129, 7100, 8100, 8296, 8301, 8311, 8402, 8405, 8411, 8412, 8413, 8414, 8465, 8501, 8602, 8701, 8702, 8804, 8807, 8808, and 8810.

Examples of formulations for forming the advanced polishing pads described herein are illustrated below in Table II.

TABLE II

| Item No. | Material Composition (See Table I Ref. Name) | Formulation Composition | Viscosity @ 70° C. (cP) | % EL | UTS |
|---|---|---|---|---|---|
| E1 | O1:M1:P1 | 30:70:2 | 46 | 50 | 19 |
| E2 | O1:M1:P1 | 25:75:2 | 29.5 | 40 | 23 |
| E3 | O1:M1:M4:P1 | 25:65:10:2 | 28.1 | 16 | 26 |
| E4 | O1:M1:M5:M10:P1 | 25:55:10:2 | 25 | 18 | 26 |
| E5 | O1:M1:M6:M9:P1 | 25:60:10:5:2 | 26 | 19 | 26 |
| E6 | O1:M2:P2 | 25:75:2 | 35.6 | 59 | 26 |
| E7 | O1:M2:P2 | 25:95:2 | 22.1 | 32 | 35 |
| E8 | O1:M2:P2 | 25:100:2 | 20.0 | 23 | 34 |
| E9 | O1:M2:M7:P2 | 25:60:25:2 | 25.5 | 50 | 30 |
| E10 | O2:M2:P2 | 25:75:2 | 14.9 | 4 | 42 |
| E11 | O3:M2:P2 | 25:75:2 | 49.3 | 66 | 33 |
| X1 | O4:M3:M8:P2 | 40:45:15:2 | 35 | 28 | 32 |
| X2 | O4:M4:M8:P2 | 40:40:20:2 | 21 | 56 | 22 |

Table III depicts the results for the formulations depicted in Table II. Table III depicts the mechanical performance of the cross-linked films of the formulations disclosed in Table II. Samples were formed in a silicon mold (i.e. they were not 3D printed) and were characterized as per ASTM D638—the standard test method for tensile properties of plastics. All samples were exposed to approximately 1150 mJ/cm$^2$ of UV dose using an H-bulb. The samples had a thickness between 2.5 and 2.8 mm.

TABLE III

| Item No. | % EL | UTS | E'30 (1) | E'90 (1) | E'30 (2) | E'90 (2) | E'30 (1)/ E'90 (1) | E'30 (2)/ E'90 (2) | % Recovery |
|---|---|---|---|---|---|---|---|---|---|
| E1 | 50 | 19 | 671 | 130 | 393 | 117 | 5 | 3 | 59 |
| E2 | 40 | 23 | 845 | 265 | 464 | 206 | 3 | 2 | 55 |
| E3 | 16 | 26 | 1123 | 239 | 668 | 210 | 5 | 3 | 59 |
| E4 | 18 | 26 | 1109 | 109 | 549 | 108 | 10 | 5 | 50 |
| E5 | 19 | 26 | 1028 | 210 | 465 | 210 | 5 | 2.2 | 45 |
| E6 | 59 | 26 | 862 | 126 | 296 | 110 | 7 | 3 | 34 |
| E7 | 32 | 35 | 1195 | 226 | 466 | 152 | 5 | 3 | 39 |
| E8 | 23 | 34 | 1312 | 243 | 594 | 151 | 5 | 4 | 45 |
| E9 | 50 | 30 | 1126 | 258 | 443 | 183 | 4 | 2 | 39 |
| E10 | 4 | 42 | 1582 | 46 | 310 | 46 | 34 | 7 | 20 |
| E11 | 66 | 33 | 1086 | 5 | 352 | 5 | 230 | 73 | 32 |
| X1 | 28 | 32 | 1327 | 24 | 509 | 25 | 55 | 20 | 38 |
| X2 | 56 | 22 | 437 | 8 | 116 | 8 | 56 | 15 | 27 |

Additional examples of formulations for forming the advanced polishing pads described herein are illustrated below in Table IV.

TABLE IV

| Item No. | Material Composition (See Table I Ref. Name) | Formulation Composition | Viscosity @ 70° C. (cP) | % EL | UTS |
|---|---|---|---|---|---|
| E14 | O1:M7:M6:M9:P1 | 25:60:10:5:2 | 25 | 18 | 30 |
| E15 | O1:M7:M6:M9:P2 | 24.5:53:15:7.5:2 | 20.5 | 17 | 35 |
| E16 | O1:M7:M6:M9:P2:M11:M12 | 24.5:53:15:7.5:2 | 21 | 17 | 36 |
| E17 | O1:M2:P2 | 25:95:2 | 22.1 | 12 | 39 |
| E18 | O1:M3:P2:M11:M12:A1 | 25:95:2:0.3:0.1:2.25 | 22 | | |

Table V depicts the results for the formulations depicted in Table IV. Table V depicts the mechanical performance of the cross-linked films of the formulations disclosed in Table IV. Samples were formed in a silicon mold (i.e. they were not 3D printed) and were characterized as per ASTM D638—the standard test method for tensile properties of plastics. All samples were exposed to approximately 1150 mJ/cm$^2$ of UV dose using an H-bulb. The samples have a thickness between 2.5 and 2.8 mm.

TABLE V

| Item No. | % EL | UTS | E'30 (1) | E'90 (1) | E'30 (2) | E'90 (2) | E'30 (1)/ E'90 (1) | E'30 (2)/ E'90 (2) | % Recovery |
|---|---|---|---|---|---|---|---|---|---|
| E14 | 18 | 30 | 1411 | 48 | 607 | 48 | 29 | 13 | 43 |
| E15 | 17 | 35 | 1417 | 54 | 686 | 48 | 29 | 13 | 43 |
| E16 | 17 | 36 | 1335 | 42 | 544 | 41 | 32 | 13 | 41 |
| E17 | 12 | 39 | 1459 | 76 | 448 | 65 | 19 | 7 | 31 |

Figure 3A:
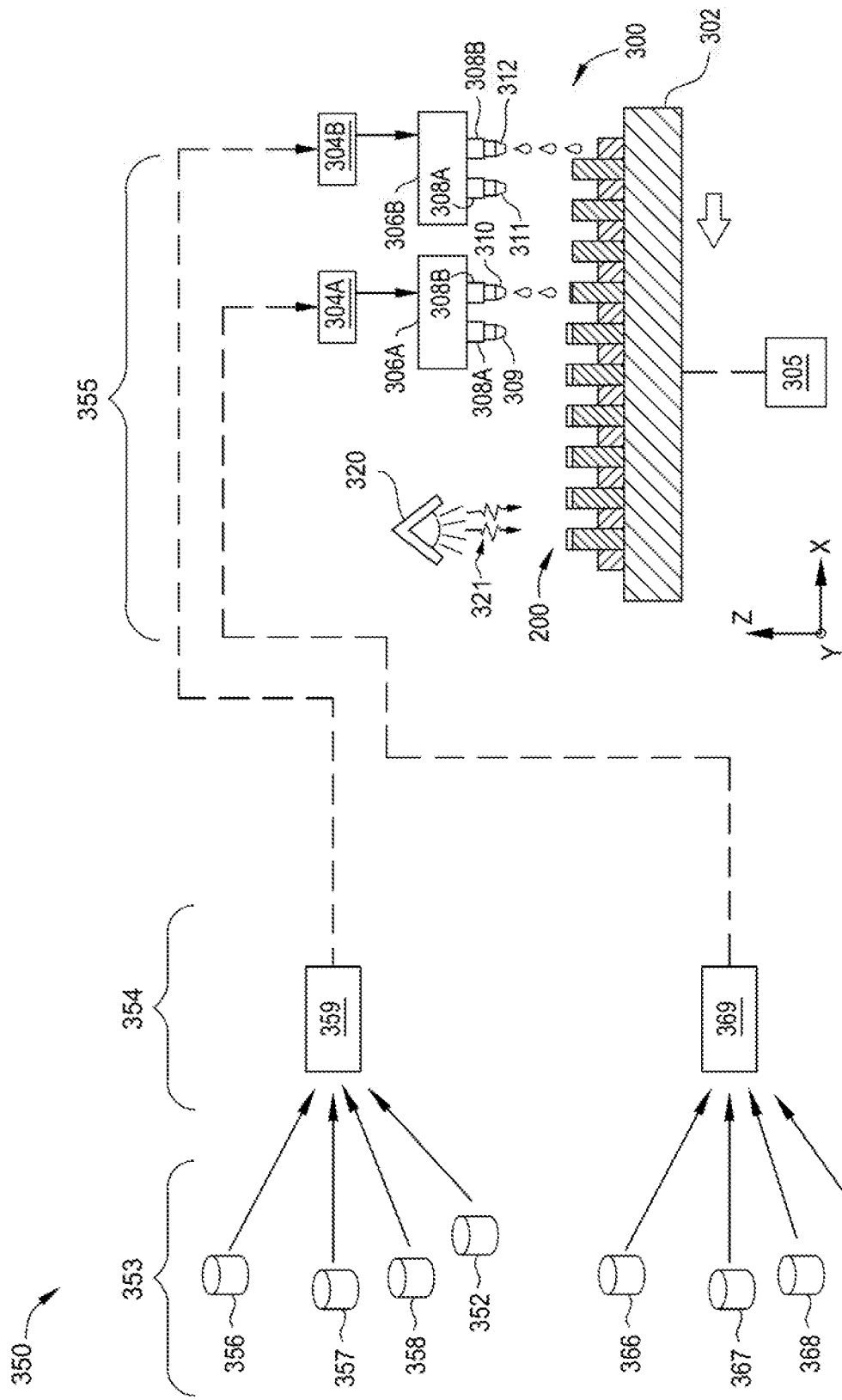
FIG. 3A is a schematic view of a system for manufacturing advanced polishing pads, according to an implementation of the present disclosure.

FIG. 3A is a schematic sectional view of an additive manufacturing system 350 that can be used to form an advanced polishing pad using an additive manufacturing process according to one or more implementations of the present disclosure. An additive manufacturing process may include, but is not limited to a process, such as a polyjet deposition process, inkjet printing process, fused deposition modeling process, binder jetting process, powder bed fusion process, selective laser sintering process, stereolithographic process, vat photopolymerization process, digital light processing, sheet lamination process, directed energy deposition process, or other similar 3D deposition process.

The additive manufacturing system 350 generally includes a precursor delivery section 353, a precursor formulation section 354 and a deposition section 355. The precursor formulation section 354 includes a section of the additive manufacturing system 350 where the resin precursor components positioned in the precursor delivery section 353 are mixed to form one or more resin precursor compositions. The deposition section 355 will generally include an additive manufacturing device, or hereafter printing station 300, that is used to deposit one or more resin precursor compositions on layers disposed over a support 302. The advanced polishing pad 200 may be printed on the support 302 within the printing station 300. Typically, the advanced polishing pad 200 is formed layer-by-layer using one or more droplet ejecting printers 306, such as printer 306A and printer 306B illustrated in FIG. 3A, from a CAD (computer-aided design) program. The printers 306A, 306B and the support 302 may move relative to each other during the printing process.

The droplet ejecting printer 306 may include one or more print heads 308 (e.g., print heads 308A, 308B) having one or more nozzles (e.g., nozzles 309-312) for dispensing liquid precursors. In the implementation of FIG. 3A, the printer 306A includes print head 308A that has a nozzle 309 and a print head 308B having a nozzle 310. The nozzle 309 may be configured to dispense a first liquid precursor composition to form a first polymer material, such as a porous polymer, while the nozzle 310 may be used to dispense a second liquid precursor to form a second polymer material, such as a non-porous polymer, or a porous polymer. The liquid precursor compositions may be dispensed at selected locations or regions to form a porous polishing pad that has targeted properties. These selected locations collectively form the target printing pattern that can be stored as a CAD-compatible file that is then read by an electronic controller 305, which controls the delivery of the droplets from the nozzles of the droplet ejecting printer 306.

The electronic controller 305 is generally used to facilitate the control and automation of the components within the additive manufacturing system 350, including the printing station 300. The electronic controller 305 can be, for example, a computer, a programmable logic controller, or an embedded controller. The electronic controller 305 typically includes a central processing unit (CPU) (not shown), memory (not shown), and support circuits for inputs and outputs (I/O) (not shown). The CPU may be one of any form of computer processors that are used in industrial settings for controlling various system functions, substrate movement, chamber processes, and control support hardware (e.g., sensors, motors, heaters, etc.), and monitor the processes performed in the system. The memory is connected to the CPU, and may be one or more of a readily available non-volatile memory, such as random access memory (RAM), flash memory, read only memory (ROM), floppy disk, hard disk, or any other form of digital storage, local or remote. Software instructions and data can be coded and stored within the memory for instructing the CPU. The support circuits are also connected to the CPU for supporting the processor in a conventional manner. The support circuits may include cache, power supplies, clock circuits, input/output circuitry, subsystems, and the like. A program (or computer instructions) readable by the electronic controller 305 determines which tasks are performable by the components in the additive manufacturing system 350. The program may be software readable by the electronic controller 305 that includes code to perform tasks relating to monitoring, execution and control of the delivery and positioning of droplets delivered from the printer 306, and the movement, support, and/or positioning of the components within the printing station 300 along with the various process tasks and various sequences being performed in the electronic controller 305.

After 3D printing, the advanced polishing pad 200 may be solidified or partially solidified by use of a curing device 320 that is disposed within the deposition section 355 of the additive manufacturing system 350. The curing process performed by the curing device 320 may be performed by heating the printed polishing pad to a curing temperature or exposing the pad to one or more forms of electromagnetic radiation or electron beam curing. In one example, the curing process may be performed by exposing the printed polishing pad to radiation 321 generated by an electromagnetic radiation source, such as a visible light source, an ultraviolet light source, x-ray source, or other type of electromagnetic wave source that is disposed within the curing device 320.

The additive manufacturing process offers a convenient and highly controllable process for producing advanced polishing pads with discrete features formed from different materials and/or different compositions of materials.

In another implementation, the first polishing elements 204 and/or the second polishing element(s) 206 may each be formed from a mixture of two or more compositions. In one example, a first composition may be dispensed in the form of droplets by a first print head, such as the print head 308A, and the second composition may be dispensed in the form of droplets by a second print head, such as the print head 308B of the printer 306A. To form first polishing elements 204 with a mixture of the droplets delivered from multiple print heads typically includes the alignment of the pixels corresponding to the first polishing elements 204 on predetermined pixels within a deposition map found in the electronic controller 305. The print head 308A may then align with the pixels corresponding to where the first polishing elements 204 are to be formed and then dispense droplets on the predetermined pixels. Thus, in one implementation, the advanced polishing pad is formed from a first composition of materials that is formed by depositing droplets of a first droplet composition and a second material that comprises a second composition of materials that is formed by depositing droplets of a second droplet composition.

FIG. 3B is a schematic cross-sectional view of a portion of the printing station 300 and the advanced polishing pad 200 during the pad manufacturing process. The printing station 300, as shown in FIG. 3B, includes two printers 306A and 306B that are used to sequentially form a portion of the advanced polishing pad 200. The portion of the advanced polishing pad 200 shown in FIG. 3B may, for example, include part of either the first polishing element 204 or the second polishing elements 206 in the finally formed advanced polishing pad 200. During processing, the printers 306A and 306B are configured to deliver droplets "A" or "B," respectively, to a first surface of the support 302 and then successively to a surface of the growing polishing pad that is disposed on the support 302 in a layer-by-layer process.

As shown in FIG. 3B, a second layer 348 is deposited over a first layer 346 which has been formed on the support 302. In one implementation, the second layer 348 is formed over the first layer 346, which has been processed by the curing device 320 that is disposed downstream from the printers 306A and 306B in the pad manufacturing process. In some implementations, portions of the second layer 348 may be simultaneously processed by the curing device 320 while one or more of the printers 306A and 306B are depositing droplets "A" and/or "B" onto the surface 346A of the previously formed first layer 346. In this case, the layer that is currently being formed may include a processed portion 348A and an unprocessed portion 348B that are disposed on either side of a curing zone 349A. The unprocessed portion 348B generally includes an array of dispensed droplets, such as dispensed droplets 343 and 347, which are deposited on the surface 346A of the previously formed first layer 346 by use of the printers 306B and 306A, respectively.

FIG. 3C is a close up cross-sectional view of a dispensed droplet 343 that is disposed on a surface 346A of the previously formed first layer 346. Based on the properties of the materials within the dispensed droplet 343, and due to surface energy of the surface 346A the dispensed droplet will spread across the surface an amount that is larger than the size of the original dispensed droplet (e.g., droplets "A" or "B"), due to surface tension. The amount of spread of the dispensed droplet will vary as a function of time from the instant that the droplet is deposited on the surface 346A. However, after a very short period of time (e.g., <1 second) the spread of the droplet will reach an equilibrium size, and have an equilibrium contact angle α. The spread of the dispensed droplet across the surface affects the resolution of the placement of the droplets on the surface of the growing polishing pad, and thus the resolution of the features and material compositions found within various regions of the final polishing pad.

In some implementations, it is useful to expose one or both of the droplets "A" and "B" after they have been contact with the surface of the substrate for a period of time to cure, or "fix," each droplet at a targeted size before the droplet has a chance to spread to its uncured equilibrium size on the surface of the substrate. In this case, the energy supplied to the dispensed droplet and surface on which the droplet is placed by the curing device 320 and the droplet's material composition are adjusted to control the resolution of each of the dispensed droplets. Therefore, one optional parameter to control or tune during a 3D printing process is the control of the dispensed droplet's surface tension relative to the surface on which the droplet is disposed.

In some implementations, it is useful to add one or more curing enhancement components (e.g., photoinitiators) to the droplet's formulation to control the kinetics of the curing process, prevent oxygen inhibition, and/or control the contact angle of the droplet on the surface on which the droplet is deposited. One will note that the curing enhancement components will generally include materials that are able to adjust: 1) the amount of bulk curing that occurs in the material in the dispensed droplet during the initial exposure to a targeted amount of electromagnetic radiation, 2) the amount of surface curing that occurs in the material in the dispensed droplet during the initial exposure to a targeted amount of electromagnetic radiation, and 3) the amount of surface property modification (e.g., additives) to the surface cured region of the dispensed droplet. The amount of surface property modification to the surface cured region of the dispensed droplet generally includes the adjustment of the surface energy of the cured or partially cured polymer found at the surface of the dispensed and at least partially cured droplet.

It has been found that it is useful to partially cure each dispensed droplet to "fix" its surface properties and dimensional size during the printing process. The ability to "fix" the droplet at a targeted size can be accomplished by adding a targeted amount of at least one curing enhancement components to the droplet's material composition and delivering a sufficient amount of electromagnetic energy from the curing device 320 during the additive manufacturing process. In some implementations, it is useful to use a curing device 320 that is able to deliver between about 1 milli-joule per centimeter squared ($mJ/cm^2$) and 100 $mJ/cm^2$, such as about 10-20 $mJ/cm^2$, of ultraviolet (UV) light to the droplet during the additive layer formation process. The UV radiation may be provided by any UV source, such as mercury microwave arc lamps (e.g., H bulb, H+bulb, D bulb, Q bulb, and V bulb type lamps), pulsed xenon flash lamps, high-efficiency UV light emitting diode arrays, and UV lasers. The UV radiation may have a wavelength between about 170 nm and about 500 nm.

In some implementations, the size of dispensed droplets "A", "B" may be from about 10 to about 200 microns, such as about 50 to about 70 microns. Depending on the surface energy (dynes) of the substrate or polymer layer that the droplet is dispensed over and upon, the uncured droplet may spread on and across the surface to a fixed droplet size 343A of between about 10 and about 500 microns, such as between about 50 and about 200 microns. In one example, the height of such a droplet may be from about 5 to about 100 microns, depending on such factors as surface energy, wetting, and/or resin precursor composition, which may include other additives, such as flow agents, thickening agents, and surfactants. One source for the additives is BYK-Gardner GmbH of Geretsried, Germany.

In some implementations, it is generally useful to select a photoinitiator, an amount of the photoinitiator in the droplet composition, and the amount of energy supplied by the curing device 320 to allow the dispensed droplet to be "fixed" in less than about 1 second, such as less than about 0.5 seconds after the dispensed droplet has come in contact with the surface on which it is to be fixed. The actual time it takes to partially cure the dispensed droplet, due to the exposure to delivered curing energy, may be longer or shorter than the time that the droplet resides on the surface before it is exposed to the delivered radiation, since the curing time of the dispensed droplet will depend on the amount of radiant energy and wavelength of the energy provided from the curing device 320. In one example, an exposure time used to partially cure a 120 micrometer (μm) dispensed droplet is about 0.4 microseconds (μs) for a radiant exposure level of about 10-15 $mJ/cm^2$ of UV radiation. In an effort to "fix" the droplet in this short timeframe one must position the dispense nozzle of the droplet ejecting printer 306 a short distance from the surface of the polishing pad, such as between 0.1 and 10 millimeters (mm), or even 0.5 and 1 mm, while the surface 346A of the advanced polishing pad are exposed to the radiation 321 delivered from the curing device 320. It has also been found that by controlling droplet composition, the amount of cure of the previously formed layer (e.g., surface energy of the previously formed layer), the amount of energy from the curing device 320 and the amount of the photoinitiator in the droplet composition, the contact angle α of the droplet can be controlled to control the fixed droplet size, and thus the resolution of the printing process. In one example, the underlying layer cure may be a cure of about 70% acrylate conversion. A droplet that has been fixed, or at least partially cured, is also referred to herein as a cured droplet. In some implementations, the fixed droplet size 343A is between about 10 and about 200 microns. In some implementations, the contact angle, also referred to herein as the dynamic contact angle (e.g., non-equilibrium contact angle), for a "fixed" droplet can be desirably controlled to a value of at least 50°, such as greater than 55°, or even greater than 60°, or even greater than 70°.

The resolution of the pixels within a pixel chart that is used to form a layer, or a portion of a layer, by an additive manufacturing process can be defined by the average "fixed" size of a dispensed droplet. The material composition of a layer, or portion of a layer, can thus be defined by a "dispensed droplet composition", which a percentage of the total number of pixels within the layer, or portion of the layer, that include droplets of a certain droplet composition. In one example, if a region of a layer of a formed advanced polishing pad is defined as having a dispensed droplet composition of a first dispensed droplet composition of 60%, then 60% percent of the pixels within the region will include a fixed droplet that includes the first material composition. In cases where a portion of a layer contains more than one material composition, it may also be useful to define the material composition of a region within an advanced polishing pad as having a "material composition ratio." The material composition ratio is a ratio of the number of pixels that have a first material composition disposed thereon to the number of pixels that have a second material composition disposed thereon. In one example, if a region was defined as containing 1,000 pixels, which are disposed across an area of a surface, and 600 of the pixels contain a fixed droplet of a first droplet composition and 400 of the pixels contain a fixed droplet of a second droplet composition then the material composition ratio would include a 3:2 ratio of the first droplet composition to the second droplet composition. In implementations where each pixel may contain greater than one fixed droplet (e.g., 1.2 droplets per pixel) then the material composition ratio would be defined by the ratio of the number of fixed droplets of a first material to the number of fixed droplets of a second material that are found within a defined region. In one example, if a region was defined as containing 1,000 pixels, and there were 800 fixed droplet of a first droplet composition and 400 fixed droplets of a second droplet composition within the region, then the material composition ratio would be 2:1 for this region of the advanced polishing pad.

The amount of curing of the surface of the dispensed droplet that forms the next underlying layer is a notable polishing pad formation process parameter, since the amount of curing in this "initial dose" affects the surface energy that the subsequent layer of dispensed droplets will be exposed to during the additive manufacturing process. The amount of the initial cure dose is also notable since it will also affect the amount of curing that each deposited layer will finally achieve in the formed polishing pad, due to repetitive exposure of each deposited layer to additional transmitted curing radiation supplied through the subsequently deposited layers, as they are grown thereon. It is generally useful to prevent over curing of a formed layer, since it will affect the material properties of the over cured materials and/or the wettability of the surface of the cured layer to subsequently deposited dispensed droplets in subsequent process. In one example, to effect polymerization of a 10-30 micron thick layer of dispensed droplets may be performed by dispensing each droplet on a surface and then exposing the dispensed droplet to UV radiation at a radiant exposure level of between about 10 and about 15 $mJ/cm^2$ after a period of time of between about 0.1 seconds and about 1 second has elapsed. However, in some implementations, the radiation level delivered during the initial cure dose may be varied layer by layer. For example, due to differing dispensed droplet compositions in different layers, the amount of UV radiation exposure in each initial dose may be adjusted to provide a useful level of cure in the currently exposed layer, and to one or more of the underlying layers.

In some implementations, it is useful to control the droplet composition and the amount of energy delivered from the curing device 320 during the initial curing process, which is a process in which the deposited layer of dispensed droplets are directly exposed to the energy provided by the curing device 320, to cause the layer to only partially cure a targeted amount. In general, it is useful for the initial curing process to predominantly surface cure the dispensed droplet versus bulk cure the dispensed droplet, since controlling the surface energy of the formed layer is notable for controlling the dispensed droplet size. In one example, the amount that a dispensed droplet is partially cured can be defined by the amount of chemical conversion of the materials in the dispensed droplet. In one example, the conversion of the acrylates found in a dispensed droplet that is used to form a urethane polyacrylate containing layer, is defined by a percentage x, which is calculated by the equation:

$$x = 1 - \frac{(A_{C=C}/A_{C=O})_x}{(A_{C=C}/A_{C=O})_0},$$

where $A_{C=C}$ and $A_{C=O}$ are the values of the C=C peak at 910 cm$^{-1}$ and the C=O peaks at 1700 cm$^{-1}$ found using FT-IR spectroscopy. During polymerization, C=C bonds within acrylates are converted to C—C bond, while C=O within acrylates has no conversion. The intensity of C=C to C=O hence indicates the acrylate conversion rate. The $A_{C=C}/A_{C=O}$ ratio refers to the relative ratio of C=C to C=O bonds within the cured droplet, and thus the $(A_{C=C}/A_{C=O})_0$ denotes the initial ratio of $A_{C=C}$ to $A_{C=O}$ in the droplet, while $(A_{C=C}/A_{C=O})_x$ denotes the ratio of $A_{C=C}$ to $A_{C=O}$ on the surface of the substrate after the droplet has been cured. In some implementations, the amount that a layer is initially cured may be equal to or greater than about 70% of the dispensed droplet. In some implementations, it may be useful to partially cure the material in the dispensed droplet during the initial exposure of the dispensed droplet to the curing energy to a level from about 70% to about 80%, so that the target contact angle of the dispensed droplet may be attained. It is believed that the uncured or partially acrylate materials on top surface are copolymerized with the subsequent droplets, and thus yield cohesion between the layers.

The process of partially curing a dispensed droplet during the initial layer formation process can also be notable to assure that there will be some chemical bonding/adhesion between subsequently deposited layers, due to the presence of residual unbonded groups, such as residual acrylic groups. Since the residual unbonded groups have not been polymerized, they can be involved in forming chemical bonds with a subsequently deposited layer. The formation of chemical bonds between layers can thus increase the mechanical strength of the formed advanced polishing pad in the direction of the layer by layer growth during the pad formation process (e.g., Z-direction in FIG. 3B). As noted above, the bonding between layers may thus be formed by both physical and/or chemical forces.

The mixture of the dispensed droplet, or positioning of the dispensed droplets, can be adjusted on a layer-by-layer basis to form layers that individually have tunable properties, and a polishing pad that has targeted pad properties that are a composite of the formed layers. In one example, as shown in FIG. 3B, a mixture of dispensed droplets includes a 50:50 ratio of the dispensed droplets 343 and 347 (or a material composition ratio of 1:1), wherein the dispensed droplet 343 includes at least one different material from the material found in the dispensed droplet 347. Properties of portions of the pad body 202, such as the first polishing elements 204 and/or second polishing elements 206 may be adjusted or tuned according to the ratio and/or distribution of a first composition and a second composition that are formed from the positioning of the dispensed droplets during the deposition process. For example, the weight % of the first composition may be from about 1% by weight based on total composition weight to about 100% based on total composition weight. In a similar fashion, the second composition may be from about 1% by weight based on total composition weight to about 100% based on total composition weight. Depending on the material properties that are required, such as hardness and/or storage modulus, compositions of two or more materials can be mixed in different ratios to achieve a targeted effect. In one implementation, the composition of the first polishing elements 204 and/or second polishing elements 206 is controlled by selecting at least one composition or a mixture of compositions, and size, location, and/or density of the droplets dispensed by one or more printers. Therefore, the electronic controller 305 is generally adapted to position the nozzles 309-310, 311-312 to form a layer that has interdigitated droplets positioned in a targeted density and pattern on the surface of the polishing pad being formed. In some implementations, dispensed droplets may be deposited in such a way as to ensure that each drop is placed in a location where it does not blend with other drops, and thus each remains a discrete material "island" prior to being cured. In some implementations, the dispensed droplets may also be placed on top of prior dispensed droplets within the same layer to increase the build rate or blend material properties. Placement of droplets relative to each other on a surface may also be adjusted to allow partial mixing behavior of each of the dispensed droplets in the layer. In some cases, it may be useful to place the droplets closer together or farther apart to provide more or less mixing of the components in the neighboring droplets, respectively. It has been found that controlling droplet placement relative to other dispensed droplets and the composition of each droplet can have an effect on the mechanical and polishing properties of the formed advanced polishing pad.

In some implementations, dispensed droplets of at least two different resin precursor compositions may be deposited in such a way as to ensure that each drop is placed in a location on the surface where it does not blend with other drops, and thus each remains a discrete material "island" prior to being cured. In one implementation, each of the at least two resin precursor compositions are formulated to provide a material that has a different zeta potential, so that the average zeta potential over a targeted area of a surface of the formed polishing pad can be adjusted and/or controlled by adjusting the percentage of droplets of each type of resin precursor composition within the targeted area. Additionally or alternately, the placement of the droplets the at least two different resin precursor compositions is adjusted to allow at least partial mixing of each of the dispensed droplets in the deposited layer. Thus, in the case where each of the at least two resin precursor compositions are formulated to provide a material having different zeta potential, and the average zeta potential over a targeted area of a surface of the formed polishing pad can be adjusted and/or controlled by adjusting the amount of intermixing of dispensed droplets of each type of resin precursor composition within at least a portion of the targeted area.

Even though only two compositions are generally discussed herein for forming the first polishing elements 204 and/or second polishing elements 206, implementations of the present disclosure encompass forming features on a polishing pad with a plurality of materials that are interconnected via compositional gradients. In some implementations, the composition of the first polishing elements 204 and/or second polishing elements 206 in a polishing pad are adjusted within a plane parallel to the polishing surface and/or through the thickness of the polishing pad, as discussed further below.

The ability to form compositional gradients and the ability to tune the chemical content locally, within, and across an advanced polishing pad are enabled by "ink jettable" low viscosity compositions, or low viscosity "inks" in the 3D printing arts that are used to form the droplets "A" and/or "B" illustrated in FIG. 3B. The low viscosity inks are "pre-polymer" compositions and are the "precursors" to the formed first polishing elements 204 and second polishing elements 206 found in the pad body 202. The low viscosity inks enable the delivery of a wide variety of chemistries and discrete compositions that are not available by conventional techniques (e.g., molding and casting), and thus enable controlled compositional transitions or gradients to be formed within different regions of the pad body 202. This is achieved by the addition and mixing of viscosity thinning reactive diluents to high viscosity functional oligomers to achieve the appropriate viscosity formulation, followed by copolymerization of the diluent(s) with the higher viscosity functional oligomers when exposed to a curing energy delivered by the curing device 320. The reactive diluents may also serve as a solvent, thus eliminating the use of inert non-reactive solvents or thinners that must be removed at each stage.

Referring to the precursor delivery section 353 and precursor formulation section 354 of FIG. 3A, in one implementation, a first precursor 356, and optionally a second precursor 357, and optionally a first porosity-forming agent/emulsifier mixture 352 are mixed with a diluent 358 to form a first printable ink composition 359, which is delivered to reservoir 304B of the printer 306B, and used to form portions of the pad body 202. Similarly, a third precursor 366, and optionally a fourth precursor 367, and optionally a second porosity-forming agent/emulsifier mixture 365 can be mixed with a diluent 368 to form a second printable ink composition 369, which is delivered to reservoir 304A of the printer 306A, and used to form another portion of the pad body 202. In one implementation, the first precursor 356 and the third precursor 366 each comprise a first oligomer, such as a multifunctional oligomer, the second precursor 357 and the fourth precursor 367 each comprise a monomer, such as a multifunctional monomer, the diluent 358 and the diluent 368 each comprise a reactive diluent (e.g., monomer) and/or initiator (e.g., photo-initiator).

One example of a first printable ink composition 359 may include a first precursor 356 which includes a semi-crystalline radiation curable oligomeric material as described herein, is then mixed with and thus diluted by a reactive diluent (e.g., diluent 358), such as monoacrylate, to create a new composition that has new viscosity. In one implementation, the printable composition obtained exhibits a viscosity in a range from about 5 cP to about 100 cP at 70 degrees Celsius, a viscosity in a range from about 5 cP to about 50 cP at 70 degrees Celsius, a viscosity in a range from about 10 cP to about 20 cP at 70 degrees Celsius, which may be effectively dispensed from a 3D printer ink jet nozzle.

FIG. 4A is a schematic view of a web based polishing pad 400a that is formed using an additive manufacturing process to form a polishing surface or upper surface(s) 208 that has a gradient in material composition across the polishing surface or upper surface(s) 208 (e.g., Y-direction). As shown in FIG. 4A the polishing material may be disposed over a platen 102 between a first roll 481 and a second roll 482. By building a web, or even standard polishing pad, with differing regions of mechanical properties the substrate can be moved over different locations on the web based polishing pad 400a during different portions of the polishing process to provide the targeted mechanical properties during each phase of the polishing process. One example may involve a substrate having an initial surface texture removed rapidly using a planarizing portion of the web based polishing pad 400a that has a first set of mechanical properties and then moving the substrate to a second portion of the web based polishing pad 400a that has a second set of mechanical properties that may be identical to or different than the first set of mechanical properties.

FIG. 4B is schematic side cross-sectional view of an advanced polishing pad 400b that is formed using an additive manufacturing process to form a polishing base layer 491 that has a gradient in material composition in the Z-direction. Gradients in the material composition and/or material properties of the stacked printed layers of the polishing base layer 491 can vary from a high concentration to a low concentration of a first material to a second material in one direction, or vice versa. In some cases, one or more regions within the advanced polishing pad may include more complex concentration gradients, such as a high/low/high or low/high/low concentration gradient of at least two materials that have differing material properties. In some implementations, the advanced polishing pad 400b may include a polishing element region 494 that may include discrete regions that include at least a first polishing element 204 and a second polishing element 206. In one example, the polishing element region 494 may include a portion of a pad body 202 that contains one or more of the structures shown in FIGS. 2A-2K.

In one implementation, the polishing base layer 491 includes a homogeneous mixture of two or more different materials in each layer formed within the polishing base layer 491. In one example, the homogeneous mixture may include a mixture of the materials used to form the first polishing element 204 and the second polishing element 206 in each layer formed within the polishing base layer 491. In some implementations, it is useful to vary the composition of the homogeneous mixture of materials layer-by-layer to form a gradient in material composition in the layer growth direction (e.g., Z-direction in FIG. 4B). The phrase homogeneous mixture is intended to generally describe a material that has been formed by dispensing and curing printed droplets that have at least two different compositions within each layer, and thus may contain a mixture of small regions of the at least two different compositions that are each sized at a targeted resolution. The interface between the polishing base layer 491 and the polishing element region 494 may include a homogeneous blend of the materials found at the upper surface of the polishing base layer 491 and the lower surface of the polishing element region 494, or include a discrete transition where the differing material composition in the first deposited layer of the polishing element region 494 is directly deposited on the surface of the polishing base layer 491.

In some implementations of the polishing element region 494, or more generally any of the pad bodies 202 described above, it is useful to form a porosity gradient in the material composition in the first polishing elements 204 and/or second polishing elements 206 in a direction normal to the polishing surface of the porous polishing pad. In one example, it is useful to have higher concentrations of a material composition used to form the low porosity features in the printed layers near the base of the porous polishing pad (e.g., opposite to the polishing surface), and higher concentrations of a material composition used to form the high porosity features in the printed layers near the polishing surface of the porous polishing pad. In another example, it is useful to have higher concentrations of a material composition used to form the high porosity features in the printed layers near the base of the porous polishing pad, and a higher concentration of a material composition used to form the low porosity features in the printed layers near the polishing surface of the porous polishing pad.

In one implementation, it is useful to form a gradient in the material composition within the material used to form the first and/or second polishing elements in a direction normal to the polishing surface of the porous polishing pad. In one example, it is useful to have higher concentrations of a material composition used to form the second polishing elements 206 in the printed layers near the base of the porous polishing pad (e.g., opposite to the polishing surface), and higher concentrations of a material composition used to form the first polishing elements 204 in the printed layers near the polishing surface of the porous polishing pad. In another example, it is useful to have higher concentrations of a material composition used to form the first polishing elements 204 in the printed layers near the base of the porous polishing pad, and a higher concentration of a material composition used to form the second polishing elements 206 in the printed layers near the polishing surface of the porous polishing pad. For example, a first layer may have a material composition ratio of the first printed composition to the second printed composition of 1:1, a material composition ratio of the first printed composition to the second printed composition of 2:1 in a second layer and a material composition ratio of the first printed composition to the second printed composition of 3:1 in a third layer. In one example, the first printed composition has a higher porosity containing material than the second printed composition, and the direction of sequential growth of the first, second and third layers is away from a supporting surface of the porous polishing pad. A gradient can also be formed within different parts of a single layer by adjusting the placement of the printed droplets within the plane of the deposited layer.

Figure 5B:
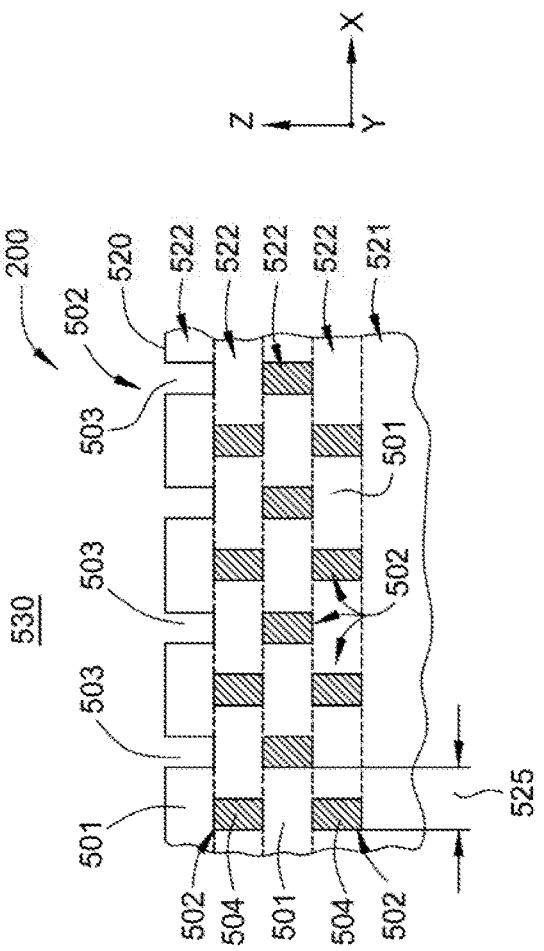
FIG. 5B is a schematic side cross-sectional view of a portion of an advanced polishing pad, according to an implementation of the present disclosure.
Figure 5C:
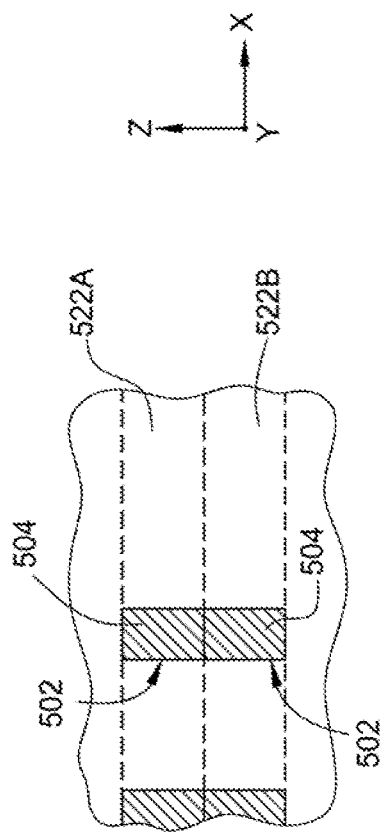
FIG. 5C is a schematic side cross-sectional view of a portion of an advanced polishing pad, according to an implementation of the present disclosure.
Figure 5A:
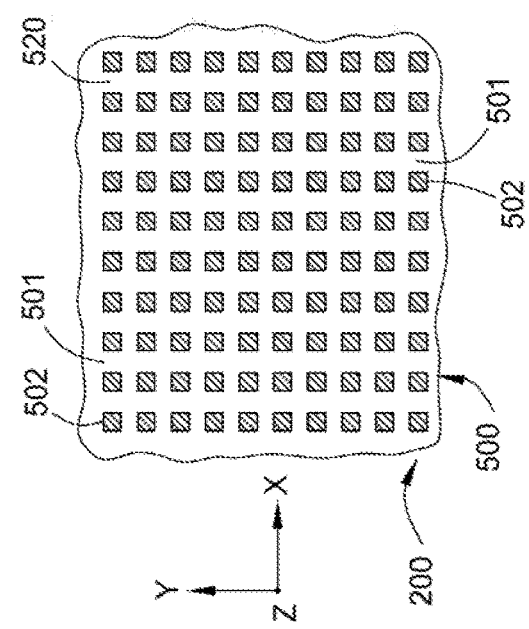
FIG. 5A is a top view of a pixel chart used to form an advanced polishing pad that may contain pores, according to at least one implementation of the present disclosure.

FIG. 5A illustrates a schematic plan view of a pixel chart that is used to form a region 500 of a layer 522 (FIG. 5B) of a first or a second polishing element of a polishing pad that contains pore-forming regions according to one or more implementations of the present disclosure. In this example, the pixel chart includes a rectangular pattern of pore-forming regions 502 that are formed by dispensing one or more droplets of a porosity-forming agent 504 (FIG. 5B) from a first print head onto a surface and then at least partially surrounding the pore-forming regions 502 with one or more structural material-containing regions 501 that include a material that is formed by dispensing droplets of one or more resin precursor compositions from at least a second print head. The porosity-forming agent 504 can then later be removed in a post-processing step or during a polishing process to form pores in one or more layers of the polishing pad. In one example, the porosity-forming agent material is removed from formed advanced polishing pad when the polishing pad is used in a CMP polishing process. In this example, the porosity-forming agent material may be removed due to the interaction of the porosity-forming agent disposed at a surface 520 of the first or second polishing elements in the advanced polishing pad with one or more components found within a slurry that is disposed between the first and/or second polishing elements and a substrate that is being polished. As shown in FIG. 5A, the pore-forming regions 502 are surrounded by the structural material-containing region 501 that is formed by dispensing droplets of a resin-precursor formulation across a surface on which the layer 522 is formed. By use of the various techniques described herein, compositional gradients in the cured structural material found within the structural material-containing region 501 and/or gradients in the size and density of the pore-forming regions 502 can be used to form at least part of a complete polishing pad that has targeted mechanical and thermal properties. The composition of the pore-forming material disposed within the pore-forming regions 502 and distribution and size of the pore-forming regions 502 across of the advanced polishing pad 200 (i.e., X-Y plane) or through the thickness of the polishing element (i.e., Z direction) may vary in any suitable pattern. Although polishing pads described herein are shown to be formed from two kinds of materials, this configuration is not intended to be limiting of the scope of the disclosure provided herein, since polishing pads including three or more kinds of materials is within the scope of the present disclosure. It should be noted that the compositions of the structural material found within a polishing pad, such as the polishing pad designs illustrated in FIGS. 2A-2K, may be varied in a similar manner as discussed above in conjunction with FIGS. 4A-4B. Thus, in some implementations, the material found within a formed structural material-containing region 501 may include a mixture of two or more different materials that varies in one or more directions across (e.g., X and/or Y direction) or through (e.g., Z direction) the formed layer.

FIG. 5B is a side cross-sectional view of a portion of the region 500 illustrated in FIG. 5A according to one or more aspects of the present disclosure. The portion shown in FIG. 5B includes a plurality of layers 522 that are formed on an optional base layer 521 by use of an additive manufacturing process as described herein. For clarity of discussion purposes, the layers are shown in FIG. 5B as being disposed between two dashed lines, however, due to the processes described herein at least the structural material-containing region 501 parts of adjacent layers may be formed such that there is no distinct physical division between layers in a formed advanced polishing pad 200. The layers 522 each include pore-forming regions 502 that are interspersed between regions of the structural material-containing region 501. As noted above, due to the interaction of the porosity-forming agent disposed within the pore-forming regions 502 at the surface 520 (i.e., polishing surface 112) of the advanced polishing pad 200 with a slurry (not shown), which is disposed within a polishing region 530, the porosity-forming agent 504 may be easily removed leaving an unfilled void within the pore-forming regions 502, and thus forming a pore 503.

In one implementation, the pixel charts used to form each layer 522 includes pattern that includes an array of porosity-forming agent 504 containing pore-forming regions 502 that are formed in a targeted pattern across the surface of the formed layer. As noted above, in some implementations, the pattern of porosity-forming agent 504 containing pore-forming regions 502 can be formed in a rectangular array that has a targeted pitch in both the X and Y directions. However, the pattern of porosity-forming agent 504 containing pore-forming regions 502 may be formed in any targeted pattern including a hexagonal array of pore-forming regions 502, a directionally varying pattern of pore-forming regions 502, a random pattern of pore-forming regions 502 or other useful pattern of pore-forming regions 502. In some implementations, the pixel charts used to form adjacent layers 522 are shifted a targeted distance 525 in one or more directions (e.g., X, Y or X and Y directions) relative to each other, or formed in differing relative X-Y patterns, so that the pore-forming regions 502 are not placed on top of each other in adjacently positioned layers as the polishing pad is formed. In one implementation, similarly configured patterns of pore-forming regions 502 in adjacent layers may be staggered a targeted distance in one or more directions relative to each other so that the pore-forming regions 502 are not placed on top of each other in the adjacently positioned layers.

FIG. 5C illustrates is a side cross-sectional view of a portion of the region 500 illustrated in FIG. 5A according to another aspect of the present disclosure. In some implementations, two or more of the deposited layers may be aligned with each other so that the layers are formed directly on top of each other. In one example, as shown in FIG. 5C, two layers 522A and 522B are formed so that the 522A layer is directly on top of the layer 522B so that the pore-forming regions 502 are placed one on top of the other. The next or subsequent layers may then be shifted a targeted distance 525 relative to the layers 522A-B, so that the pore-forming regions 502 in the subsequent layers are not placed on top of the layers 522A-B. The implementations in which two or more layers, within a larger stack of layers, are formed directly on top of each other may be useful in cases where the fixed droplet size resolution in the X and Y directions may be greater than the thickness of the layer in the Z direction. In one example, the fixed droplet size in the X and Y directions is twice as large as the thickness in the Z direction, thus allowing a regular pattern of printed material to be formed in the X, Y and Z directions when two layers are placed on top of each other.

Referring back to FIG. 5A, the pixel charts used to form the pore-forming regions 502 and the surrounding structural material-containing region 501 within a layer can be used to create portions of the polishing features that have a consistent or varying porosity in one or more directions X, Y, or Z. In one example, the polishing features near an edge region of the advanced polishing pad may include more of the resin precursor formulation used to form the structural material within the structural material-containing region 501 than the porosity-forming agent 504 containing pore-forming regions 502. The polishing features near a center region of the polishing pad may also include a higher percentage of pore-forming regions 502 per layer (e.g., higher density) than the polishing features near the edge region. In this example, each polishing feature of the same type (e.g., first polishing elements 204), or of different types (e.g., first and second polishing elements 204, 206), has a unique combination of the resin precursor formulation, the porosity-forming agent and the density of the pore-forming regions 502 per layer and/or per polishing element. In one example, the first polishing elements 204 include a first combination of the resin precursor formulation and the porosity-forming agent and the second polishing elements 206 include a different second combination of the resin precursor formulation and the porosity-forming agent. Therefore, by use of pixel charts, the polishing body can be sequentially formed so that a targeted porosity gradient is achieved in different parts of the polishing body to achieve a targeted polishing performance of the advanced polishing pad.

A method of forming a layer of a porous advanced polishing pad according to implementations described herein may include the following steps. First, one or more droplets of a resin composition, such as described herein, are dispensed in a targeted X and Y pattern to form the structural material portion of a formed layer. In one implementation, the one or more droplets of a resin composition are dispensed on a support if the one or more droplets constitute a first layer. In some implementations, the one or more droplets of a resin composition are dispensed on a previously deposited layer (e.g., second layer, etc.). Second, one or more droplets of a porosity-forming composition containing a porosity-forming agent 504 are dispensed in a targeted X and Y pattern to form the pore-forming regions 502 within the formed layer. In one implementation, the one or more droplets of the porosity-forming composition are dispensed on a support if the one or more droplets constitute a first layer. In some implementations, the one or more droplets of the porosity-forming composition are dispensed on a previously deposited layer. The dispensing processes of the first and second operations are typically performed separately in time and at different X-Y coordinates. Next, or third, the dispensed one or more droplets of the curable resin precursor and the dispensed one or more droplets of the porosity-forming composition are at least partially cured. Next, at the optional fourth step, the dispensed one or more droplets of the curable resin precursor and the dispensed one or more droplets of the porosity-forming composition are exposed to at least one of an annealing process, a rinsing process, or both to remove the porosity-forming agent. The rinsing process may include rinsing with water, another solvent such as alcohol (e.g., isopropanol) or both. The annealing process may include heating the deposited pad structure to a low temperature (e.g., about 100 degrees Celsius) under a low pressure to vaporize the porosity-forming agent. Next, at the fifth step, an optional second curing process is performed on the formed layer or final pad to form the final porous pad structure. In some cases, the first, second, third and fifth processing steps may also be sequentially repeated in any targeted order to form a number of stacked layers before the fourth step is completed.

Figure 6:
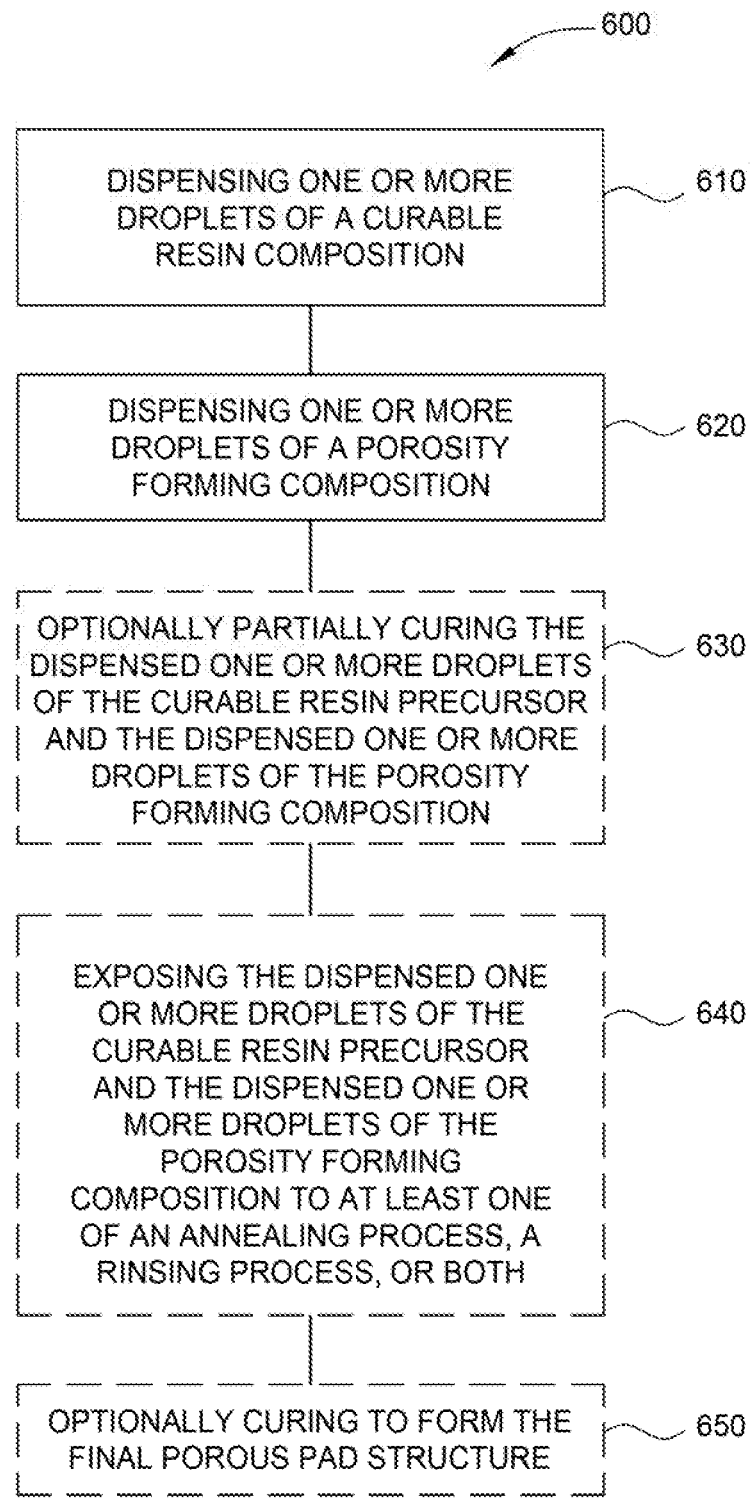
FIG. 6 is a flow chart depicting a method of forming an advanced pad according to implementations described herein.

FIG. 6 is a flow chart depicting a method 600 of forming a porous pad according to implementations described herein. At operation 610, one or more droplets of a resin composition are dispensed. In one implementation, the one or more droplets of a resin composition are dispensed on a support if the one or more droplets constitute a first layer. In some implementations, the one or more droplets of a resin composition are dispensed on a previously deposited layer. At operation 620, one or more droplets of a porosity-forming composition containing a porosity-forming agent are dispensed. In one implementation, the one or more droplets of the porosity-forming composition are dispensed on the support if the one or more droplets constitute a first layer. In some implementations, the one or more droplets of the porosity-forming composition are dispensed on a previously deposited layer. The dispensing processes of operation 610 and operation 620 are typically performed separately. Optionally, at operation 630, the dispensed one or more droplets of the curable resin precursor and the dispensed one or more droplets of the porosity-forming composition are partially cured. Operations 610, 620, and 630 may be repeated to form a 3-D relief. At operation 640, the dispensed one or more droplets of the curable resin precursor and the dispensed one or more droplets of the porosity-forming composition are exposed to at least one of an annealing process, a rinsing process, or both to remove the porosity-forming agent. The rinsing process may include rinsing with water, another solvent such as alcohol (e.g., isopropanol) or both. The annealing process may include heating the deposited pad structure to a low temperature (e.g., about 100 degrees Celsius) under a low pressure to vaporize the porosity-forming agent. At operation 650, an optional curing process is performed to form the final porous pad structure.

While the foregoing is directed to implementations of the present disclosure, other and further implementations of the disclosure may be devised without departing from the basic scope thereof, and the scope thereof is determined by the claims that follow.

Unless particularly stated otherwise in the following description, the unit "parts" represents "parts by weight," and the unit "percent (%)" represents "percent (%) by mass."

The Tg of a monomer in the following description refers to the glass transition temperature of a homopolymer of the monomer.

When introducing elements of the present disclosure or exemplary aspects or implementation(s) thereof, the articles "a," "an," "the" and "said" are intended to mean that there are one or more of the elements.

The terms "comprising," "including" and "having" are intended to be inclusive and mean that there may be additional elements other than the listed elements.

While the foregoing is directed to implementations of the present disclosure, other and further implementations of the present disclosure may be devised without departing from the basic scope thereof, and the scope thereof is determined by the claims that follow.

The invention claimed is:

1. A method of forming a polishing article, comprising:
    depositing a plurality of composite layers with an additive manufacturing system to reach a target thickness, wherein depositing the plurality of composite layers comprises:
        dispensing one or more droplets of a curable resin precursor composition onto a support, the curable resin precursor composition comprising:
            a first resin precursor component that comprises a radiation curable semi-crystalline aliphatic polycarbonate urethane acrylate oligomer;
            a second resin precursor component that comprises an acrylate monomer mixture, comprising:
                a monofunctional acrylate monomer selected from isobornyl acrylate, 3,3,5-trimethylcyclohexyl acrylate, tetrahydrofurfuryl acrylate, or combinations thereof; and
                a multifunctional acrylate monomer selected from dipropylene glycol diacrylate, 1,4-butanediol diacrylate, 1,3-butanediol diacrylate, or combinations thereof, wherein the acrylate monomer mixture is present from 70% to 80% by weight based on a total weight of the curable resin precursor composition; and
            a photoinitiator present from 0.5% to 2.5% based on the total weight of the curable resin precursor composition,
        wherein the curable resin precursor composition has a viscosity within a range from about 10 cP to about 30 cP at 70 degrees Celsius that enables the curable resin precursor composition to be dispensed to form a portion of the polishing article by the additive manufacturing system.

2. The method of claim 1, wherein the radiation curable semi-crystalline aliphatic polycarbonate urethane acrylate oligomer has a functionality that is greater than or equal to 2.

3. The method of claim 1, wherein the monofunctional acrylate monomer is isobornyl acrylate and 3,3,5-trimethylcyclohexyl acrylate and the multifunctional acrylate monomer is 1,4-butanediol diacrylate.

4. The method of claim 1, further comprising:
    dispensing one or more droplets of a porosity-forming composition onto the support, wherein at least one component of the porosity-forming composition is removable to form pores in the polishing article.

5. The method of claim 4, wherein the porosity-forming composition comprises a porosity-forming agent selected from glycols, glycol-ethers, amines, or combinations thereof.

6. The method of claim 5, further comprising partially curing the dispensed one or more droplets of the curable resin precursor composition and the dispensed one or more droplets of the porosity-forming composition prior to exposing the dispensed one or more droplets of the curable resin precursor composition and the dispensed one or more droplets of the porosity-forming composition to at least one of an annealing processing, a rinsing process, or both.

7. A method of forming a polishing article, comprising:
    depositing a plurality of composite layers with an additive manufacturing system to reach a target polishing article thickness, wherein depositing the plurality of composite layers comprises:
        dispensing one or more droplets of a curable resin precursor composition onto a support, the curable resin precursor composition comprising:
            a first resin precursor component that comprises a semi-crystalline radiation curable oligomeric material, wherein the semi-crystalline radiation curable oligomeric material is a semi-crystalline aliphatic polycarbonate urethane acrylate oligomer;
            a second resin precursor component that comprises an acrylate monomer mixture, comprising:
                a monofunctional acrylate monomer selected from isobornyl acrylate, 3,3,5-trimethylcyclohexyl acrylate, tetrahydrofurfuryl acrylate, or combinations thereof; and
                a multifunctional acrylate monomer selected from dipropylene glycol diacrylate, 1,4-butanediol diacrylate, 1,3-butanediol diacrylate, or combinations thereof, wherein the acrylate monomer mixture is present from 70% to 80% by weight based on a total weight of the curable resin precursor composition; and
            a photoinitiator present from 0.5% to 2.5% based on the total weight of the curable resin precursor composition, wherein the curable resin precursor composition has a viscosity within a range from about 10 cP to about 30 cP at 70 degrees Celsius that enables the curable resin precursor composition to be dispensed to form a portion of the polishing article by the additive manufacturing system;
        exposing the one or more droplets of the curable resin precursor composition to electromagnetic radiation to at least partially cure the curable resin precursor composition; and repeating the dispensing and exposing to build a 3D-relief on the support; and solidifying the plurality of composite layers to form a pad body.

8. The method of claim 7, wherein the viscosity is within a range from about 10 cP to about 20 cP at 70 degrees Celsius.

9. The method of claim 7, wherein the semi-crystalline radiation curable oligomeric material has a functionality that is greater than or equal to 2.

10. The method of claim 7, wherein the monofunctional acrylate monomer is isobornyl acrylate and 3,3,5-trimethylcyclohexyl acrylate, and the multifunctional acrylate monomer is 1,4-butanediol diacrylate.

11. The method of claim 7, wherein the curable resin precursor composition comprises from about 20 to about 30% by weight of the semi-crystalline radiation curable oligomeric material.

12. The method of claim 1, wherein the radiation curable semi-crystalline aliphatic polycarbonate urethane acrylate oligomer comprises a urea or carboxylic acid hydrogen bonding group.

13. The method of claim 1, wherein the radiation curable semi-crystalline aliphatic polycarbonate urethane acrylate oligomer is present from 20% to 30% by weight based on a total weight of the curable resin precursor composition.

14. The method of claim 1, wherein the curable resin precursor composition further comprises nanoparticles selected from $SiO_2$ nanoparticles, ZnO nanoparticles, ZnS nanoparticles, and $ZrO_2$ nanoparticles.

15. The method of claim 1, wherein the curable resin precursor composition further comprises polymeric fibers.

16. The method of claim 1, wherein the monofunctional acrylate monomer is isobornyl acrylate and tetrahydrofurfuryl acrylate, and the multifunctional acrylate monomer is 1,3-butanediol diacrylate.

17. The method of claim 7, wherein the curable resin precursor composition further comprises nanoparticles selected from $SiO_2$ nanoparticles, ZnO nanoparticles, ZnS nanoparticles, and $ZrO_2$ nanoparticles.

18. The method of claim 7, wherein the curable resin precursor composition further comprises polymeric fibers.

19. The method of claim 7, wherein the monofunctional acrylate monomer is isobornyl acrylate and tetrahydrofurfuryl acrylate, and the multifunctional acrylate monomer is 1,3-butanediol diacrylate.

* * * * *